INVENTORS
W. W. LASKER, DECEASED: W. W. LASKER JR., EXECUTOR,
AND J. MUELLER
BY Robert H. Strother.
ATTORNEY.

July 6, 1943.  W. W. LASKER ET AL  2,323,816
TABULATING AND ACCOUNTING MACHINE
Filed Nov. 13, 1937  38 Sheets-Sheet 4

INVENTORS
W. W. LASKER, DECEASED,
W. W. LASKER JR, EXECUTOR,
AND J. MUELLER
BY Robert H. Strother
ATTORNEY.

July 6, 1943.  W. W. LASKER ET AL  2,323,816
TABULATING AND ACCOUNTING MACHINE
Filed Nov. 13, 1937  38 Sheets-Sheet 5

INVENTORS
W. W. LASKER, DECEASED: W. W. LASKER JR, EXECUTOR,
AND J. MUELLER
BY Robert H. Strother
ATTORNEY.

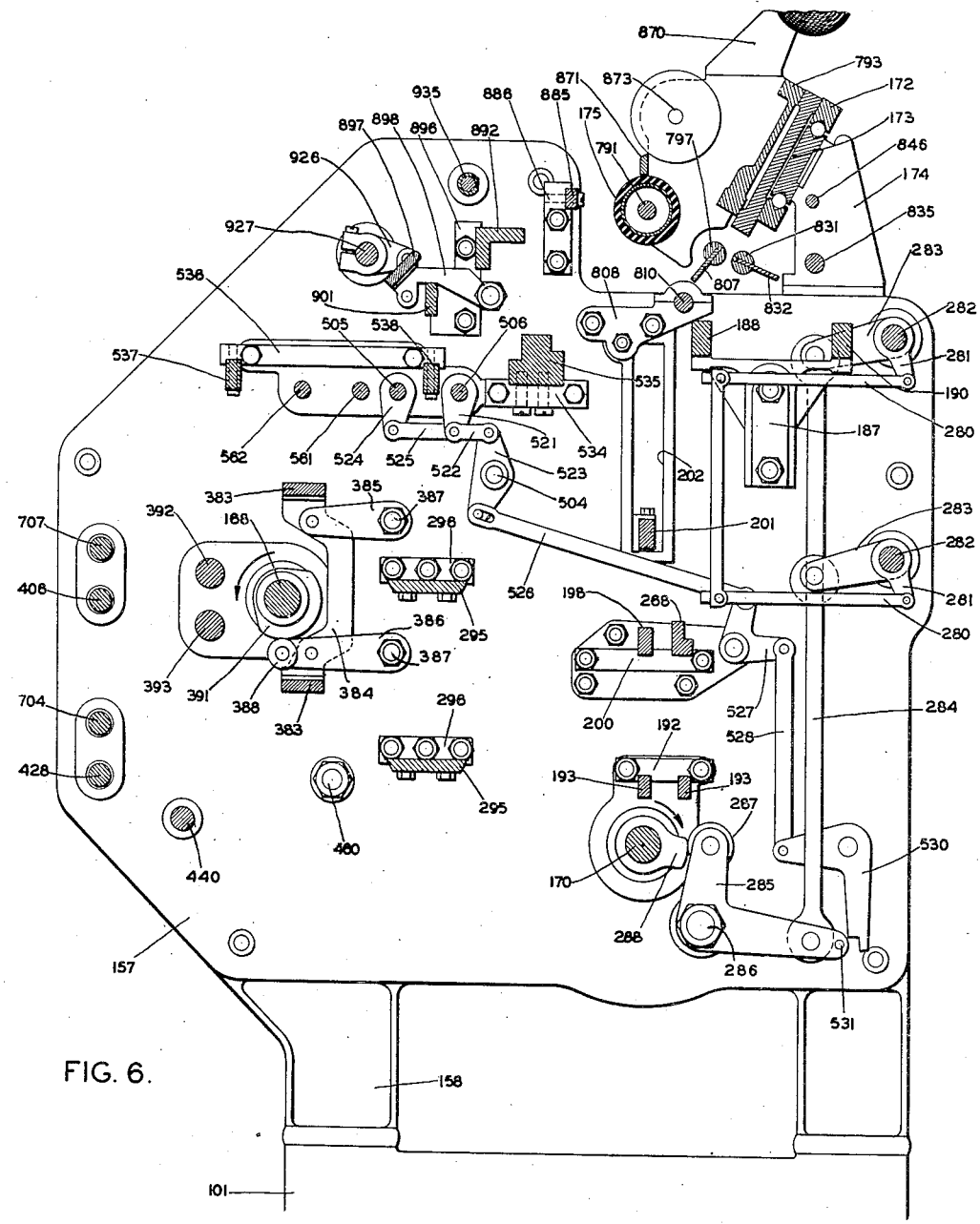
FIG. 6.
INVENTORS
W.W.LASKER DECEASED: W.W.LASKER JR, EXECUTOR,
AND J. MUELLER
BY 
ATTORNEY.

July 6, 1943.  W. W. LASKER ET AL  2,323,816
TABULATING AND ACCOUNTING MACHINE
Filed Nov. 13, 1937    38 Sheets-Sheet 7

INVENTORS
W. W. LASKER, DECEASED,
W. W. LASKER JR, EXECUTOR
AND
J. MUELLER
BY Robert H. Strotter
ATTORNEY

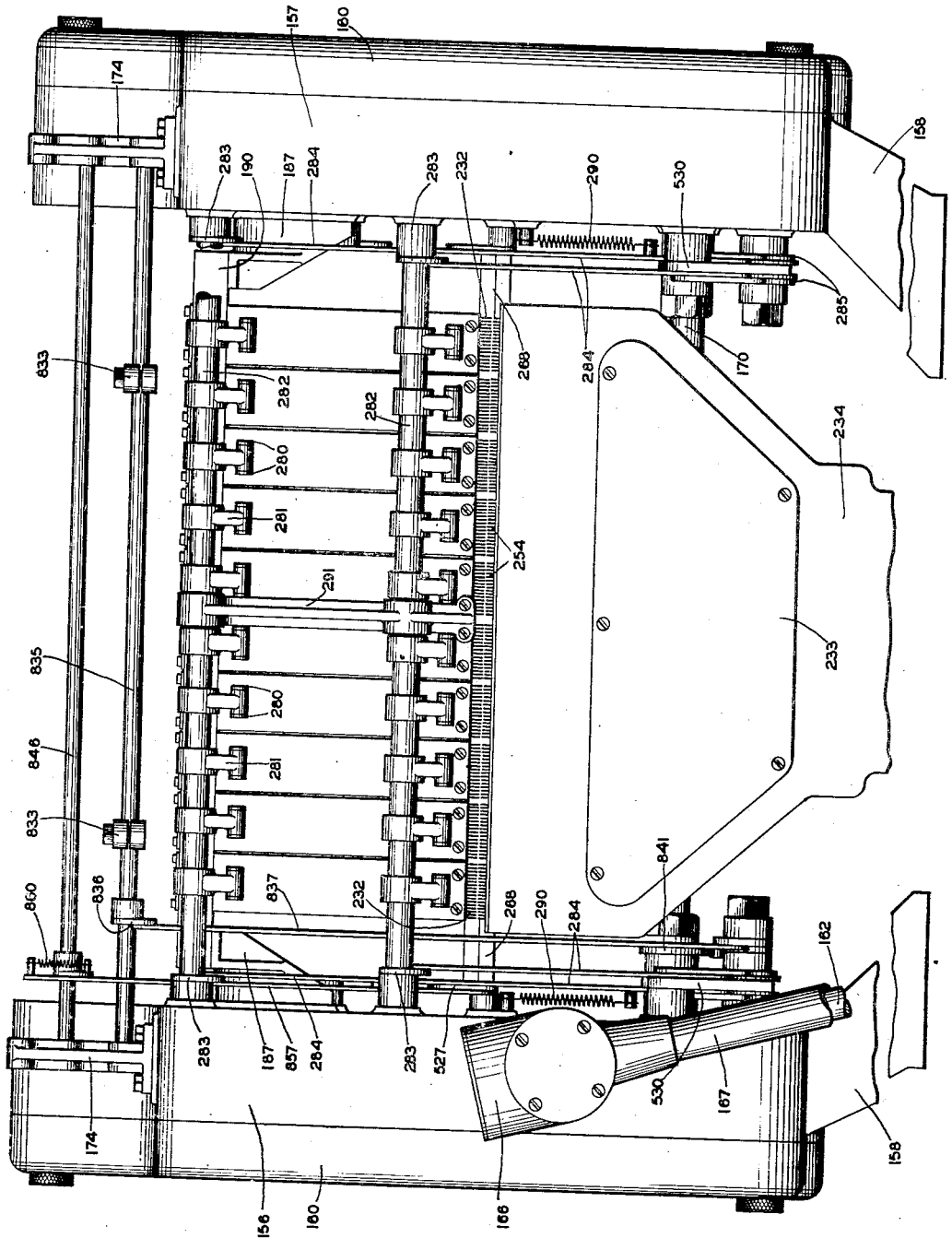

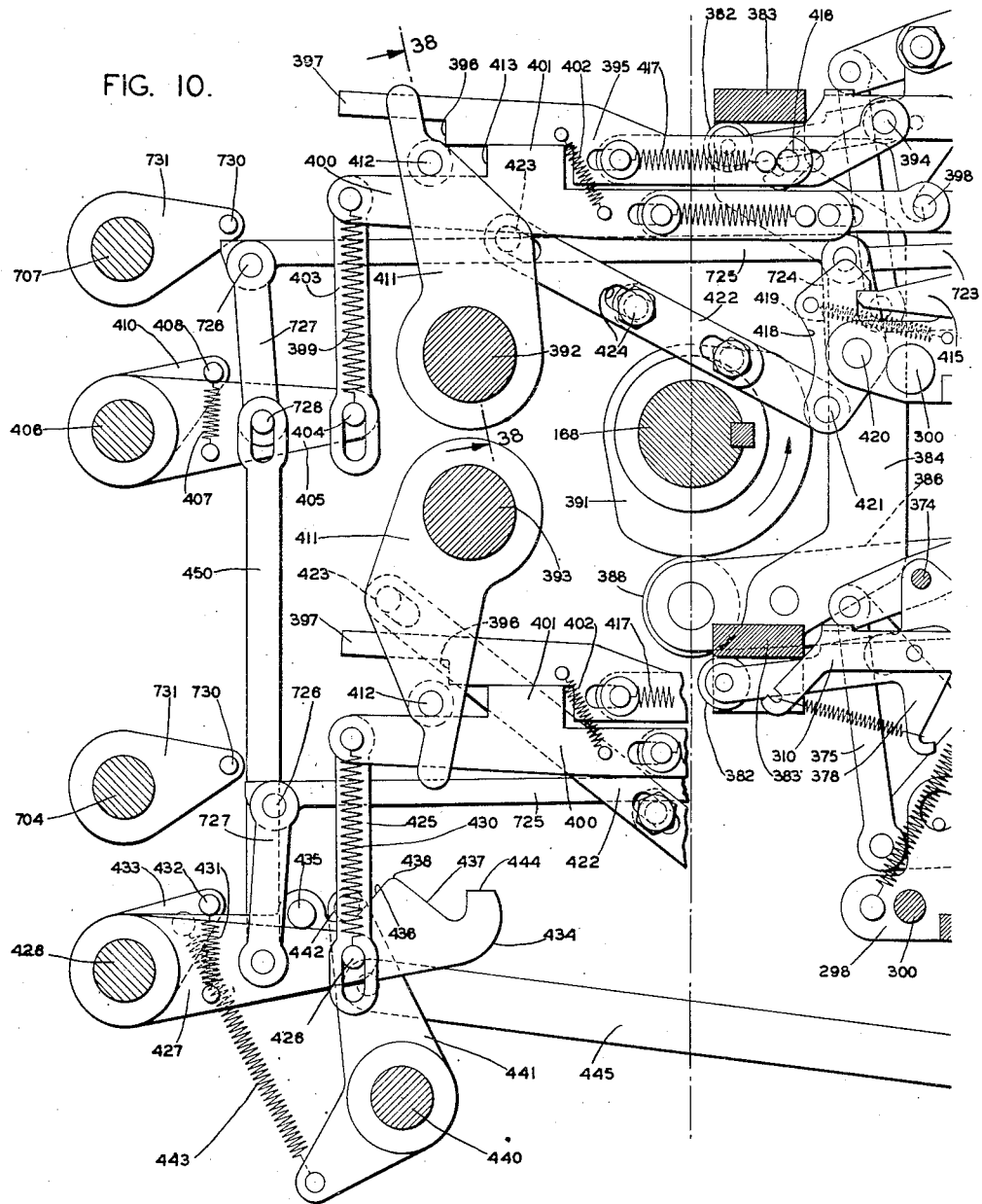

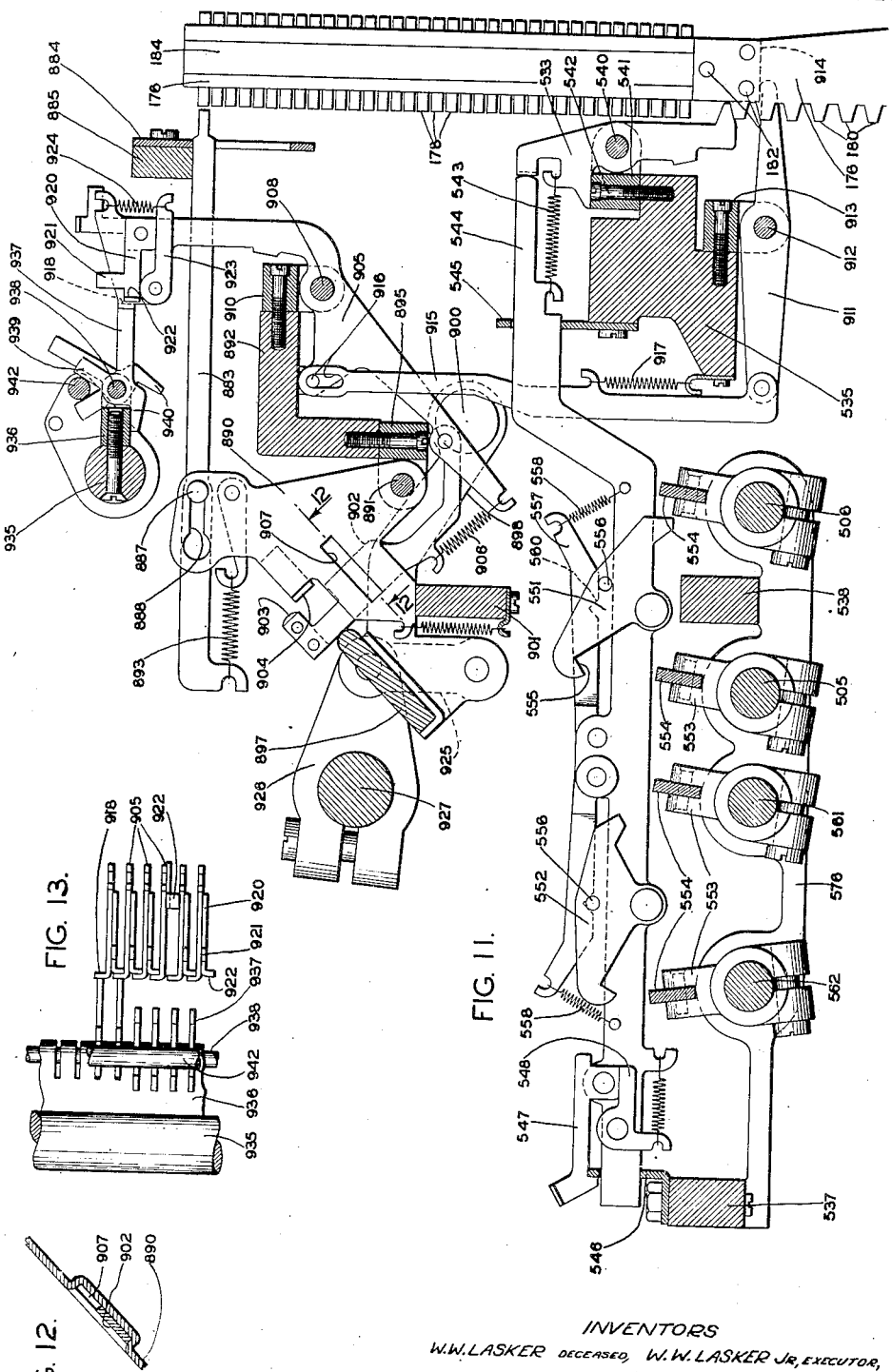

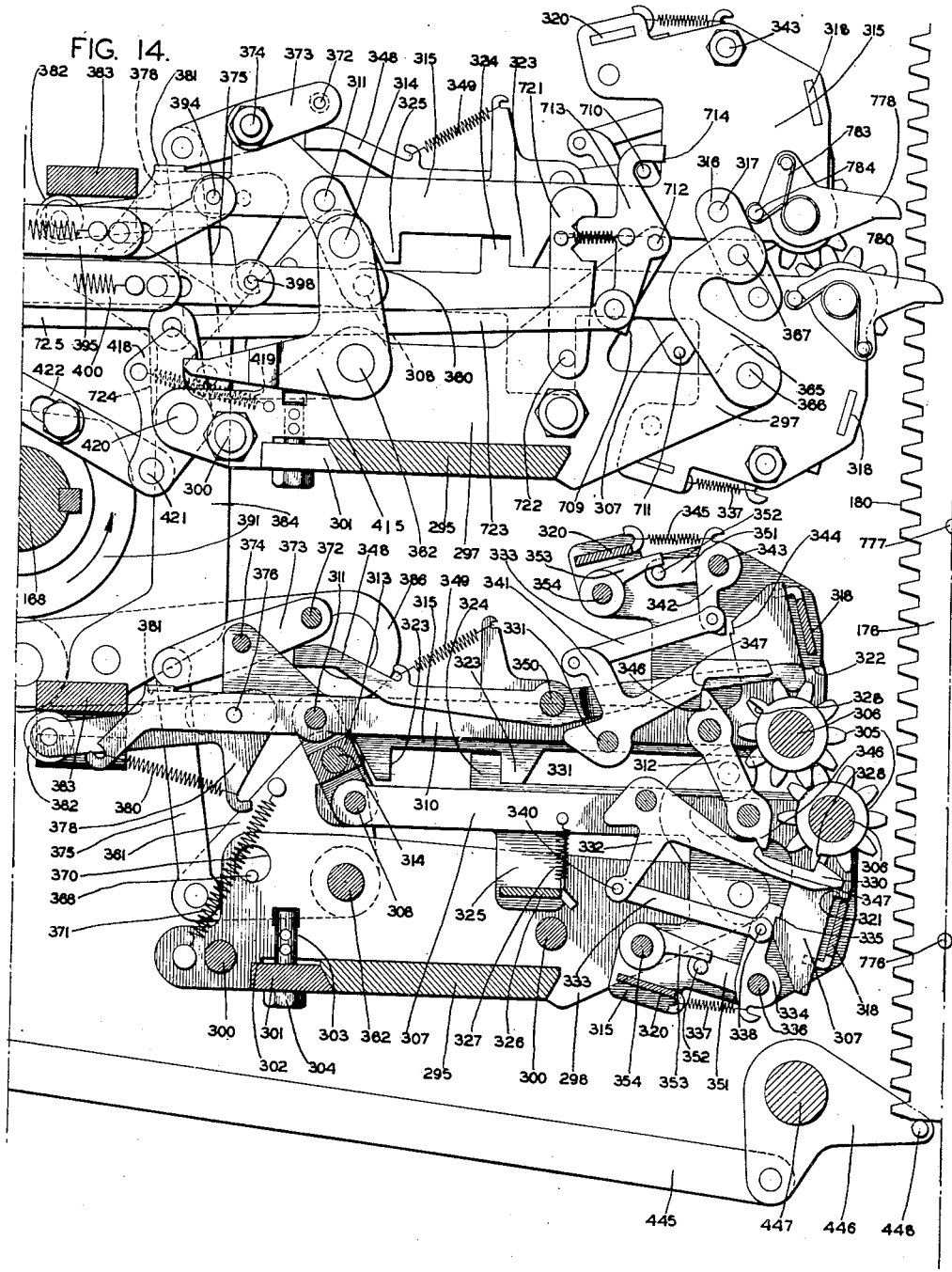

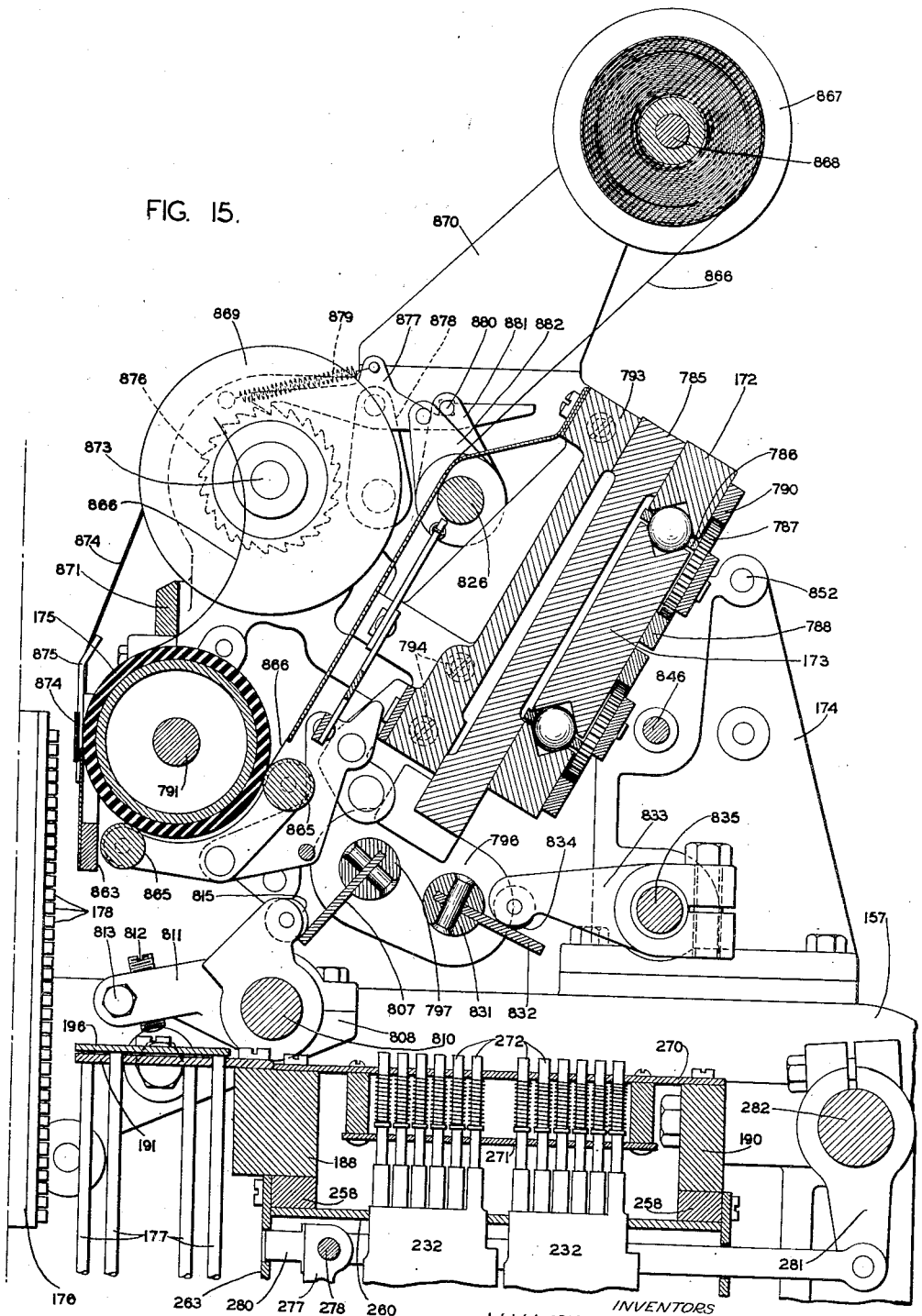

July 6, 1943.  W. W. LASKER ET AL  2,323,816

TABULATING AND ACCOUNTING MACHINE

Filed Nov. 13, 1937  38 Sheets-Sheet 18

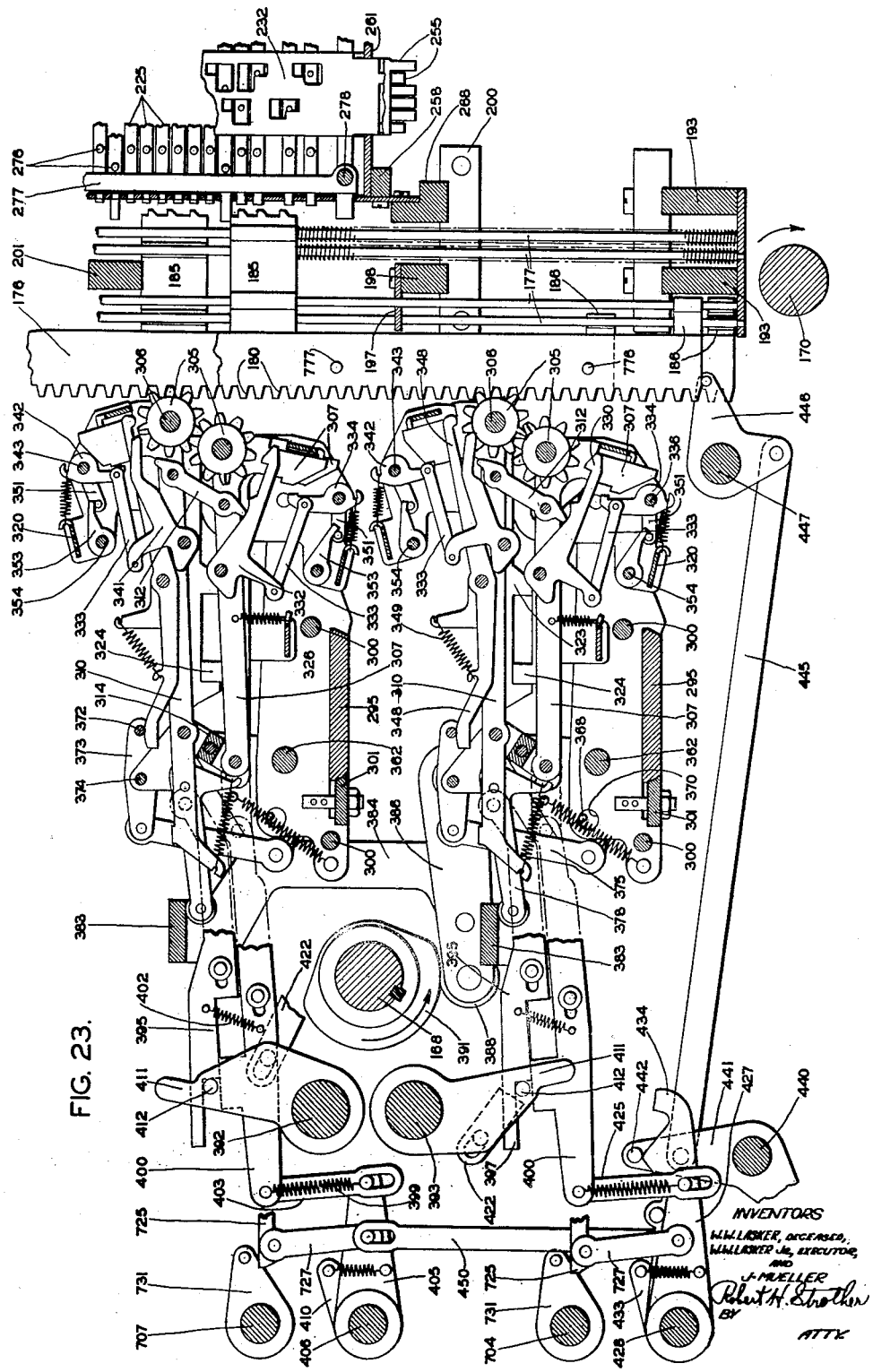

July 6, 1943.  W. W. LASKER ET AL  2,323,816
TABULATING AND ACCOUNTING MACHINE
Filed Nov. 13, 1937  38 Sheets-Sheet 20

INVENTORS
W. W. LASKER DECEASED: W. W. LASKER Jr, EXECUTOR
AND J. MUELLER
BY Robert H. Strother
ATTORNEY.

INVENTORS
W.W. LASKER DECEASED: W.W. LASKER JR., EXECUTOR
AND J. MUELLER
BY Robert H. Strotter
ATTORNEY.

July 6, 1943. W. W. LASKER ET AL 2,323,816
TABULATING AND ACCOUNTING MACHINE
Filed Nov. 13, 1937 38 Sheets-Sheet 22

INVENTORS
W.W. LASKER DECEASED: W.W. LASKER JR, EXECUTOR,
AND J. MUELLER
BY Robert H. Strother
ATTORNEY.

July 6, 1943.  W. W. LASKER ET AL  2,323,816
TABULATING AND ACCOUNTING MACHINE
Filed Nov. 13, 1937  38 Sheets-Sheet 23

INVENTORS
W.W.LASKER, DECEASED: W.W.LASKER JR, EXECUTOR
AND J. MUELLER
BY Robert H. Strother,
ATTORNEY.

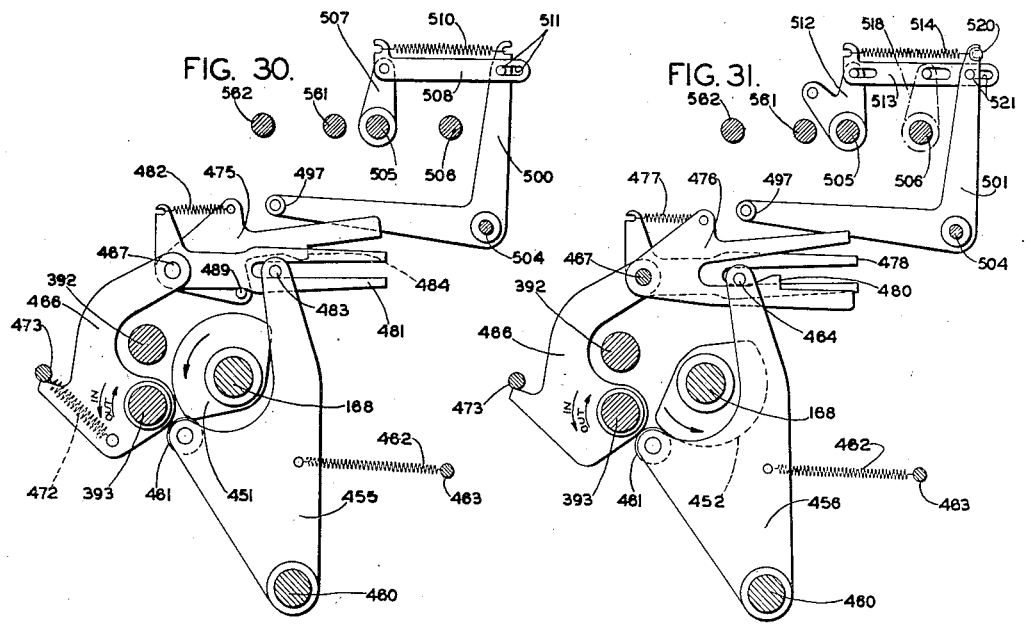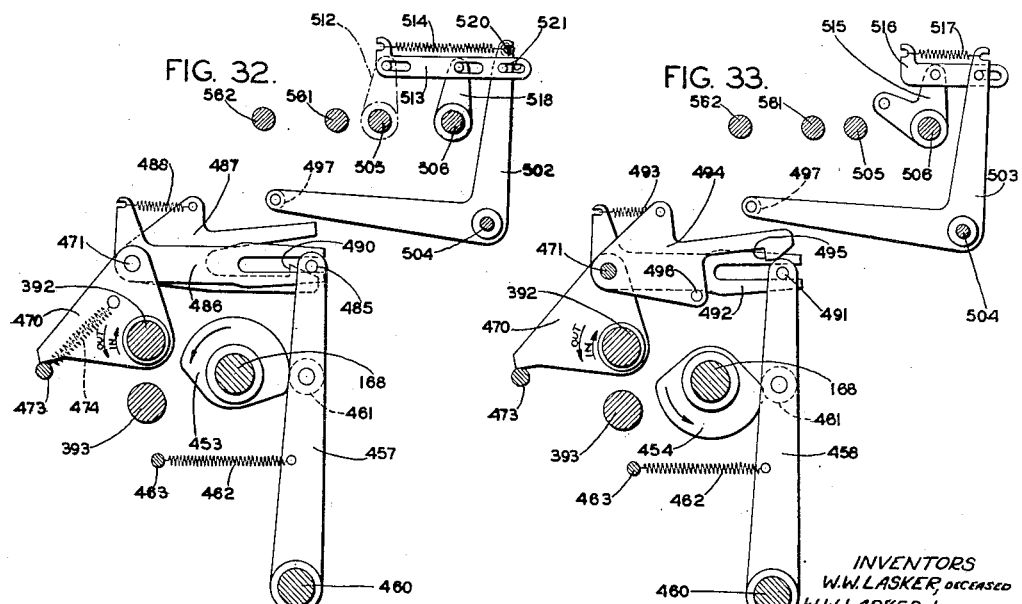

July 6, 1943.  W. W. LASKER ET AL  2,323,816
TABULATING AND ACCOUNTING MACHINE
Filed Nov. 13, 1937  38 Sheets-Sheet 25
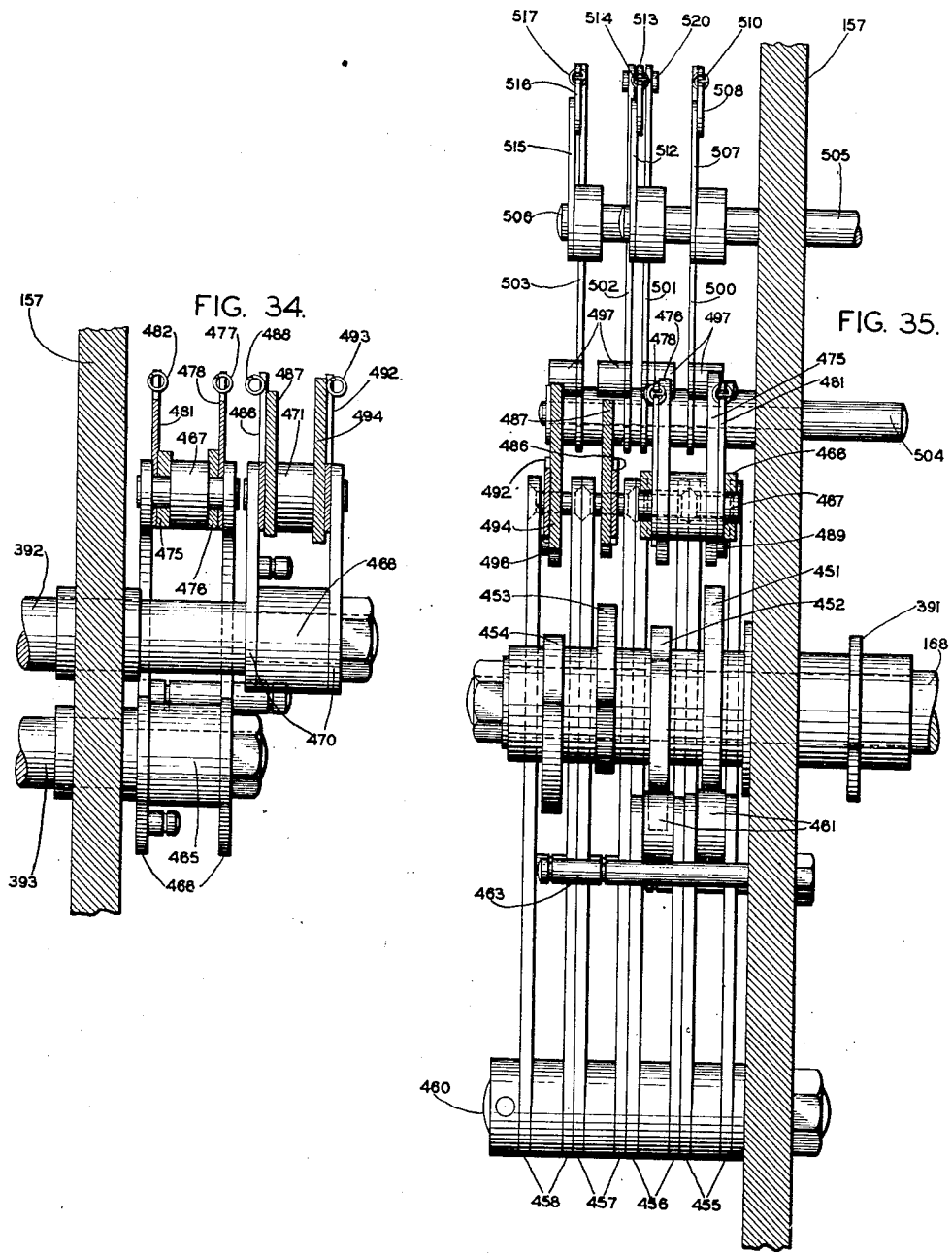
INVENTORS
W. W. LASKER, DECEASED: W. W. LASKER JR, EXECUTOR
AND J. MUELLER
BY Robert H. Strother
ATTORNEY.

July 6, 1943.     W. W. LASKER ET AL     2,323,816
TABULATING AND ACCOUNTING MACHINE
Filed Nov. 13, 1937     38 Sheets-Sheet 26
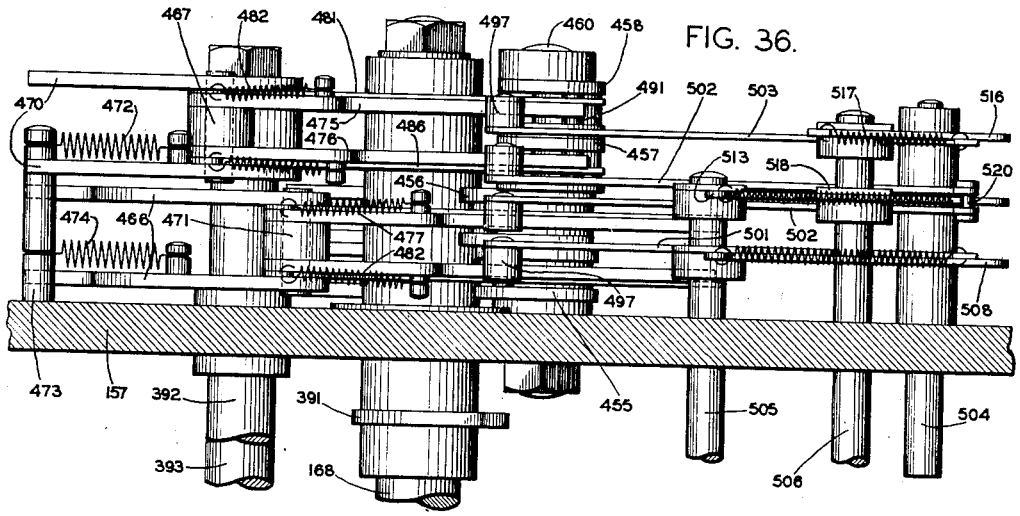
FIG. 36.
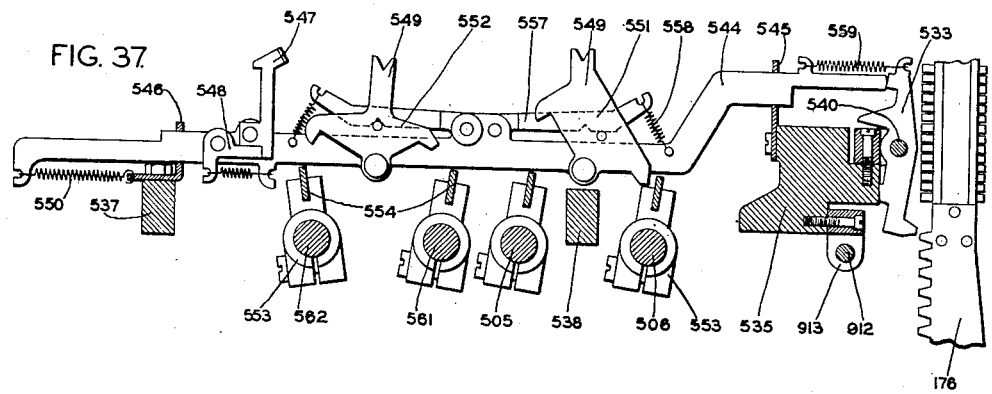
FIG. 37.
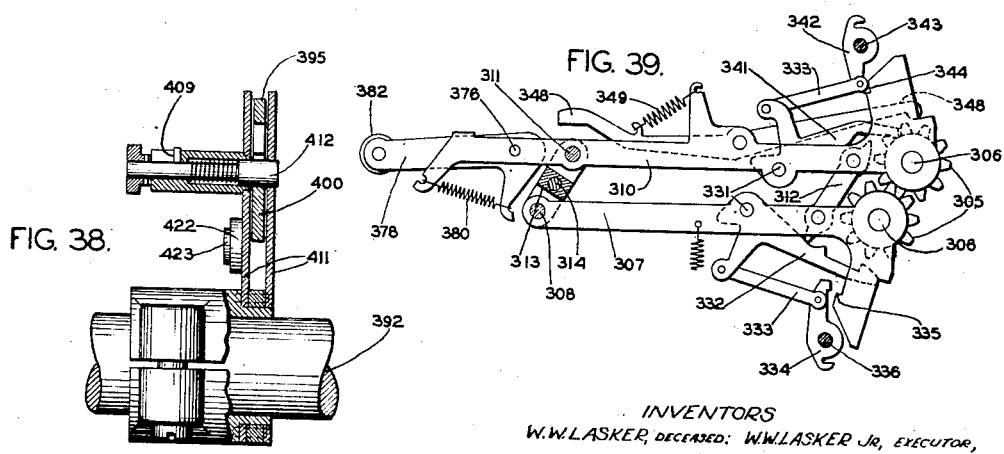
FIG. 38.
FIG. 39.
INVENTORS
W. W. LASKER, DECEASED: W. W. LASKER JR, EXECUTOR,
AND J. MUELLER
BY Robert H. Strother,
ATTORNEY.

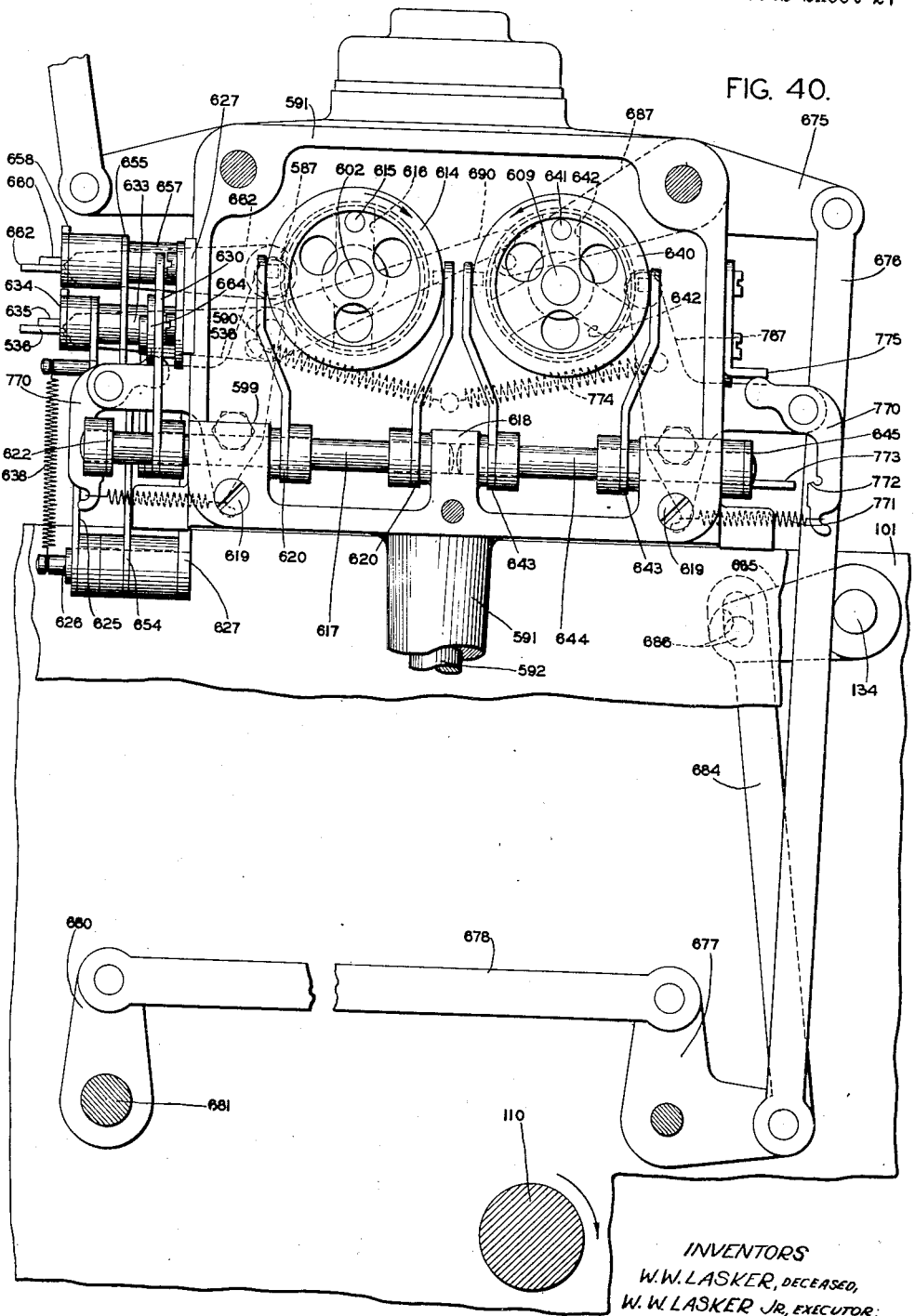

July 6, 1943.    W. W. LASKER ET AL    2,323,816
TABULATING AND ACCOUNTING MACHINE
Filed Nov. 13, 1937    38 Sheets-Sheet 28
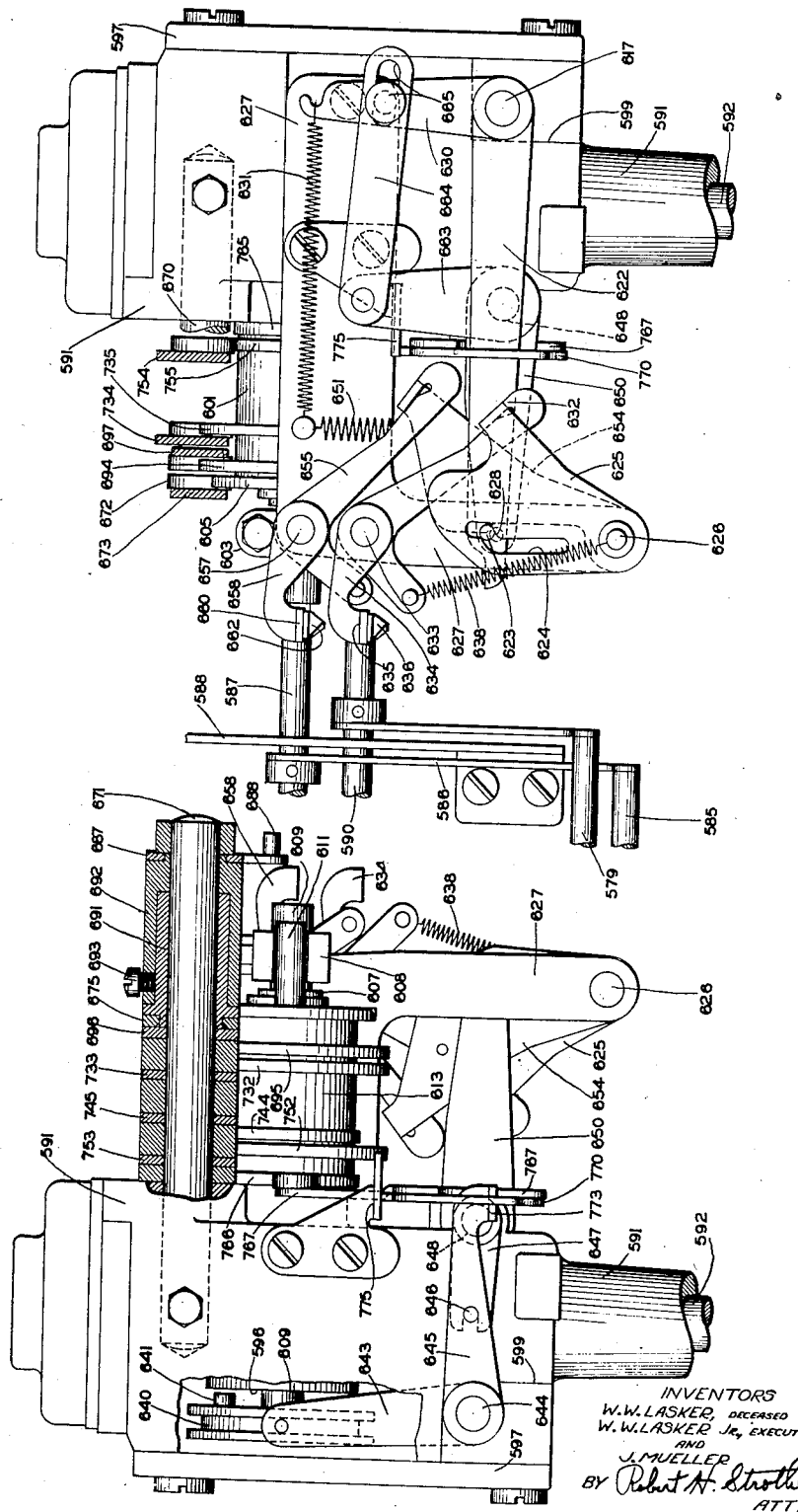
INVENTORS
W. W. LASKER, DECEASED
W. W. LASKER JR., EXECUTOR
AND
J. MUELLER
BY Robert H. Strother
ATTY.

July 6, 1943. W. W. LASKER ET AL 2,323,816
TABULATING AND ACCOUNTING MACHINE
Filed Nov. 13, 1937 38 Sheets-Sheet 29
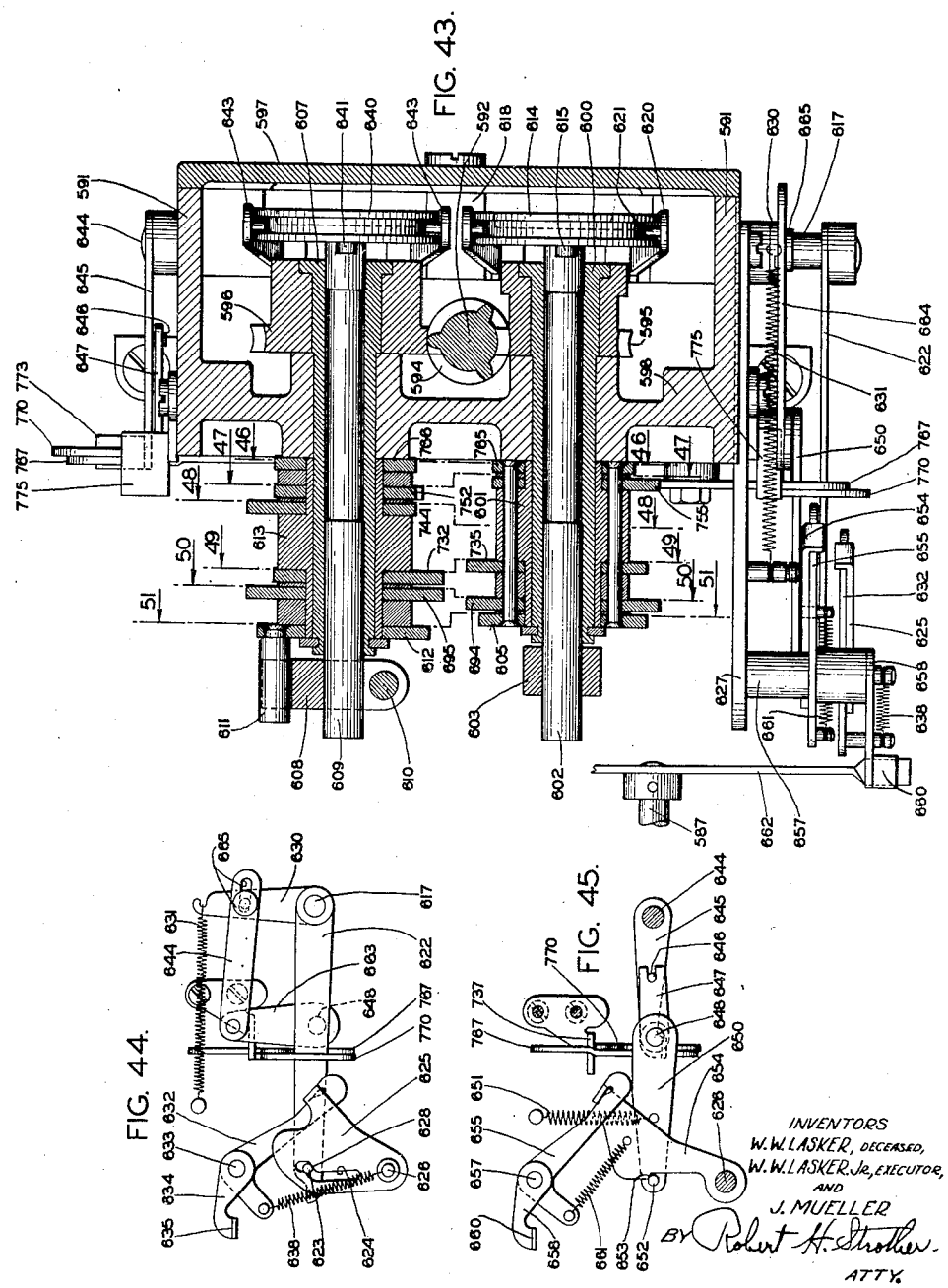

July 6, 1943. W. W. LASKER ET AL 2,323,816
TABULATING AND ACCOUNTING MACHINE
Filed Nov. 13, 1937 38 Sheets-Sheet 31

INVENTORS
W.W.LASKER, DECEASED: W.W.LASKER Jr, EXECUTOR,
AND J. MUELLER
BY Robert H. Strother
ATTORNEY.

July 6, 1943.   W. W. LASKER ET AL   2,323,816
TABULATING AND ACCOUNTING MACHINE
Filed Nov. 13, 1937   38 Sheets-Sheet 34

INVENTORS
W. W. LASKER DECEASED, W.W.LASKER JR. EXECUTOR
AND J. MUELLER
BY Robert H. Strother.
ATTORNEY.

July 6, 1943.  W. W. LASKER ET AL  2,323,816

TABULATING AND ACCOUNTING MACHINE

Filed Nov. 13, 1937   38 Sheets-Sheet 36

INVENTORS
W. W. LASKER DECEASED, W. W. LASKER JR, EXECUTOR
AND J. MUELLER
BY Robert H. Stroller
ATTORNEY.

Patented July 6, 1943

2,323,816

UNITED STATES PATENT OFFICE 2,323,816

TABULATING AND ACCOUNTING MACHINE

William W. Lasker, deceased, late of Brooklyn, N. Y., by William W. Lasker, Jr., executor, Brooklyn, N. Y., and John Mueller, North Bergen, N. J., assignors to Remington Rand Inc., Buffalo, N. Y., a corporation of Delaware Application November 13, 1937, Serial No. 174,354

44 Claims. (Cl. 235—61.8)

This invention relates primarily to that class of office machines known as record-controlled tabulating machines, though some of the features of the invention are applicable to computing and recording machines that are not record-controlled. In the specific instance of the invention herein illustrated and described in detail, an entirely new "head" section is provided for the Powers tabulating machine. These tabulating machines are so complicated and the uses to which they are applied are so varied, that it has been necessary from time to time to devise and incorporate in them numerous special devices to control and vary their operation and their functions. Also, it has been necessary, in order to adapt the machines to the requirements of different users, to construct individual machines with variations from standard models, so that many of said machines go through the factory each as a special job, differing in some respects from any other. The machines have, therefore, included units more or less in the nature of special attachments, and the expense of their manufacture has been increased. It is one of the objects of the present invention to build into the machine, mechanism capable of carrying out certain special functions, which mechanism requires only a simple adjustment to bring it into action, which adjustments in many instances can be readily and quickly made by the operator of the machine. Another object is to construct the machine in such a way that, in the process of manufacture, the adaptation of a particular machine to the requirements of a particular customer can be effected readily and with but slight departure from the regular course of manufacture. The machine is so designed that such adaptation in many respects is little or nothing more than a matter of assembling. For example, any or all type carriers may carry both numeral and alphabet types, and such type-carriers may be mounted wherever desired across the whole width of the machine, so that both numeral and alphabet printing may be had anywhere desired. The framework is equipped for mounting a continuous uninterrupted series of such type bars for the whole length of the printing line, and the assembler of the machine may put in all of them or only groups of them as desired, and such groups may be put anywhere desired. These same type-carriers are also actuating racks for totalizers. The totalizers are readily attached units, and the support for them is a smooth bar, so that the assembler may put in whatever number of totalizers are needed and set each one of them at any desired location across the machine. There are a plurality of such supporting bars, so that totalizers may be mounted in tiers, those in one tier actuated by the same racks as those in another tier or not, according to the needs of the user. The operator of the machine may at any time enable or disable any totalizer he wishes, and thus set the machine for different kinds of work. Where two totalizers occupy the same field and are actuated by the same racks, one of them may be used for obtaining group totals and the other for preserving grand totals, and such different kinds of totals may be taken automatically on changes of designation. Cooperating with each combined type-carrier and rack, is a so-called "slam-bail" pawl adapted, when active to allow return motion to its bar, but not to allow motion away from normal. These pawls are provided with individual controls readily settable by the operator to act automatically to secure different modes of operation. Any of these controls can be so set as to lock the differential bar down in normal position and so to disable it altogether. Any of them can also be set so as to convert its bar into a designation bar, to print only once for each group of cards, whether the items of each group are printed or whether only totals are printed. Any such control can also be set so as to enable its differential bar on tabulating cycles and to disable it on total-taking cycles, in order to get certain functions. Thus, designation printing is built into the machine in such a way that the operator may easily set any type-carriers he desires to this mode of operation at any time, and he may use certain type-carriers for this purpose on one piece of work and any others that he wishes on another piece of work. A button, when set in one position will cause the machine to print all items and totals when set in another position will cause item printing to be suppressed and only totals to be printed. The mechanism controlled by said button may also be set by the machine operator so as to apply only to whatever type-carriers the operator may desire, and not to other type-carriers. The printing devices are also provided with means individual to each type-carrier and settable by the operator for coupling together any desired succession of said printing devices so as automatically to print the significant zeros. The machine operator may, therefore, himself secure this function in any field of the printing he wishes and may split it at any point desired.

The sensing mechanism, and the stops and other mechanism controlled thereby, are responsive to a six-point code, so as to use ninety-column cards punched according to the Powers numeric code; and this code has been extended to provide for the twenty-six letters of the alphabet. All differential type and rack bars in the machine are controlled by this thirty-six character code, so that numerical and alphabetical control of said bars is built into the machine throughout its entire width. This code is made to control eighteen stops in each denominational position, each stop determining two positions of its differential bar; and these stops are controlled by an improved arrangement of permutation bars affording a compact arrangement and an advantageous mode of operation. There are also two additional stops in each place giving novel and useful results.

The totalizers are of novel and improved construction. All of said totalizers may be capable of direct subtraction and of yielding both positive and negative totals, and novel means are provided acting automatically at total-taking for setting any totalizer to negative in case its registered total is of that sign. In each denomination there are two wheels constantly in mesh, one wheel being engaged for addition and the other for subtraction. The transfer of the tens is effected by moving the pair of wheels bodily against the direction of motion of the rack. The transfer is, therefore, effected while the wheels are in mesh with the racks, but by means included solely in the totalizer and not involving any extra movement of the racks. A plurality of totalizers, therefore, may be engaged with the same combined rack and type bars, which nevertheless are merely light toothed bars with no relatively movable parts except the individual types.

The totalizers of each tier are controlled as to their engagement and disengagement by a rock shaft extending across the machine and having suitable devices clamped thereto wherever a totalizer may have been placed. These rock shafts are independently controlled by cams on a drive shaft so as at one time to engage all totalizers and at another time only those of one tier.

The automatic total-control mechanism has been modified somewhat, partly to improve its action and partly to adapt it to the new mechanism.

Many other modifications and improvements have been incorporated in the machine, as will appear from the following detailed description.

To the above and other ends, the invention consists in certain features of construction and combinations and arrangements of parts, all of which will be set forth in the following description and pointed out in the claims.

In order to make the invention understood, one specific embodiment of it is illustrated in the accompanying drawings and described in detail in this specification; but it will be understood that the invention is not limited to this embodiment and that as to some of its features it may be modified considerably in form and detail without departing from the invention.

In the drawings, most of the side elevations are taken as viewed from the right-hand side of the machine. In said drawings:

Fig. 6 is a right-hand elevation in section and showing the parts near the left-hand end frame of the head.

Fig. 9 is a rear elevation of the head with parts omitted.

Figure 1:
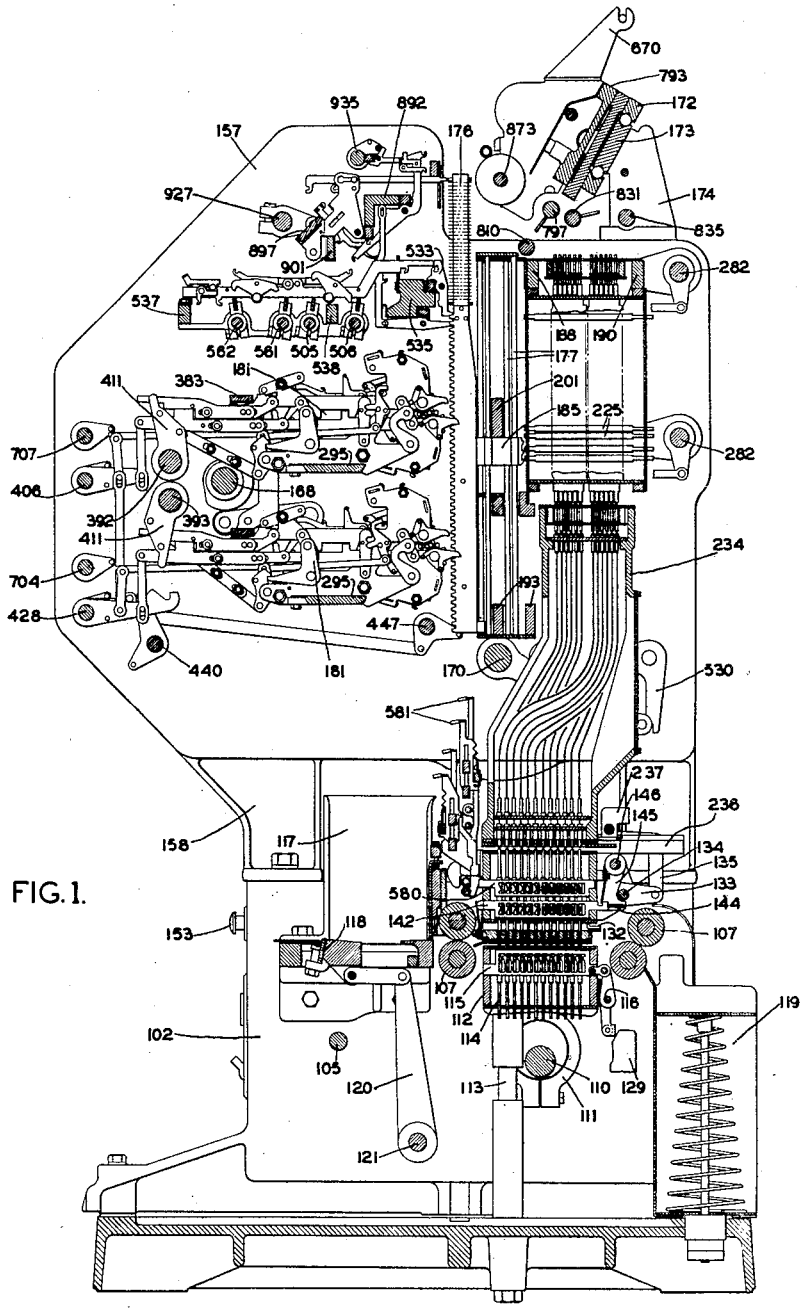
Fig. 1 is a general view of the machine taken on an irregular front to rear section and with parts omitted.

Figs. 10, 11, 14, 15, 16, 17, and 18 are views in section of the machine and so related that, if joined together, they would constitute on a larger scale a figure somewhat like the upper part of Fig. 1. In some instances the line of juncture between different figures is indicated by a dot-dash line.

Figure 16:
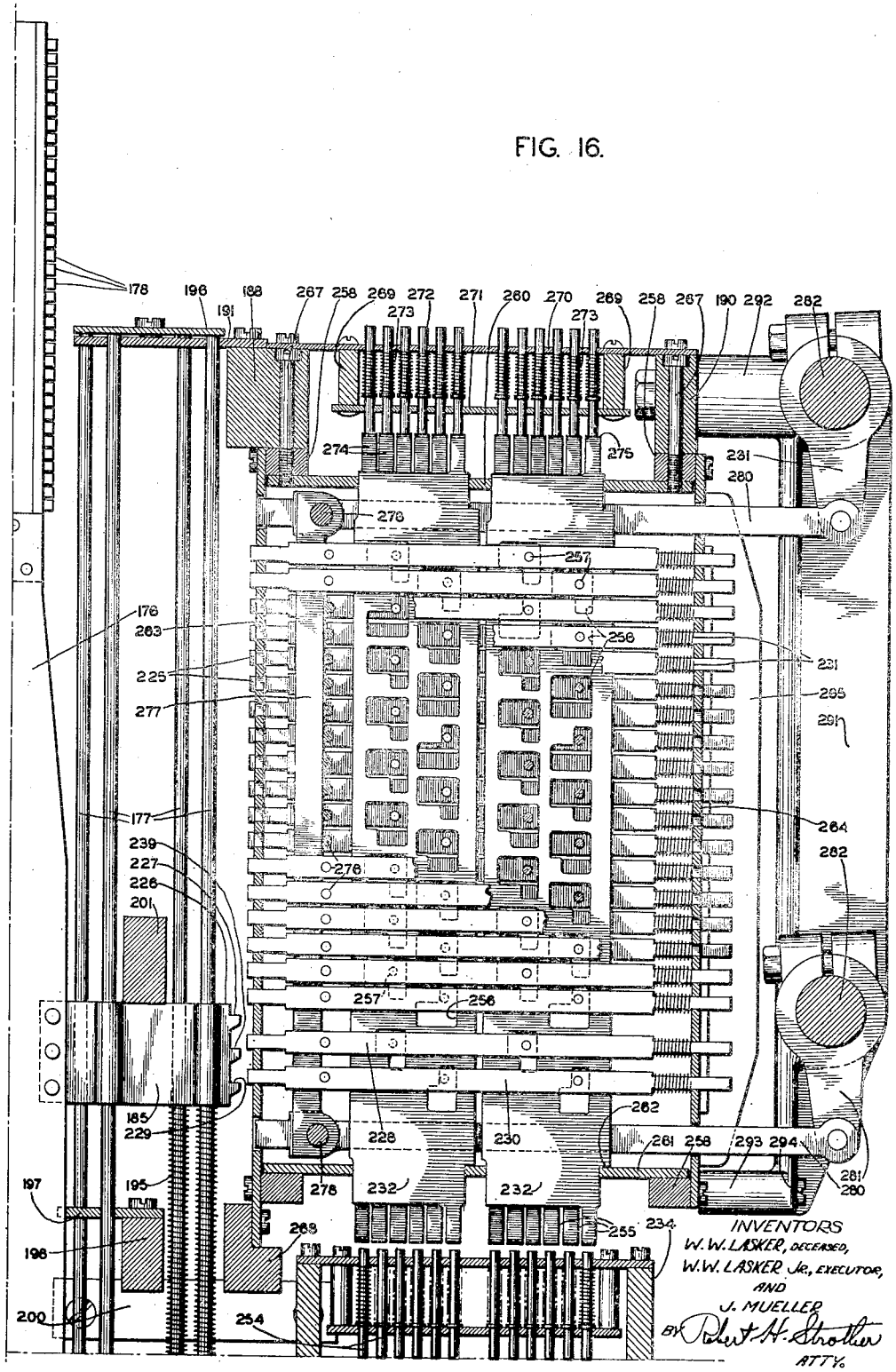
Figure 17:
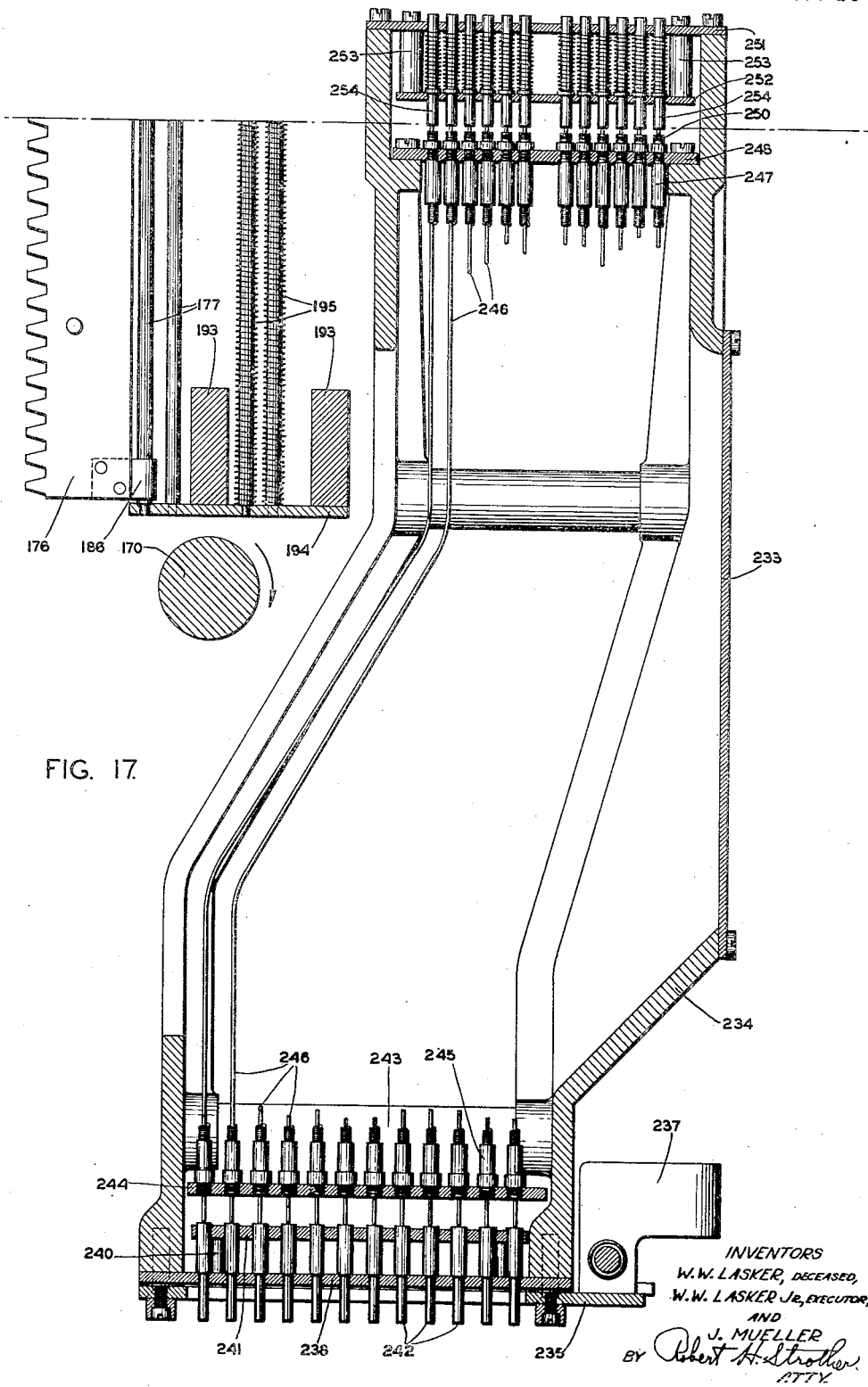
Figure 18:
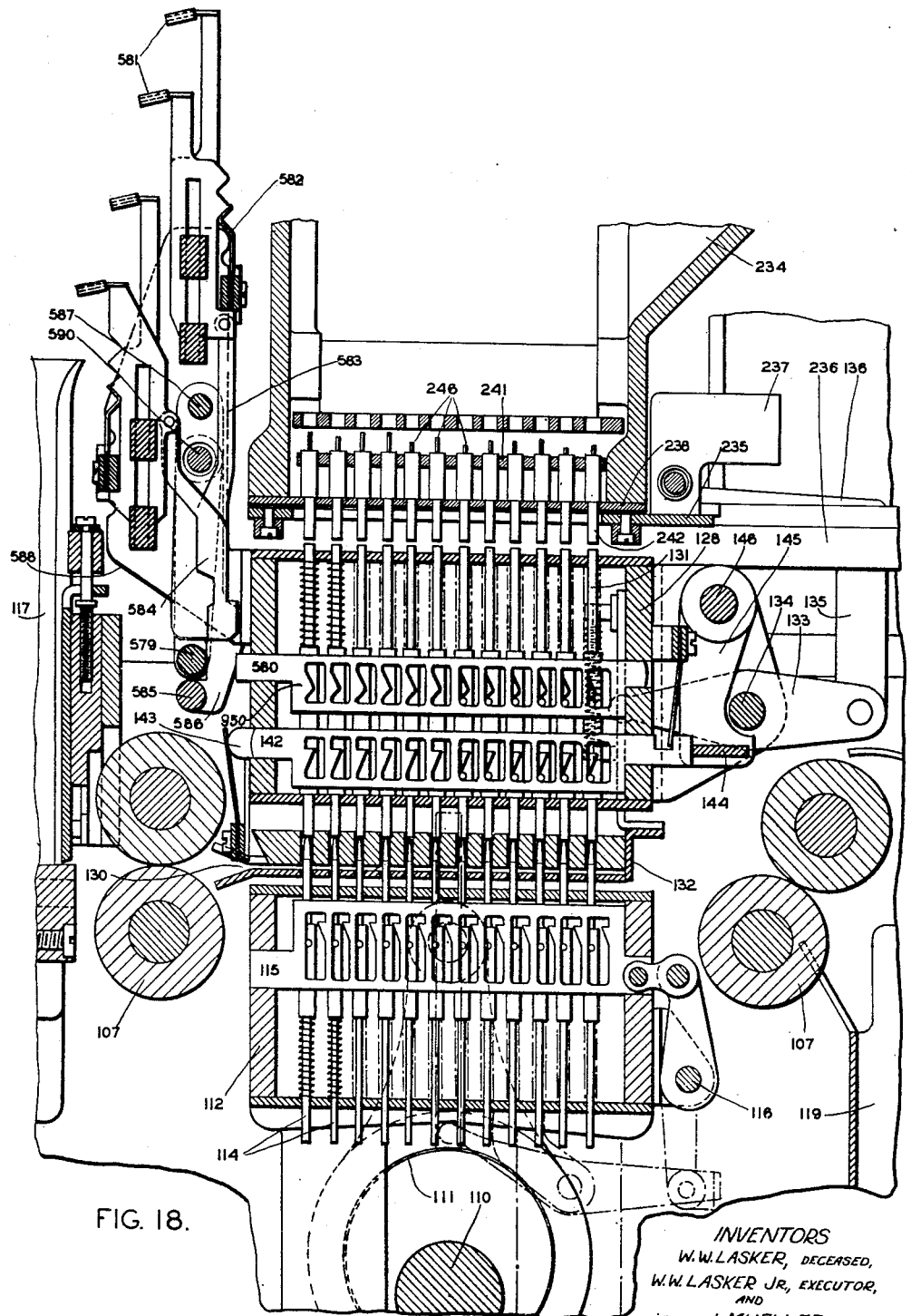

Fig. 10 shows the mechanism nearest the front of the machine, Figs. 11 and 14 show the mechanism near the middle of the machine, and Figs. 15, 16, and 17 the mechanism at the rear of the machine. Fig. 18 shows the sensing mechanism and the change-of-designation mechanism which is structurally a part of the base section of the machine.

Fig. 12 is a detail in section on the line 12—12 of Fig. 11 and looking in the direction of the arrows at said line.

Fig. 13 is a fragmentary top view of a portion of the controls for the firing pins of the printing mechanism shown in Fig. 11.

Figure 19:
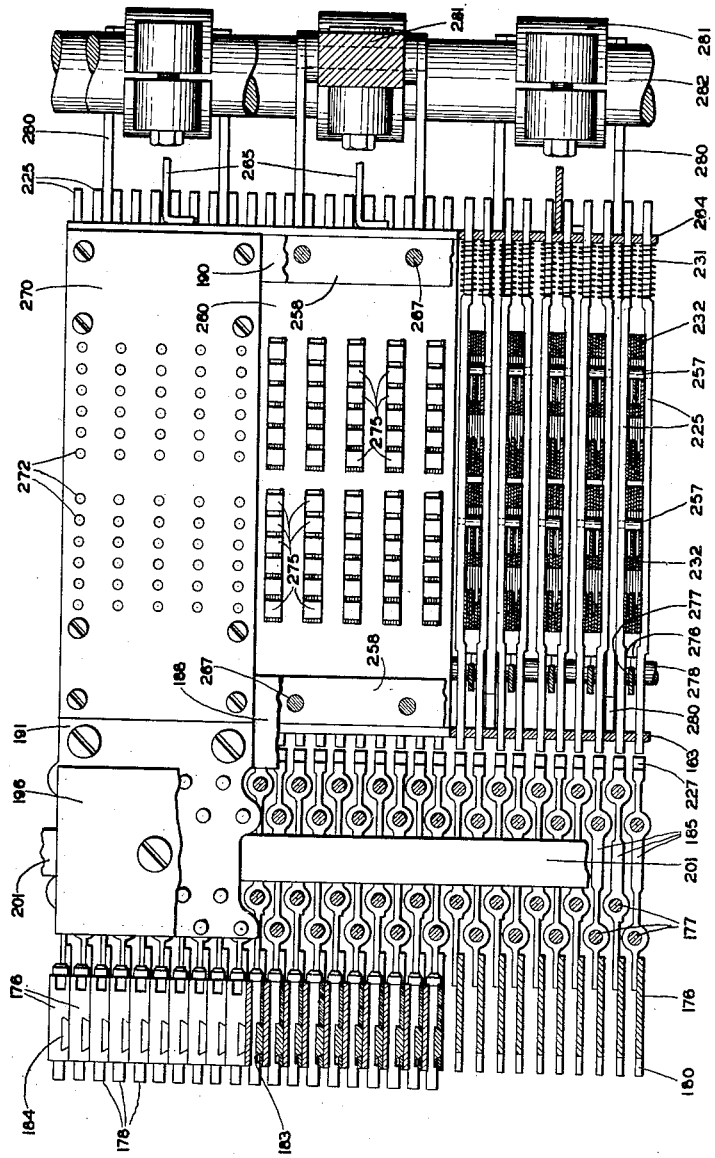

Fig. 19 is a partial plan view with parts on two different sections, showing the type bars and the system of stops and permutation bars and associated devices.

Figure 20:
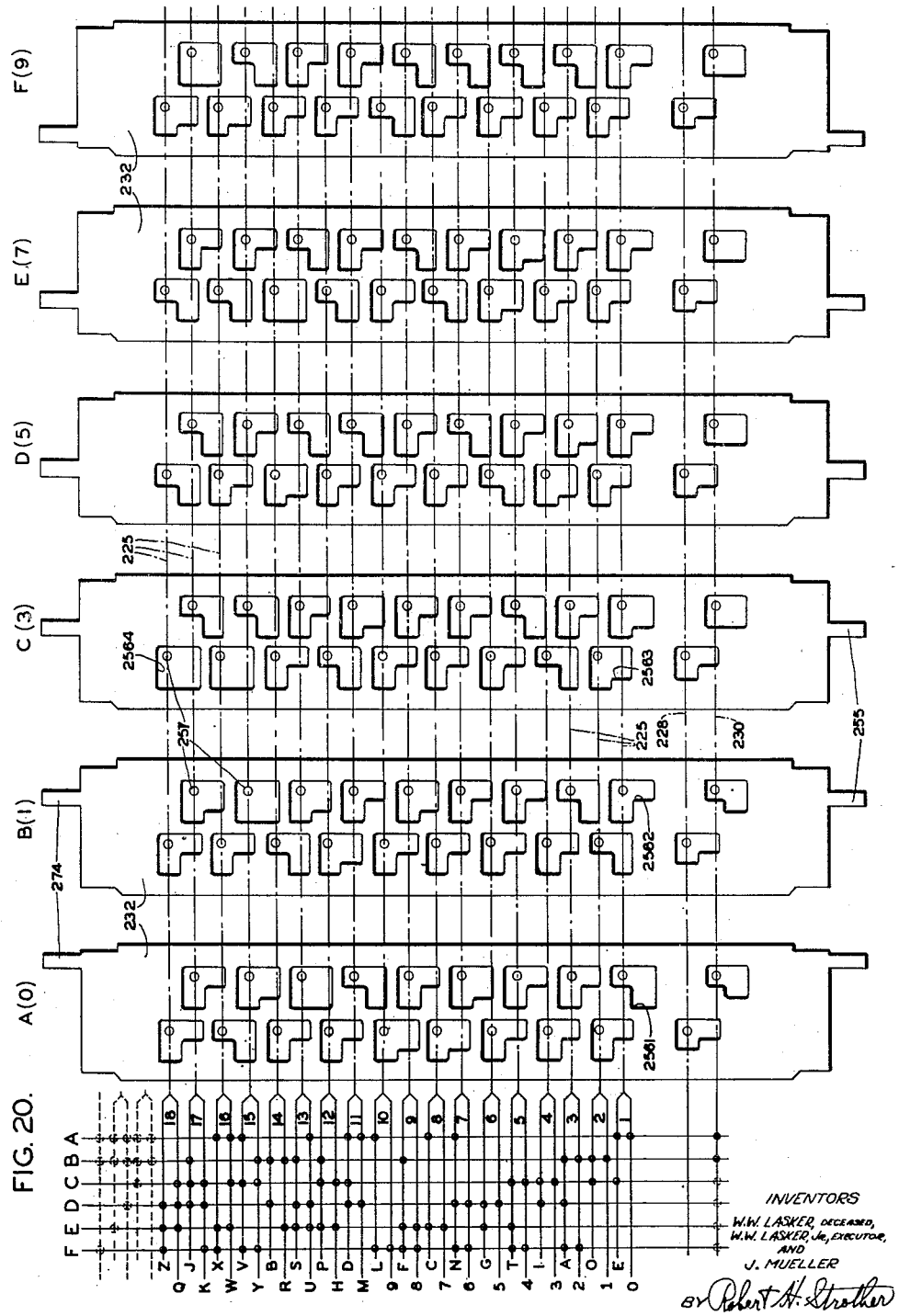

Fig. 20 is a schematic view illustrating in detail the six permutation bars controlling the stops for a type bar and showing also the combination code.

Fig. 21 is an isometric view of a totalizer with parts omitted or broken away.

Fig. 22 shows a detail of the totalizer in section and front elevation.

Fig. 23 is a view in section through two associated totalizers and cooperating mechanism, said totalizers being in engagement with their actuators and conditioned for subtraction, parts being shown as they would appear in the course of the return stroke of said actuators.

Figure 24:
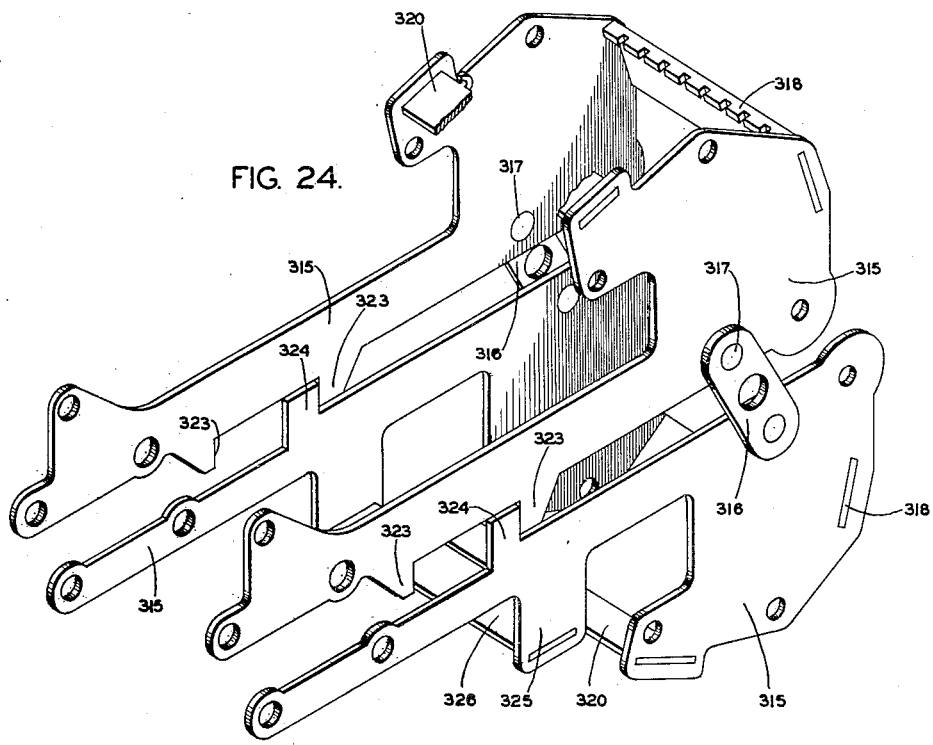
Figure 25:
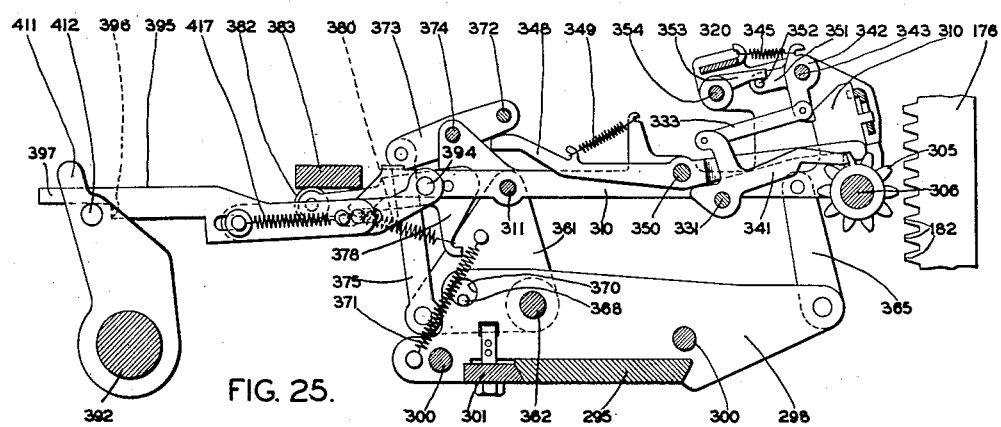
Figure 26:
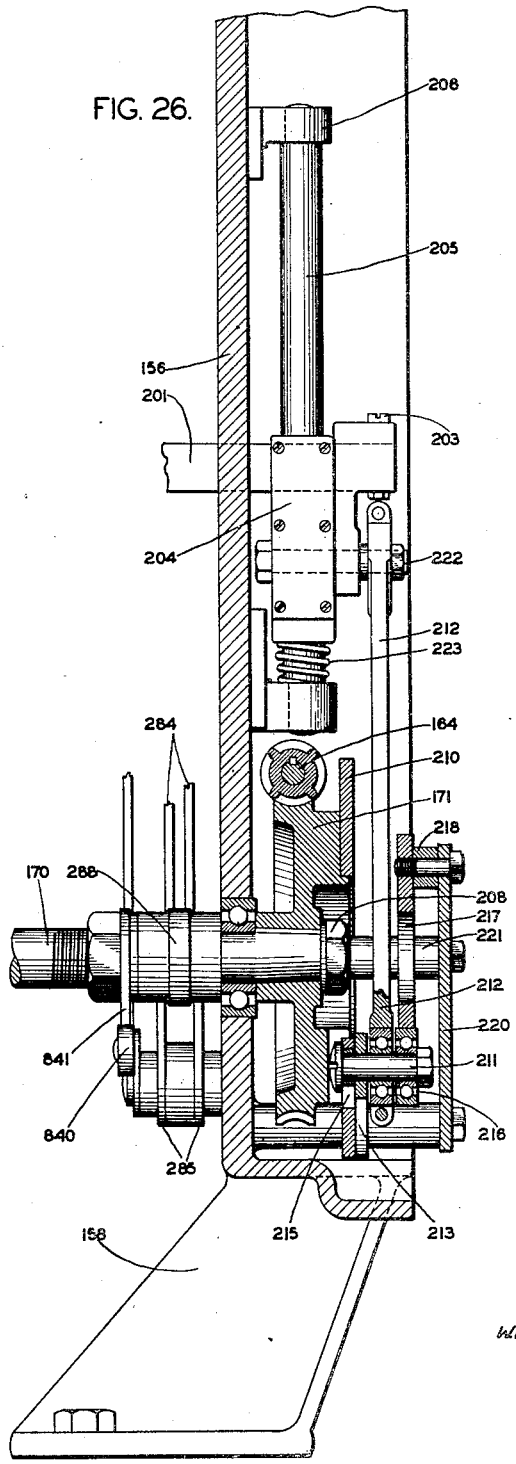
Figure 27:
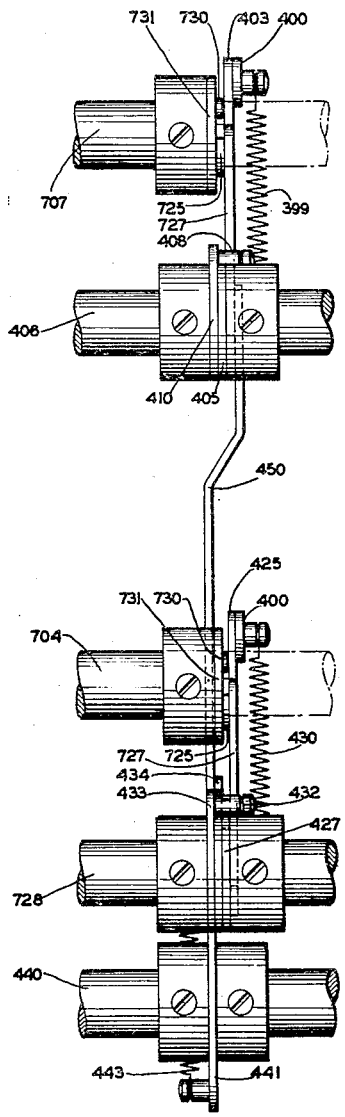
Figure 28:
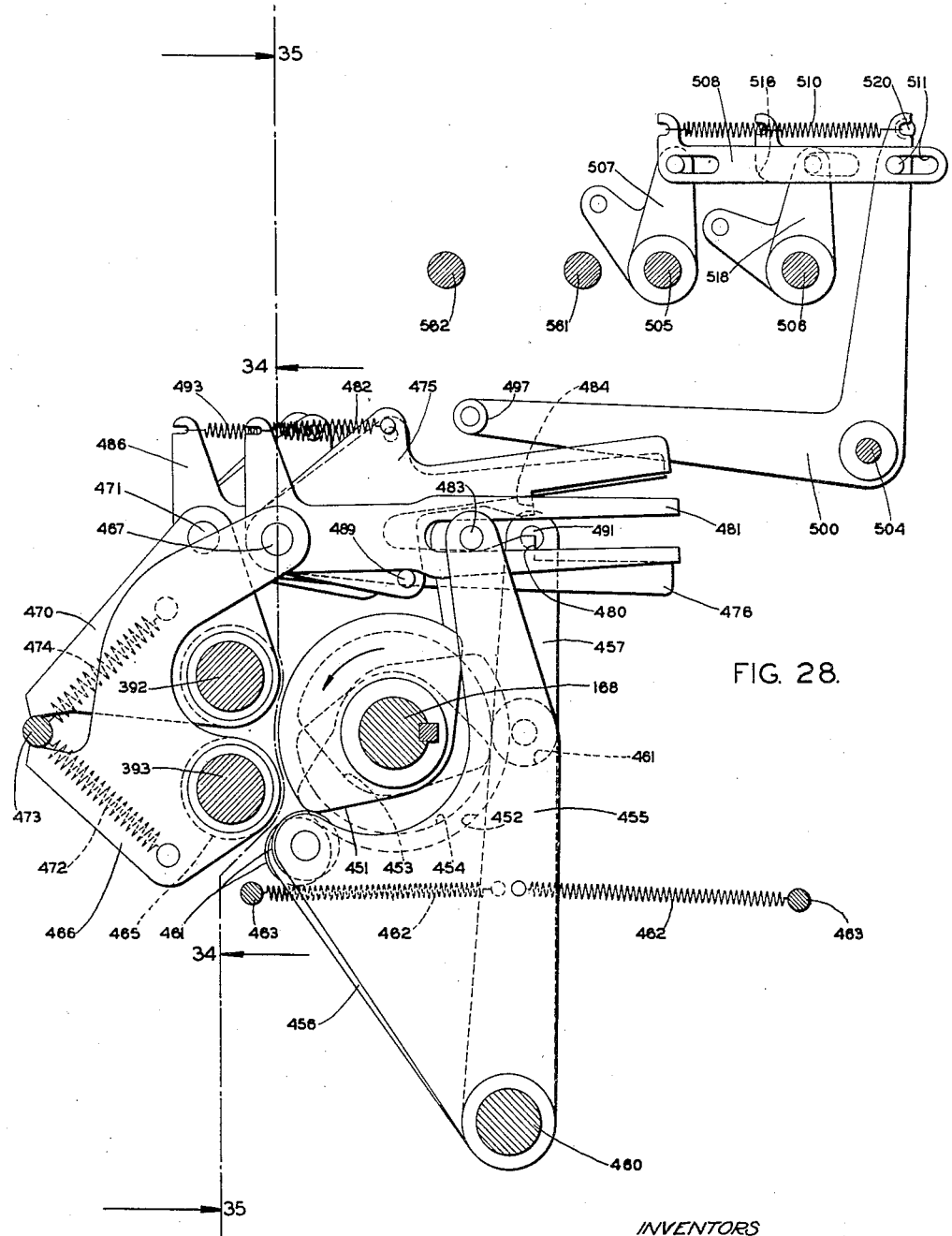
Figure 29:
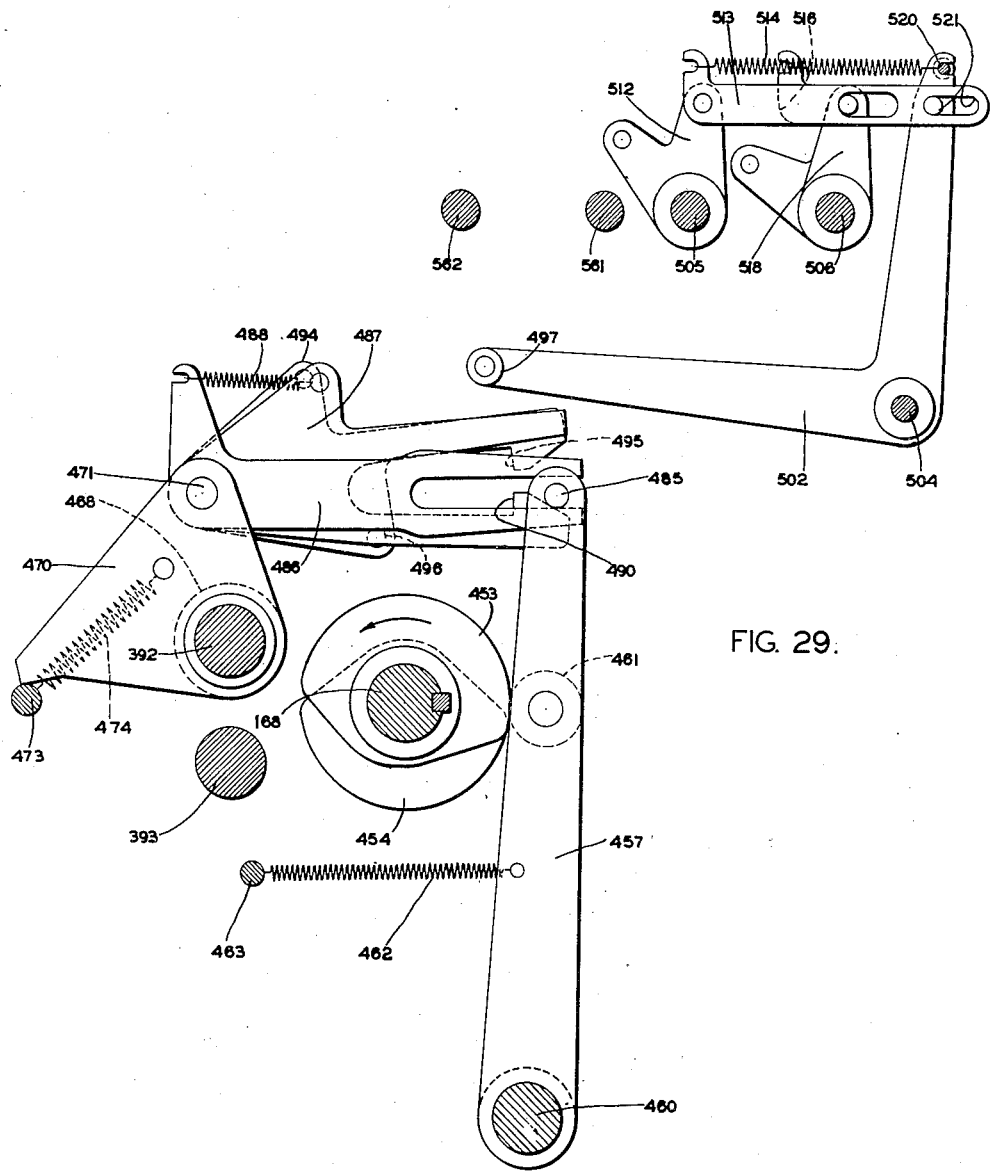
Figure 56:
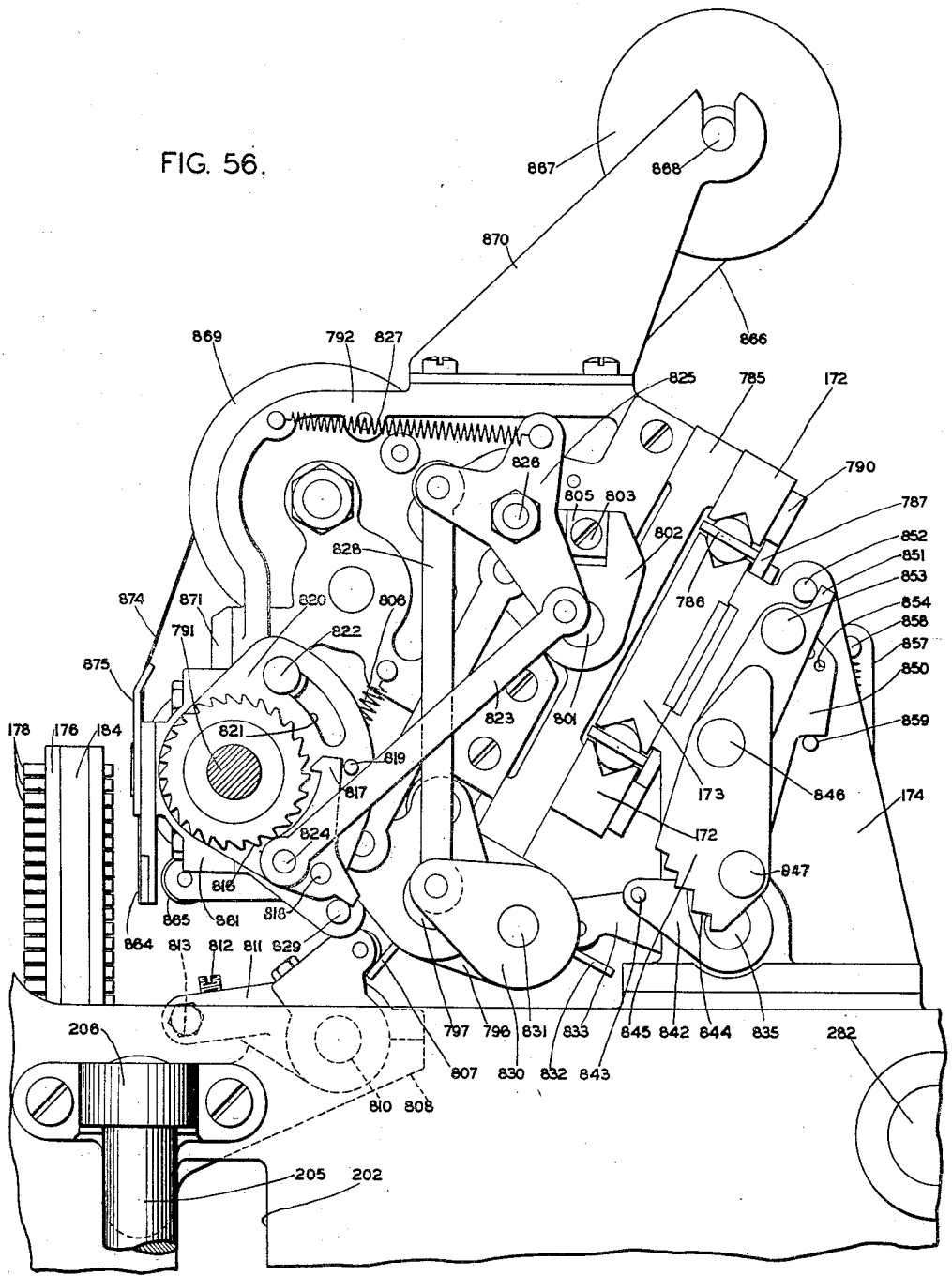
Figure 57:
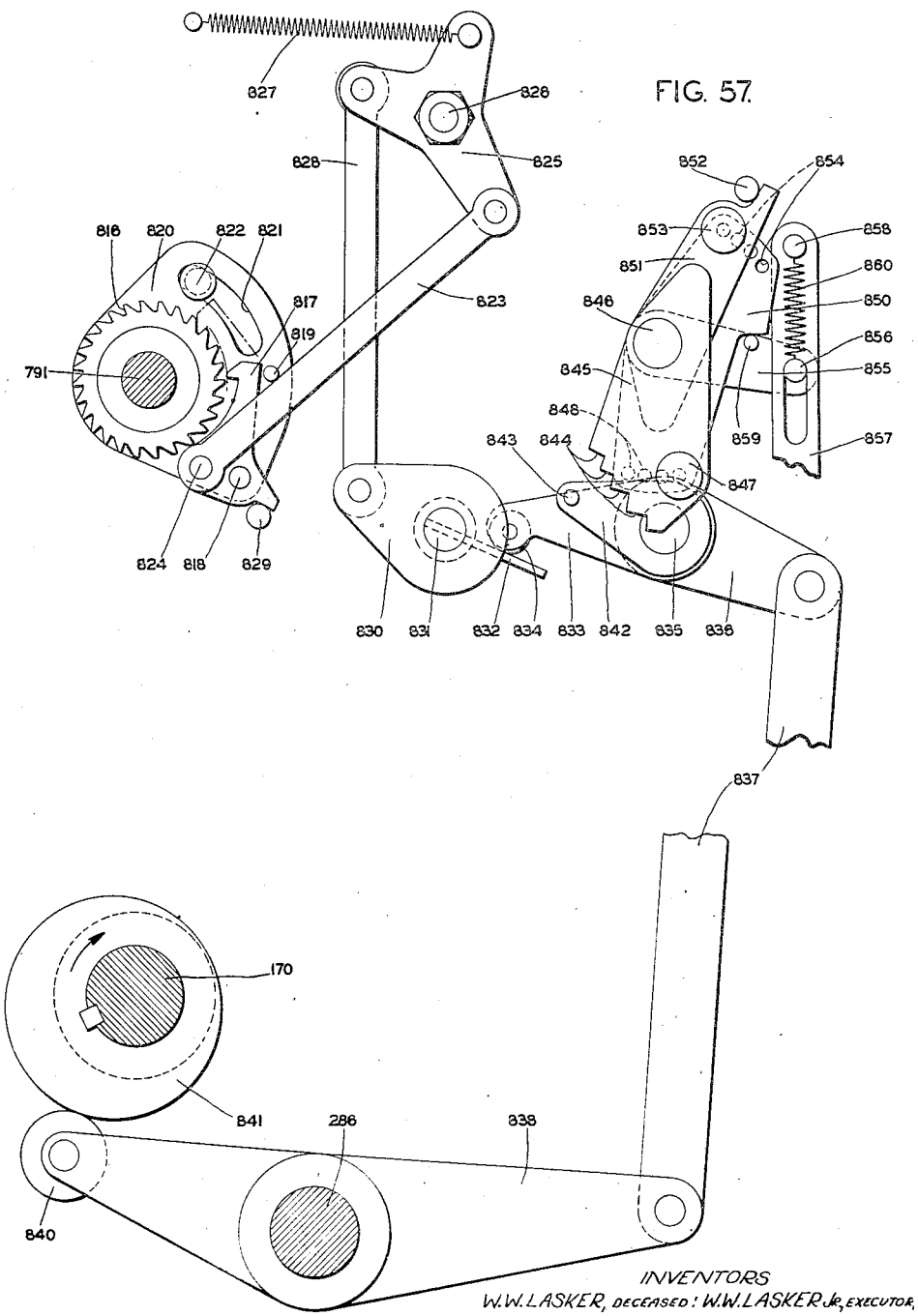
Figure 58:
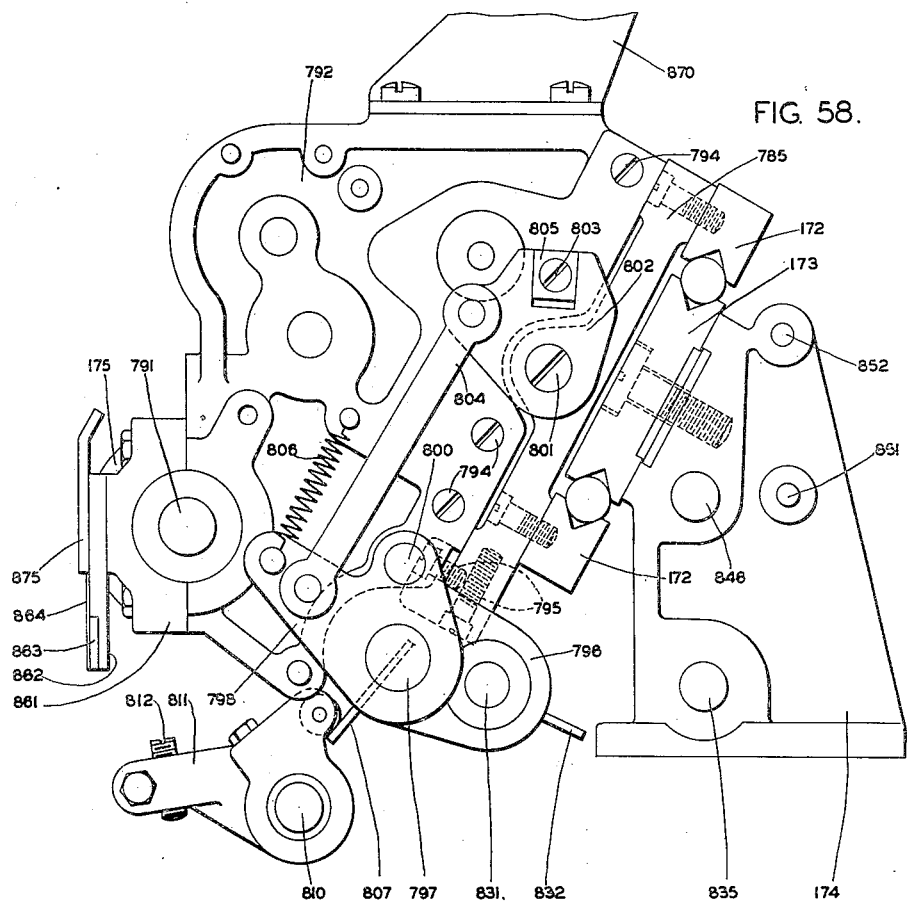
Figure 59:
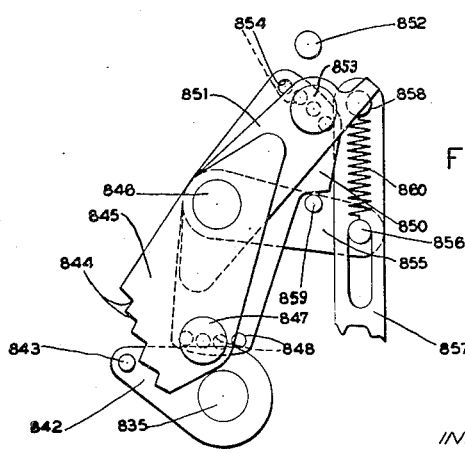
Figure 60:
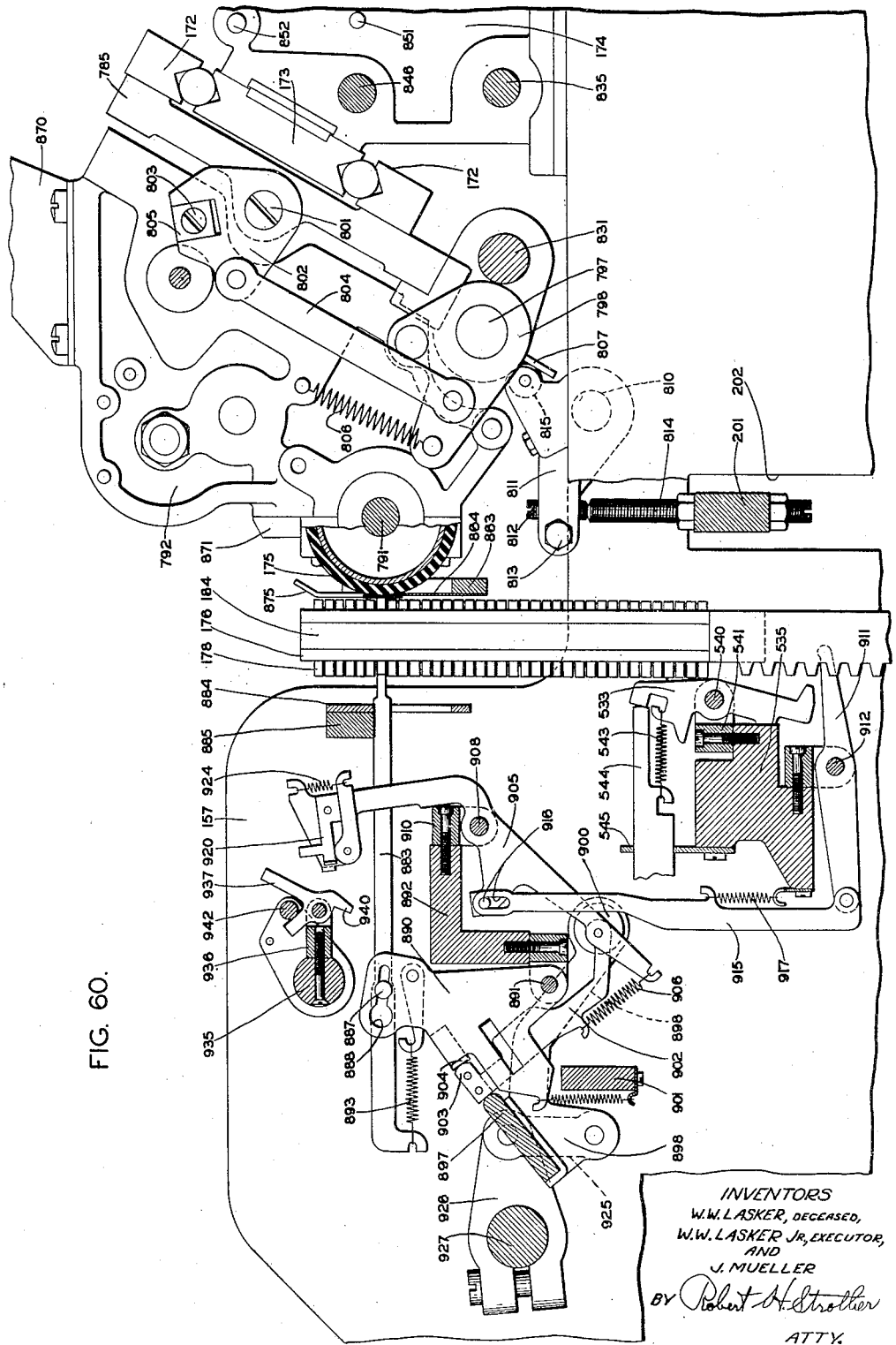
Figure 61:
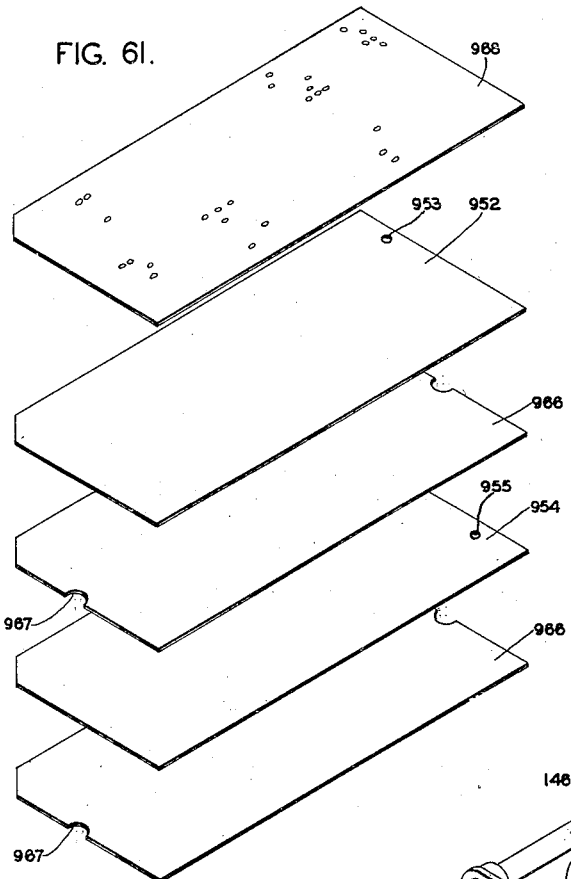
Figure 62:
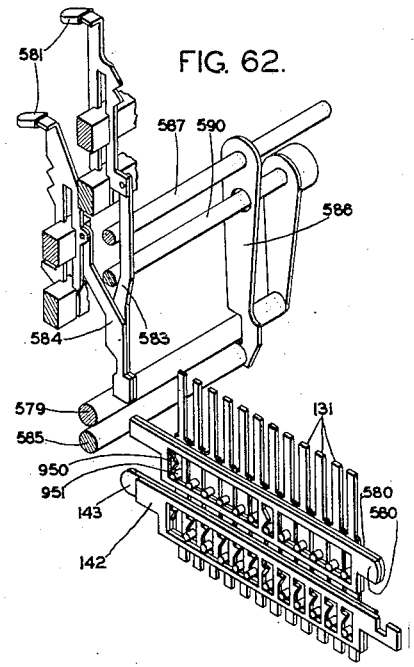
Figure 63:
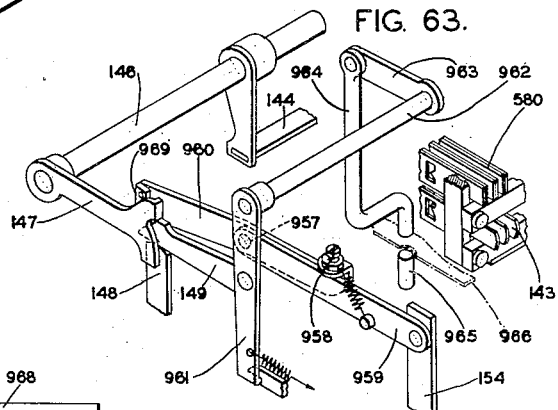
Figure 64:
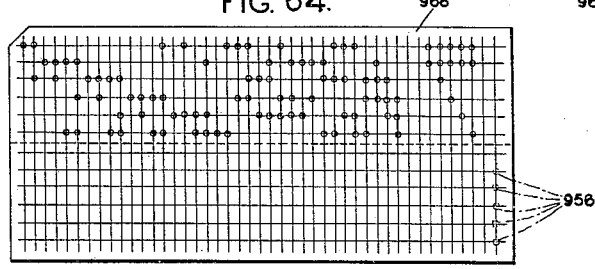

Fig. 24 is an isometric view showing the auxiliary frames of a totalizer;

Fig. 25 is a sectional view of a simplified totalizer so modified as to be incapable of direct subtraction;

Fig. 26 is a transverse vertical section showing the mechanism for reciprocating the restoring bar for the differential members which carry the types and actuate the totalizers;

Fig. 27 is a fragmentary front view of certain control mechanism;

Fig. 28 is a view in right-hand elevation of the cams and followers and associated mechanism for timing the totalizers for computation and for the taking of totals;

Fig. 29 is a view similar to Fig. 28 but with some of the parts omitted;

Figs. 30–33 are views similar to Fig. 28, but on a small scale and each showing only one train of mechanism for timing the parts for computation on and for total taking from the lower and upper totalizers;

Fig. 30 shows the timing mechanism for taking totals from the lower totalizers;

Fig. 31 shows the timing mechanism for adding on the lower totalizers;

Fig. 32 shows the timing mechanism for adding on the upper totalizers;

Fig. 33 shows the timing mechanism for taking totals from the upper totalizers;

Fig. 34 is a view in section on the line 34—34 of Fig. 28 and looking toward the front of the machine;

Fig. 35 is a view in section on the line 35—35 of Fig. 28 and looking toward the rear;

Fig. 36 is a plan view of the mechanism shown in Fig. 28, but with certain parts omitted;

Fig. 37 is an elevation in section and showing a modified and preferred form of control bar for the slam bail pawls;

Fig. 38 is a section on line 38 of Fig. 10 to illustrate a detail;

Fig. 39 is a view on a reduced scale and showing a sub-assembly including the mechanism peculiar to a single denomination of a totalizer;

Figs. 40–51 are illustrations of the total taking control mechanisms;

Fig. 40 is a right-hand elevation with a cover plate removed and some parts broken away. Fig. 41 is a rear elevation partly in section. Fig. 42 is a front elevation partly in section. Fig. 43 is a top view in section on the axes of the total sleeve. Figs. 44 and 45 are front views respectively of the means for clutching and unclutching the group total sleeve and the grand total sleeve. Figs. 46–51 are sectional views on the lines indicated by the corresponding numerals in Fig. 43, each of these figures showing a pair of cams and the immediately cooperating devices;

Figs. 52–55 are schematic views each tracing the train of mechanism operated by one of the pairs of cams shown respectively in Figs. 47, 49, 50, and 48;

Fig. 56 is a general end elevation of the paper carriage and some associated parts;

Fig. 57 is a view of the line space mechanism dissociated from the balance of the machine;

Fig. 58 is a right-hand elevation of the carriage and some associated parts and with many parts omitted;

Fig. 59 is a fragmentary view of the means for controlling the extent of line feed, the parts being in positions different from those in Fig. 57;

Fig. 60 is an elevation, partly in section, of the carriage and the printing mechanism taken at the instant of the impact of a type;

Fig. 61 is an isometric view of different cards used in the machine;

Fig. 62 is an isometric view of a portion of the change of designation mechanism;

Fig. 63 is an isometric view of certain devices for automatically stopping the machine;

Fig. 64 is a face view of a card; and

Figure 65:
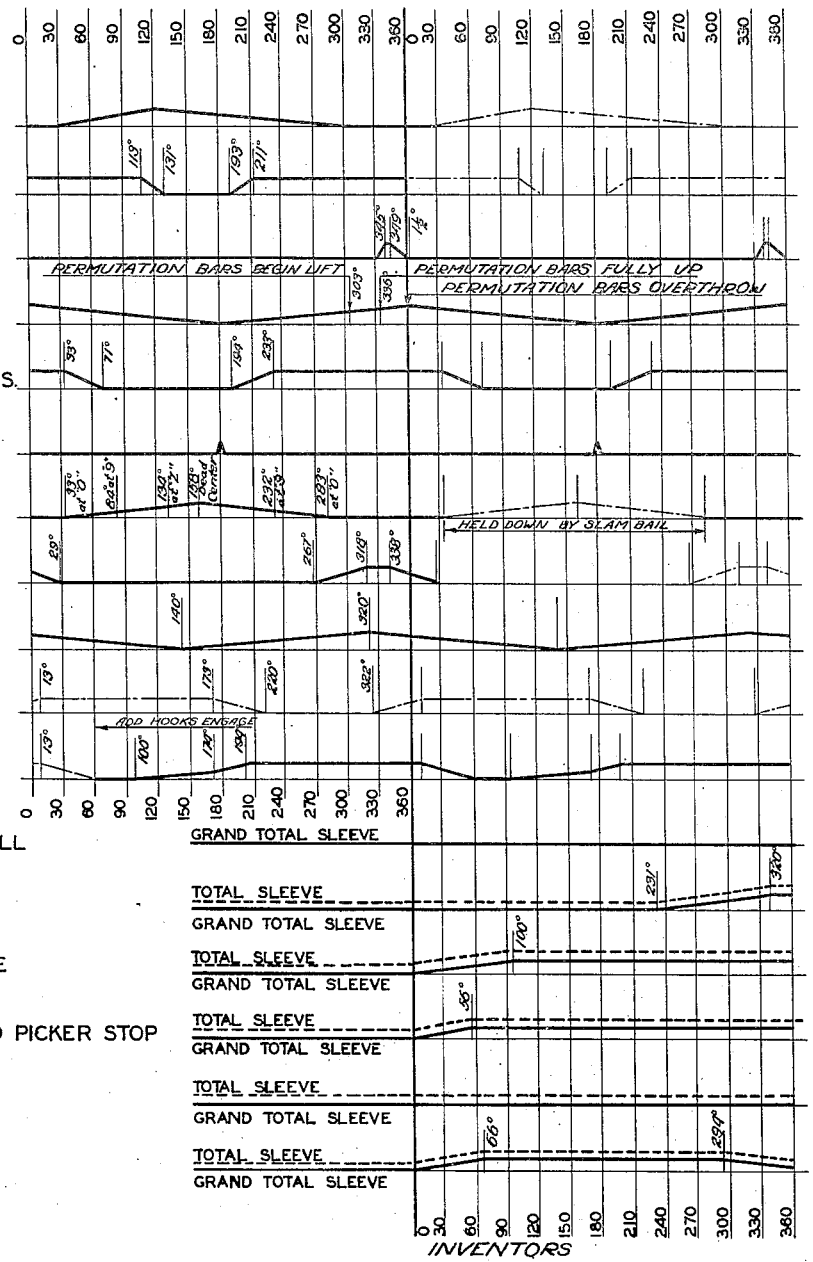
Figure 66:
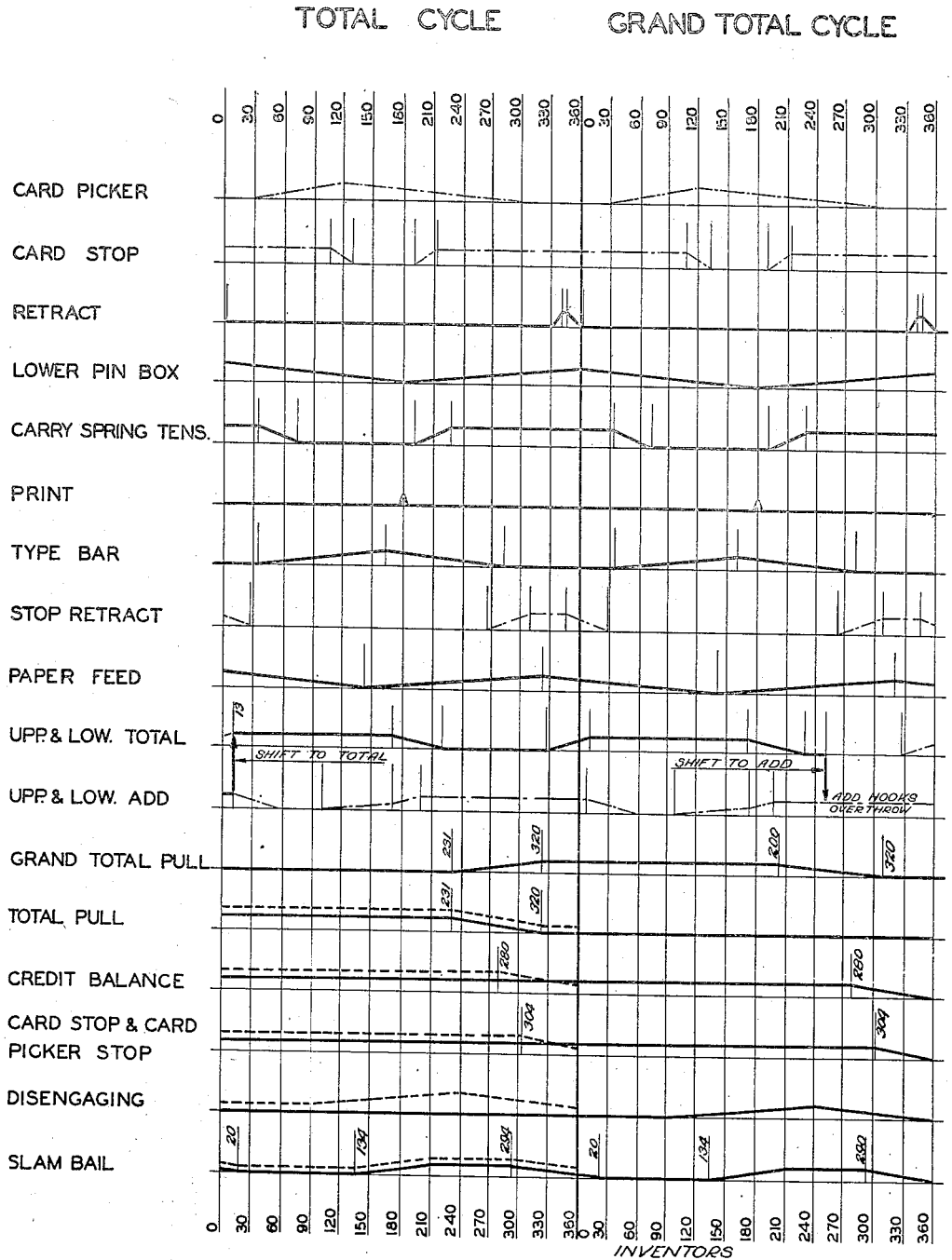

Figs. 65 and 66 together constitute a timing diagram of the machine.

Base section

The base section, partially shown in Figs. 1, 3, 4, 18, 62, and 63, is, with a few exceptions which will be noted, the same as in the regular manufactured Powers machine and, in its essential features of drive mechanism and card feeding and sensing mechanism, it is substantially that described in the patent to Lasker No. 2,044,119, dated June 16, 1936. The other mechanism of the base has been modified from said patent in some details unessential in the present case and it has also been modified in other respects which will be described hereinafter. The framework comprises a right-hand box-like end frame 101 and a left-hand box-like frame 102, in the former of which is journaled the worm shaft 103 driven from an electric motor by a belt 104, the pulley of which is connectable with the shaft 103 by a clutch controlled by a rock shaft 105, as usual in these machines. Also connectable with the shaft 103 is the usual hand-wheel 106. The card feed rolls 107 and skid rolls 108 are driven by worms on shaft 103 in the usual manner, as is also the main base shaft 110. Said main shaft carries the usual eccentrics 111 for reciprocating the sensing pin box 112 up and down on its guides 113. This pin box contains the usual sensing pins 114 and the locking slides 115 therefor, the latter slid to locking and retract positions by a bail mounted on a rock shaft 116 which is controlled by a fixed cam 129 in the same manner as in the said patent.

The base also contains the usual card hopper 117, receptacle 119 and picker 118, the latter reciprocated by an arm 120 on a rock shaft 121, which rock shaft has another arm 122 reciprocated by a link 123 connected to a rock arm 124 carrying a follower roller 125 running on the picker cam 126 on the main shaft 110, said cam retracting the picker to its forward position from which it is fed by a strong spring 127, all substantially as described in the said prior patent.

The set-pin box or registering pin-box 128 is, with respect to its framing and general organization, substantially the same as in the prior patent, but its mechanism has been modified from said patent in certain respects which will be pointed out in detail hereinafter. The card chamber 130 consists of a passage between the two lowermost plates of this unit. The set-pins are constructed and controlled as heretofore, and the card stop 132 is reciprocated as usual by two arms mounted on a rock shaft 134 which rock shaft in tabulating operations is rocked by a link 135 pivoted to a lever 136 connected by a link 137 with a pivoted arm 138 carrying a follower roller 140 running on the card stop cam 141 on the main shaft 110. As shown on the timing diagram (Figs. 65 and 66), this stop is raised to open the card chamber only for something like 85° of the cycle to allow the sensed card to be ejected as a new one is run into the chamber.

The set-pins 131 are locked in their elevated positions by certain slides 142 and 143, which slides have been modified, as will be described hereinafter. These slides are spring-pressed to active position and, at about the end of each cycle, are momentarily retracted by the rocking of a bail 144 whose arms 145 are mounted on a rock shaft 146 (Fig. 63). An arm 147, also mounted on the rock shaft 146, is adapted to be rocked upward momentarily by a link 149 operated by a push bar 148 pivoted at its lower end to a lever arm 150 carrying a follower roller 151 running on the retract cam 152. The construction and mode of operation are the same as in the prior patent.

The base contains the usual start and stop button 153, which, by means not shown, controls a link 154 which is pivoted to an arm 155 fast on left-hand end of the shaft 105, which at its other end controls the clutch to start and stop the machine. In recent machines the start and stop mechanism has been modified from that shown in the prior patent, but with no essential difference in result and with no difference that affects the present invention.

Figure 2:
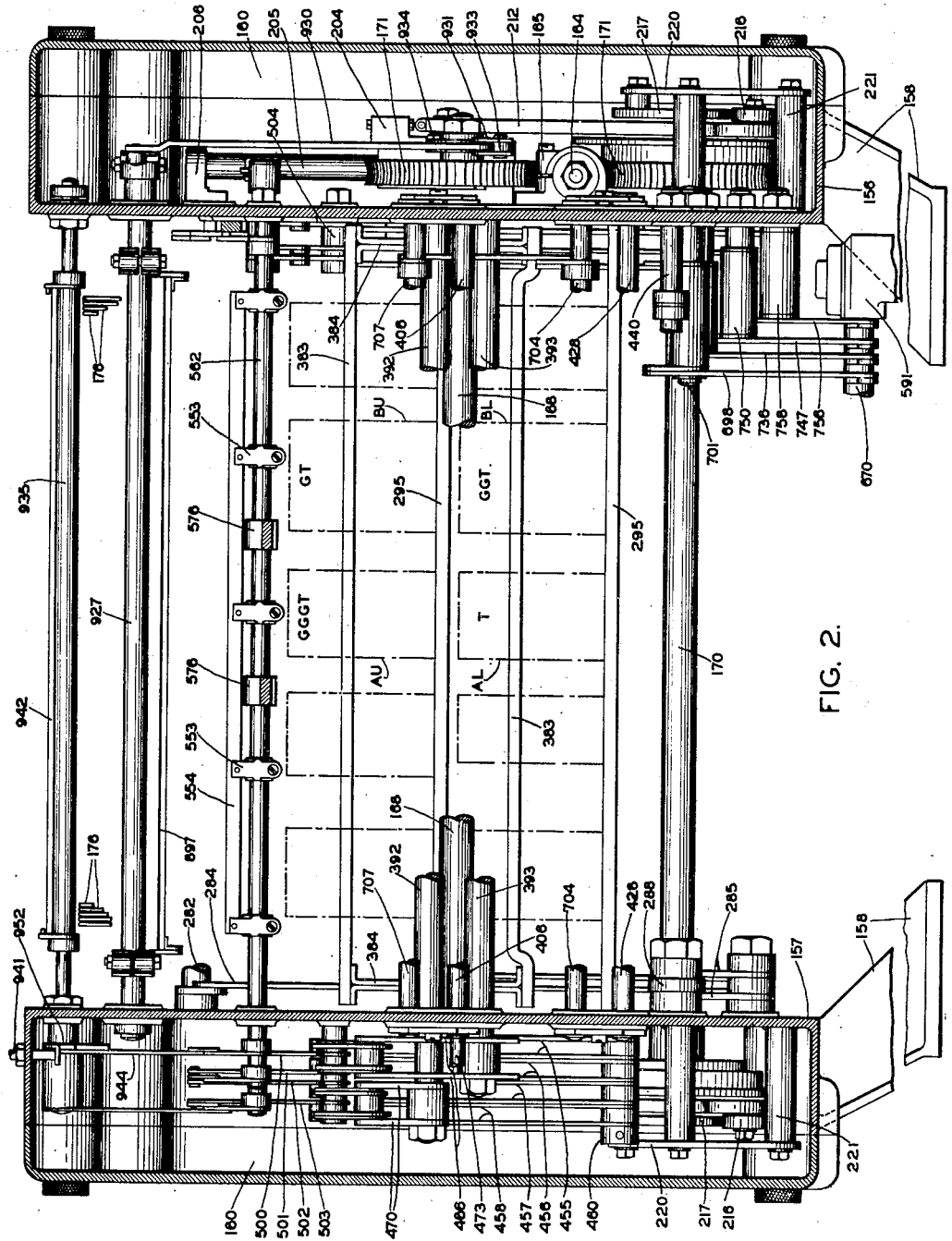
Fig. 2 is a partial front view of the head section with parts shown in section near the front of the machine and with many parts omitted or broken away.
Figure 3:
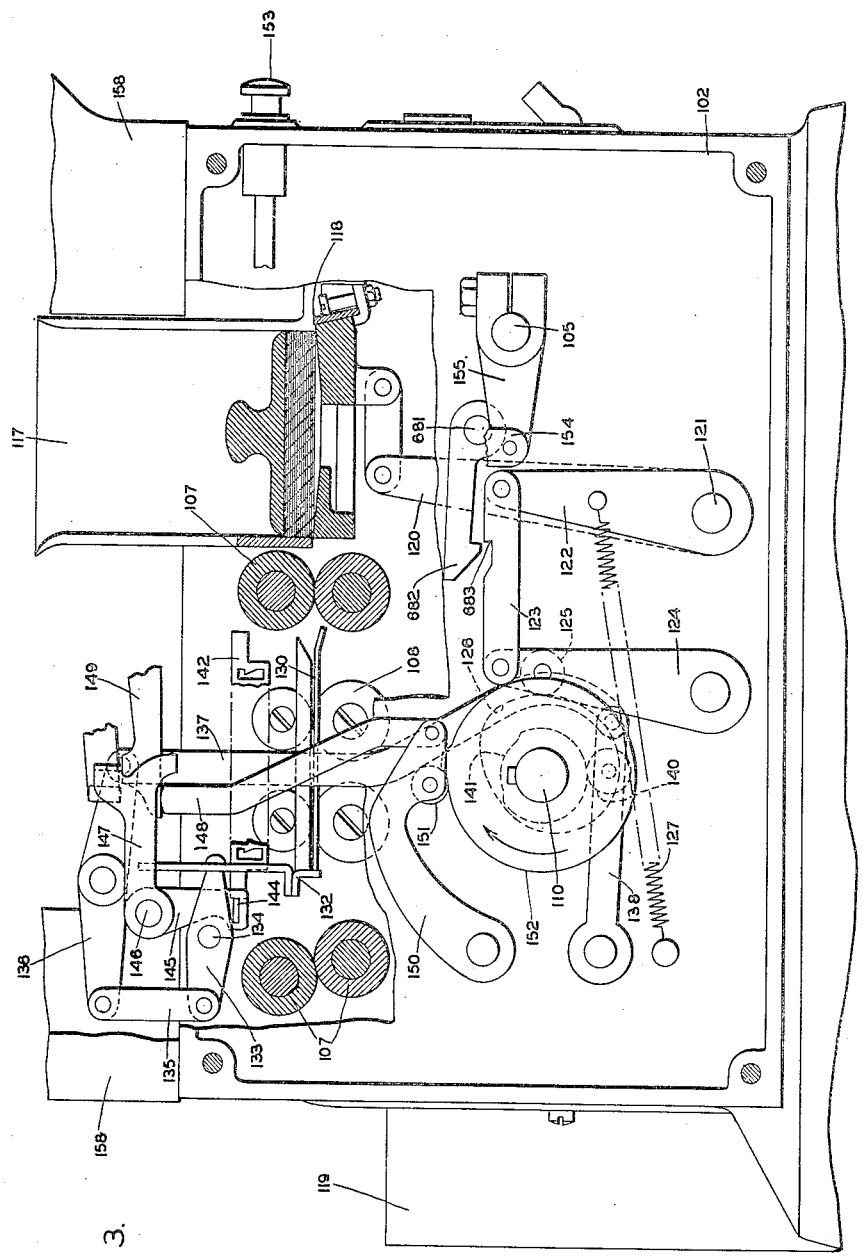
Fig. 3 is an elevation of the base of the machine as viewed from the left and with some parts shown in irregular section and with parts omitted.

The framework of the head has for its principal features a right-hand vertical box-like end frame 156 and a left-hand vertical box-like end frame 157 mounted by integral legs 158 on the tops of the right-hand and left-hand frame pieces 101 and 102, respectively, of the base framework, the intermediate section of the machine as heretofore manufactured being dispensed with. As the head is wider in a right and left direction than the base, the legs 158 flare outward and upward, as indicated in Fig. 2. Each of the frames 156 and 157 includes a vertical wall or web with flanges extending therefrom toward the outside of the machine and enclosing the most of the drive and control mechanism. The box in each instance is completed by a cover plate 160 removably secured in position by screws. The construction is such that the mechanism is enclosed and protected from dirt and also protected from entanglement with the clothing and hands of the operator but is readily accessible by removing said screws. The two end frames are connected by a number of frame rods and bars, most of which will be mentioned in detail hereinafter.

Figure 4:
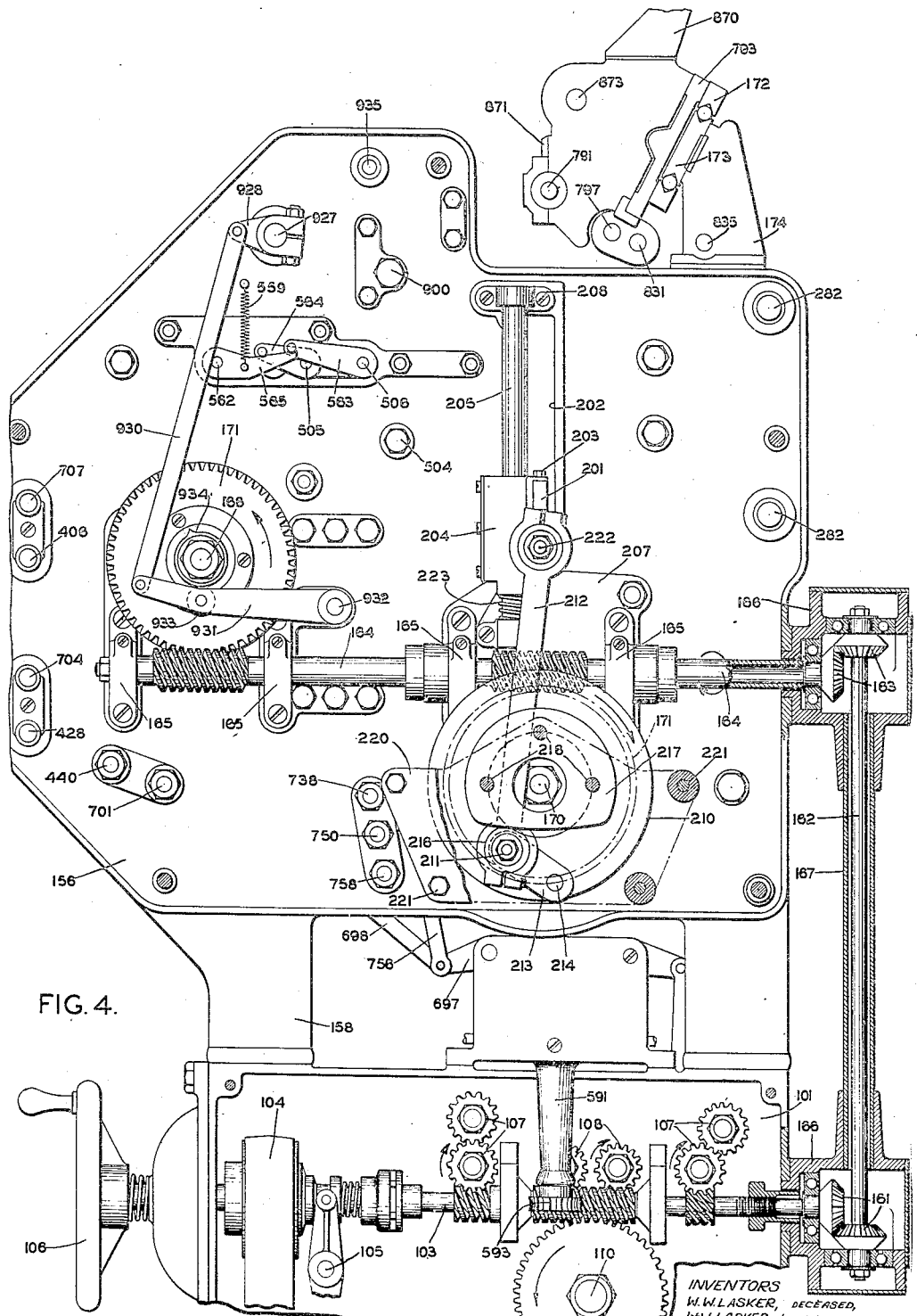
Fig. 4 is a right-hand elevation of the head and base section of the machine with the cover plates removed and with some parts in section.

The mechanism enclosed in the right-hand frame 156 is shown in Fig. 4 in which the cover is removed. The base worm shaft 103 is prolonged rearward and is connected by mitre gears 161 with a nearly vertical shaft 162, which at its upper end is connected by mitre gears 163 with a horizontal worm shaft 164 journaled at 165 in brackets secured to the web of the frame 156. The transmission gearing between the two worm shafts is journaled in two cast housings 166, each having a nipple entering a round hole in the flange of the base frame 101, or head frame 156, and these two castings are connected by a tube 167 surrounding the shaft 162. The openings in the castings 166 are closed by cover plates so that the whole train of mechanism is completely enclosed, but is readily accessible.

A front head cam shaft 168 and a rear head cam shaft 170 extend clear through the head, projecting into both the right-hand and left-hand frame boxes. In the right-hand frame each of these shafts carries a worm wheel 171 driven by a worm on the shaft 164. The front shaft 168 is above and the rear shaft 170 below the worm shaft, the former being driven counter-clockwise and the latter clockwise. Each of these shafts, like the main base shaft 110, makes one turn per machine cycle.

A paper carriage 172 is displaceably mounted on bearings on a rail 173 supported by two brackets 174, one mounted on top of each of the frames 156 and 157 at the rear thereof. Said carriage supports a platen 175.

A series of differentially settable type and rack bars 176 (Fig. 1) are arranged in front of the platen 175 and are slidable up and down on guide rods 177. Preferably there is a complete set of these differential bars, extending across the machine without interruption, although, of course, some of them may be omitted in particular instances, if desired. They are removable as will hereinafter appear. In the specific machine from which the drawings were made, there are one hundred of these bars. Each of them at its upper end carries a set of numeral and alphabet types 178. Thirty-six such types are shown in the present instance, one for each digit and one for each letter of the alphabet. Below the types each of the differential bars has its front edge cut into rack teeth 180 for operating totalizers designated generally 181. The spacing of the rack teeth is double that of the types. The numeral types, which are in the upper half of the set, therefore, alternate with alphabet types. The topmost type prints zero, the next one a letter of the alphabet followed by the numeral "1," another letter, the numeral "2," etc. The result is that the whole thirty-six types are arranged to be brought to printing position by a maximum upward stroke of about four inches. This short stroke, of course, makes for speed of operation.

The upper part of each differential bar 176 (Fig. 11) consists of an aluminum bar having a series of front to rear round holes therein, one for each type and said bar secured to the sheet metal rack portion of the bar by rivets 182. As best shown in Fig. 19, the types 178 have no returning springs. Each of them has a flat portion milled across at 183, and a retaining bar 184, dovetailed into the right-hand face of each bar 176, when slid into place from the top, engages the flat face of each type and prevents the types from coming out of the bar, prevents said types from turning in the bar, and limits the sliding movements of the types in printing. This bar 184 can be slid out of the top of the type bar and any type can then be removed and replaced by another very easily without removing the type bar from the machine. The whole construction is extremely simple, light and inexpensive.

The lower or rack portion of each bar 176 is preferably made of light sheet steel. In order to guide it on the vertical rods 177 (Figs. 16 and 17), it has near its middle an extension 185 riveted or welded thereto, said extension containing two vertical holes through which guide rods 177 pass. At its lower end each bar has another rearward extension 186 which is guided on the forward one of the two rods 177. The arrangement of these rods will be best understood by reference to Fig. 19, which shows how they are staggered into two sets in order to find room for them transversely of the machine.

The supports for the guide rods 177 are as follows:

Each of the frames 156 and 157 has secured to its inner face a bracket 187 (Figs. 5 and 6), each of said brackets extending inward so as to clear certain other devices located between each bracket and the face of the end frame. On the forwardly and rearwardly projecting arms of these brackets are mounted the ends of two transverse frame bars 188 and 190. A horizontal plate 191 screwed to the bar 188 (Fig. 16) is perforated for the reception of the upper ends of the guide bars 177. A block 192 (Figs. 5 and 6) is bolted to the inner face of each of the frames 156 and 157 and bolted to these blocks are the ends of two transverse frame bars 193 to which (Fig. 17) is secured a transverse plate 194 perforated to receive the reduced and shouldered lower ends of the guide bars 177. Each bar 176 is moved upward by a compression spring 195 surrounding its rear guide rod 177.

Figure 5:
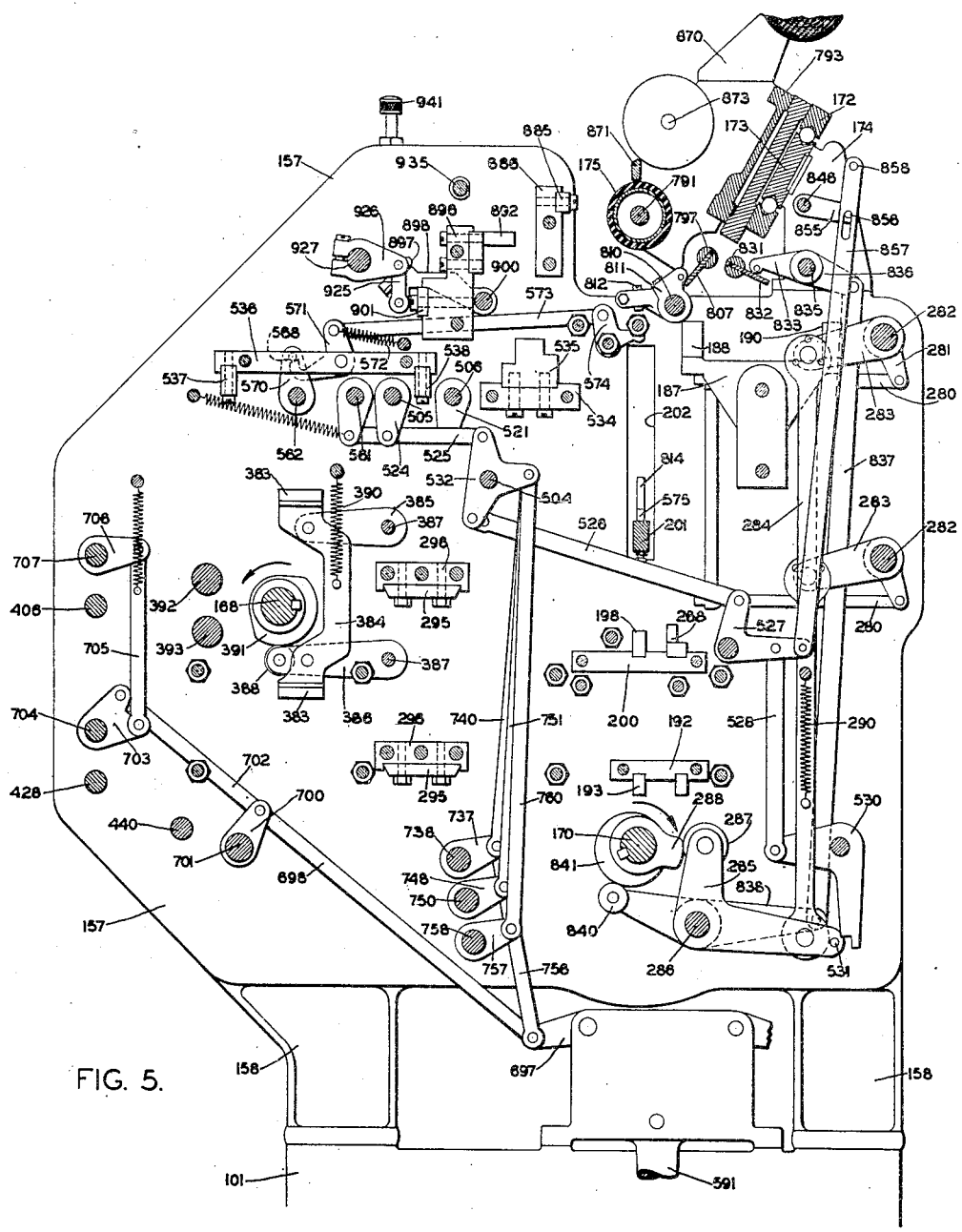
Fig. 5 is an elevation showing the mechanism just inside the right-hand end frame of the head, many parts being in section just inside of the said frame.

As best shown in Figs. 16 and 19 a guard plate 196 is secured by screws over the upper ends of the guide rods 177 to prevent displacement thereof. As shown in Fig. 16 each of the front rods 177 is guided about midway of its length in a perforated plate 197 secured to a cross bar 198 which, in turn, is secured to two blocks 200, one bolted to the inner face of each of the frames 156 and 157 (Figs. 5 and 6). This plate 197 is a little below the lowest position of the guide arm 185 and a little above the highest position of the guide arm 186 (Fig. 23). For convenience of assembly and repair, each of the plates 196, 191, 197, and 198 is preferably made in a series of short sections, each section separately screwed to its supporting cross bar. In the specific machine illustrated, these plates, as well as certain other units to be mentioned hereinafter, are made of a width of ten type bars each.

Any differential bar 176 may be removed from the machine with but little trouble. This involves removing the plates 196 and 191 with which said bar is associated and lifting the two guide rods 177 vertically out of their supports. It is also necessary to remove the restoring bar 201 presently to be described. The differential bar is then free to be lifted out of the machine, and it, or another one, can be replaced by reversing the process.

The mechanism for moving the differential bars 176 up and down comprises a horizontal restoring bar 201 located just above and controlling all of the guide arms 185. This bar projects at its ends through vertical slots 202 in the webs of the two end frames 156 and 157 (Figs. 4, 5, and 6) and at each end it is secured by a bolt 203 to a sort of cross head 204 (Figs. 4 and 7), each cross head mounted to slide up and down on a round guide rod 205, said guide rod being supported in upper brackets 206 and lower brackets 207 bolted to the outer face of the web of the respective end frame.

The cam shaft 170 (Figs. 4 and 26) has the worm wheel 171 secured thereon by a nut 208. On the outer face of this wheel there is bolted a disc 210 which performs the functions of a crank disc as it carries crank pin 211, which is connected by a pitman 212 with the right-hand cross head 204. Adding is done on the down stroke of the rack and it is desired to have the restoring bar 201 remain in its lowermost position for a sufficient interval to allow for certain operations including that of a spring driven transfer mechanism. In order to achieve this result the crank pin 211 is not connected directly to the disc 210, but is mounted on a link 213, which is pivoted to the disc at 214. The pin 211 is prolonged into a radial slot 215 in the disc 210, the length of which slot limits the oscillation of the link 213 on its pivot. Said pin is also prolonged outward and has mounted thereon a follower roller 216 running on a fixed cam disc or guide plate 217, which is bolted at 218 to, but spaced from, a fixed plate 220, which, in turn, is mounted on posts 221, from the web of the frame 156. The posts 221 space the plate 220 away from the web of the frame, as shown in Fig. 26. The cam plate 217 is made as shown in Fig. 4, that is to say, in its upper part it is concentric with the shaft 170 and at its lower part it is concentric with the lowermost position of the pivot 222, joining the pitman 212 with the slide 204. The parts are shown in Fig. 4 in their stop position. As the shaft 170 and the parts mounted thereon rotate clockwise from this position the roller 216 running on the lower part of the disc 217 at first causes the pitman 212 to swing idly about its pivot 222, the slide 204 and restoring bar 201 being stationary. When the roller 216 reaches the corner of the plate 217, the pin 211 will have reached the outer end of the slot 215 and can swing outward no further. It will, therefore, follow the concentric outline of the disc 217, causing the pitman to reciprocate the slide 204 as if the pin were fast upon the disc 210. This will continue to the top of the stroke and, until, on the down stroke, the roller 216 reaches the right-hand corner of the disc 217, at which time the slide 204 will have reached the bottom of its stroke, being arrested by a very stiff spring 223 surrounding the guide rod 205. The slide will, therefore, stop descending and from then on the pitman will merely swing about its pivot 222, the pin also swinging about the pivot 214 of the link 213, being held firmly against the under edge of the cam disc by the spring 223 which is slightly compressed. By this device, the restoring bar 201 is stationary at the bottom of its stroke for about 110° of the cycle. The construction above described is duplicated at the left-hand side of the machine, the disc 210 (Fig. 7) being secured to a special wheel not shown.

The stops for controlling the differential movements of the bars 176 are illustrated in Figs. 1, 16, 19 and 20. Said stops consist of spring-pressed slides 225 arranged in the rear of the differential bars and adapted to be moved forwardly each to two different distances, namely, to a full distance in which the stop will arrest the top edge or shoulder 226 of the guide arm 185 and to a half distance in which the stop will arrest a lower shoulder 227 of said arm. The vertical distance between these two shoulders is equal to the space between two of the types 178 and the vertical distance between two of the stops 225 is, therefore, equal to that of two said types and is equal to the spacing of the rack teeth 180. In the present machine, therefore, there are eighteen of these stops 225, these being the uppermost eighteen of the twenty shown in Fig. 16. The two lowermost ones 228 and 230 are special stops for preventing any upward motion of the differential bar, as will be explained hereinafter. The forward motion of each stop by its spring 231 is controlled by a set of six so-called permutation bars 232, which are pushed up under the control of the sensing pins 114 and the set pins 131, through the intermediary of a translator.

The translator, designated generally 233 (Figs. 1, 9, and 17), bears a general resemblance to translators heretofore employed in the Powers tabulator, although it has a slightly different shape, due to the relative positions of the set pins 131 and permutation bars 232. It comprises a frame consisting of two castings 234 suitably connected and to which is secured a bottom plate 235, which latter can be slid into and supported by the grooved rails 236 common in Powers tabulators and described in prior Patent 2,044,119; and it is releasably latched in place in said rails by manipulation of the finger pieces 237, the same as in the prior patent. Screwed to the bottom of the frame 234 is a perforated plate 238 which, by posts 240, supports a second perforated plate 241, said plates supporting a set of shouldered pins 242, which register with and are operated by the set pins 131. A cross bar 243 of the translator frame supports a third horizontal plate 244 having screw-threaded holes registering with the pins 242 and in the said holes are screwed the nipples 245 of Bowden wires 246 which transmit the movements to the upper part of the translator. The nipples 247 of the upper ends of these Bowden wires are screwed into a plate 248 secured near the upper end of the translator. At the top of the translator is a pair of plates 251 and 252 secured together by posts 253 and carrying a set of pins 254 which register with the Bowden wires, and are adapted to transmit their movements upward. Each of these pins 254 is made with a shoulder and is provided with a compression spring to restore it and its associated Bowden wire 246 and pin 242 to normal position. These pins 254, when the translator is in the machine, stand respectively below the toes 255 of the permutation bars 232.

The illustrated machine is arranged to handle the now well known Powers 90-column card, which is divided into upper and lower zones, each vertical row of index positions being divided into two columns of six positions each. In Powers tabulators heretofore, the alphabet code employed required the use of all twelve index positions in a vertical row on the card. In the present machine, the alphabet as well as the numerals are all worked out in a six-point code, thus greatly increasing the capacity of the card. The six-point code is worked out as shown in detail in Fig. 20, by the different shapes of openings 256 in the permutation bars. These bars are of thin sheet metal, the six bars of a set being stacked face to face, as shown in Fig. 19. For the sake of compactness, the sets of permutation bars and of stops are arranged in pairs in which one set of permutation bars stands in edgewise relation in front of the other (Fig. 19), and the two sets of stops 225 lie one on each side of these two sets of bars. In Figs. 16 and 19, each stop bar 225 in the set nearest the observer has a pin 257 projecting into the appropriate openings 256 in the rear set of permutation bars and each stop 225 of the tier on the opposite side of the bars 232 has a pin 257 projecting toward the observer and into the corresponding holes of the forward set of bars 232. This may be expressed by saying that the rear sets of permutation bars (the right-hand set in Figs. 16 and 19) control the odd numbered denominations and the forward sets of permutation bars control the even numbered denominations. For convenience of manufacture and repair the permutation bars 232 and stop bars 225 are assembled in a series of units, each unit, in the present instance, consisting of ten denominations. The frame work of each unit comprises four short bars or blocks 258, one at each corner of the frame, and to which are secured an upper horizontal plate 260 and a lower horizontal plate 261 in suitable slots of which the permutation bars 232 are arranged to slide up and down, a set of six of such bars occupying each slot, and each such bar being formed as shown with a shoulder 262 normally resting on the plate 261 and at its upper end a similar shoulder limiting the length of its upward movement. Screwed to the blocks 258 are also a front vertical plate 263 and a rear vertical plate 264 with suitable openings to guide the ends of the stops 225, 228, and 230, the springs 231 being compressed between the plate 264 and shoulders on the stop bars. In order to withstand the pressure of these springs, the plate 264 may be stiffened at its rear face by a rib 265.

Each unit is detachably secured in the machine by securing the upper bars or blocks 258 to the cross bars 188 and 190 already referred to, by screws 267; and by securing the front vertical plate 263 at the bottom by two screws to the upright flange of an L-sectioned cross-bar 268 (Figs. 5, 6, and 16), which is bolted to the same frame blocks 200 as the bar 198. In the present machine there are ten such units, and it will be apparent from what has been said and from the following description, that any of these units may be readily removed from the machine by first removing the translator and then loosening a few screws and disconnecting certain parts.

In order to restore the permutation bars to their lower position, pin boxes are provided individual to each permutation bar unit and each consisting of a plate 270, removably screwed to the upper surface of the bars 188 and 190 and carrying by means of frame pieces 269 another plate 271, the said two plates guiding pins 272, which, between the plates, are shouldered and co-act with the compression springs 273.

Each of the permutation bars is provided at its lower and upper ends with fingers 255 and 274 respectively, which, when the bars are assembled, necessarily assume an oblique line. In order to overcome this condition and to afford proper co-operation between the fingers and the pins 254 and 272, ears 275 are suitably bent off said fingers, said ears standing as shown in Figs. 16 and 19 in rows in vertical alignment with the pins 254 and 272.

In order to retract the stops 225, 228 and 230, to the inactive position shown in Fig. 16, the following mechanism is provided. Each of said stops has a short lug or extrusion 276 near its forward end, the lugs for each pair of adjacent columns projecting (Fig. 19) from the proximate faces of the stops in position to be acted on by a common vertical bar 277. There are five such bars in each of the detachable units, said five bars being all strung at their ends on two short rods 278, each such rod being of a length appropriate to its unit. Also strung on each of these rods are two long links 280, each at its forward end guided in a slot in the plate 263, and each at its opposite end pivoted to an arm 281 fast on and projecting downwardly from a rock shaft 282. There are an upper and a lower shaft 282 and there is an arm 281 on each rock shaft for each detachable stop unit, as shown on Figs. 9 and 19. The construction is such that, by rocking these two shafts counter-clockwise in unison, the links 280 may be caused to draw all of the bars 277 rearward and retract all of the stops as shown in Fig. 16, leaving the permutation bars 232 free to move up and down without contact of the pins 257. Said shafts are rocked in unison for this purpose by the means shown in Figs. 5 and 6. The shafts are journalled at their ends in the end frames 156 and 157 and each of them has near each end, that is to say, just inside each of the said end frames, an arm 283 connected by a link 284 with a bell-crank 285 pivoted on a stud 286 and having a follower roller 287 cooperating with a cam 288 on the rear head drive shaft 170. These cams are so timed as to retract the stops during the latter part of each cycle, the time including that during which the permutation bars 232 are being moved upward. The stops are allowed to move out to active position quite early in the next cycle, and at a time when the sensing pin box 112 is near the top of its motion. The parts are restored to normal position by springs 290 (Figs. 5 and 6), each connecting a stud on the end frame with a stud on a link 284. As shown in Fig. 19, the two bars 280 (upper or lower) of each unit are connected to the opposite sides of the same arm 281. When a unit is to be removed, these bars may be sprung off of their pivot studs. If any unit is not needed in any particular machine, the two arms 281 may be omitted.

Referring to Fig. 16, the springs 231 are light, but there is a large number of them, and their total pressure is considerable. In order to prevent this stress from springing the framework and the shafts 282, castings 291 are provided, the shafts passing loosely through holes in the castings. Each of these castings comprises a vertical bar extending from one shaft to the other and each of them at its top has a sort of foot 292, the forward end of which abuts and is secured to the frame bar 190, and at its lower end each of said castings has a foot 293 lying against two of the plates 264. Two screws 294, the proximate one of which is shown in Fig. 16, pass through this foot 293 and take the place of two of the screws by which the plates 264 are fastened to the blocks 258 (Fig. 9). The stress of the springs tends to bend the frame bars rearward and the shaft forward, and these pieces 291 balance these stresses against each other at intervals across the machine.

The permutation bars 232 are shown in detail in Figs. 16 and 20. The code is worked out in the configurations of the left-hand edges of the openings 256. In order to provide ample room for movements of comfortable length, said openings are staggered in two rows in each bar. The pin 257 of the uppermost bar 225 in Fig. 16 passes through the topmost openings 256 in the front row and the pin 257 of the second bar enters the openings in the rear row; and so on down the series.

It will be noted that said openings are of several shapes. The one in bar A marked 2561 in Fig. 20 is adapted to lock the pin 257, and, therefore, the stop 225 in retracted position, unless said bar A is raised. If said bar is raised, said stop as far as this permutation bar is concerned, can move its full distance to cooperate with the upper shoulder 226 of the differential bar. The opening in bar B lettered 2562 has the opposite effect and it will be noticed that this opening does not prevent movement of the pin 257 unless bar B is raised, in which latter event the stop is locked. The opening in bar C marked 2563 does not prevent the stop from moving its full distance if the bar C is not raised, but, if said bar is raised, it will limit the movement of the stop to a half movement, causing it to cooperate with the shoulder 227 and, therefore, allow the type bar 176 to advance one type space higher.

The construction is such that the lowermost stop 225 cannot advance at all unless bar A is raised. Even if bar A is raised the stop will not advance if bar B is also raised or any other bar (D, E, or F) having an opening like 2562. If bar A is raised alone, the stop will advance its full distance and arrest the bar 176 at O. If both A and C are raised and no other bar, the stop will advance a half step and an E will be printed. The square opening 2564 allows the associated stop 225 freedom to advance whether the permutation bar C rises or not. It will be convenient to refer to holes like 2561 as full-step holes, 2562 as locking holes, 2563 as half-step holes, and 2564 as indifferent holes.

A six-point code, using 1, 2, and 3 points at a time, has 41 possible combinations, viz., 6 one-point, 15 two-point, and 20 three-point combinations. In the machine illustrated, the combinations AB, ABC, ABD, ABE, and ABF are reserved for special uses, leaving for the 10 numeral and 26 alphabet characters, 6 one-point, 14 two-point, and 16 three-point combinations. In these machines numerals are used so much more than letters that it is desirable to represent them by one- and two-point combinations. Also, it is desired to preserve in this machine the already established Powers numerical code in which the 6 one-point combinations are used for the 0 and the odd numerals and the four even numerals are represented by the two-point combinations BF, CF, DF, and EF. For obvious mechanical reasons, the first ten stops 225 counting from the bottom, are used to determine numerical movements of the bars 176, said stops on a short advance also determining ten letters interspersed with the numerals. In general, the upper stops 225 are controlled by three-point combinations and the lower ones mainly by the simpler combinations. In Fig. 20 the code adopted is given at the left. The code is extended at the top by dotted lines to include the five omitted combinations, in case it be desired to use them. The stops 225, 228, and 230 are indicated by dot-dash lines, each pin 257 being repeated in all six of the bars 232. The bars 232 are distinguished by the letters A, B, C, D, E, and F, with the old Powers numerical designations in parentheses.

Each stop 225 is controlled by two combinations and in each instance these two combinations have one or two points in common; and it will be convenient to refer to this common element as the "root" of the pair of combinations. Thus, the first stop is controlled by combinations A and AC, of which A is the root, and the eighteenth stop is controlled by CDE and DEF, of which DE is the root.

The openings 256 for the first stop are a full-step in bar A, a half-step in bar C and locking openings in B, D, E, and F. Therefore, this stop can be released only by raising bar A. If A is raised alone, stop 225 will advance a full step, the bar 176 will be held in its lowest position and the zero will be at the printing point. If A and C are both raised, the stop will advance a half-step; the bar 176 will rise one type-space and type E will come to printing position. If any other bar 232 is raised, the first stop will be locked. This same description applies to stops 2, 4, 6, 8, and 10 except that different permutation bars are used. The third stop 225 is controlled by combinations BF and BDF. Here BF is the root, and each of those bars 232 has a full-step opening 256, and bar D a half-step opening, all other bars having locking openings. Both B and F must be raised in order to release this stop, which will make a full step if they are raised alone and a half step if D is also raised. If any other bar 232 is also raised, this stop is locked. A similar description applies also to stops 225 numbered 3, 5, 7, 9, 11, and 12. Each of these first twelve stops is released for a full step by its root combination and limited to a half step by its root combination plus one other bar 232; and each of them is locked by raising any bar 232 not included in its combinations.

The first twelve stops 225 exhaust all of the one-point combinations, all but two of the two-point combinations, and, six of the three-point combinations. Because of the five combinations arbitrarily reserved, and because of preserving the Powers numerical code, the combinations remaining are such that the two two-point combinations cannot each be used as a root to produce one of the three-point combinations. Each of the remaining six stops, therefore, must be controlled by two combinations having the same number of points, and this introduces a problem, the solution of which includes the indifferent openings 2564, of which one is used for each of these six stops. Even if the two-point combinations could have been used as roots, there would still have remained four stops to be controlled each by two three-point combinations.

The thirteenth stop 225 is controlled by combinations ADE and BDE, of which DE is the root. Bars D and E have full-step openings, bar B a half-step opening, and bar A an indifferent opening. If D and E are raised, the stop will be released, whether for a full step or a half step is immaterial, because this same combination also releases the sixth stop (for a half step), and the bar 176 will, therefore, be arrested with the G type at the printing point, and before it reaches the thirteenth stop. If, however, bars ADE are all raised, bar A will lock the sixth stop and the thirteenth will make a full step to print U. If BDE be raised, B will lock the sixth stop and limit the thirteenth to a half step to print S. The indifferent opening in A must be such that the stop can advance at least a half-step when A is not raised, and such that said stop can advance a full step when A is raised with D and E. A similar description applies to each of these uppermost six stops. Each indifferent opening allows the associated stop to advance at the same time as some other stop below it, when the root-combination alone is used; but, when the bar containing the indifferent opening is also raised, it locks out the lower stop and makes the upper one effective.

It may be remarked that the uppermost stop 225 does not absolutely require any locking openings because the machine would function if this stop was released by each and every combination. In a similar way, many of the locking openings are not absolutely essential. It is, however, of course, preferable to prevent unnecessary movement of these stops.

The five combinations shown in dotted lines at the upper left in Fig. 20 can readily be worked out in the bars 232 on the same system as above described, if it is desired to use them for printing purposes. In other words, said system is capable of utilizing all forty-one of the possible combinations. In Fig. 64 an item card 968 is shown with the above described code punched in columns 1—36 and, in columns 39—43, the extension to include the five combinations not employed for characters in the present machine.

The zero stop 228, in each denomination, is controlled by like openings in all of the permutation bars 232, said openings so shaped as to lock the stop when any bar 232 is raised, but to allow the stop to advance a half-step if no bar is raised, the stop then cooperating with a tooth 239 on the member 185 to hold the bar 176 in zero position. This stop, therefore, will prevent rising of its differential bar if the corresponding column of the card is blank; and these stops will hold down all of the associated type bars if the machine is operated with a blank card in the sensing chamber and the mechanism is set for tabulating.

The erasing stop 230 in each denomination when advanced a half-step acts on a third tooth 229 of the member 185 to prevent movement of its type bar 176. This stop is controlled by a half-step opening 256 in each of the permutation bars A and B, all of the remaining bars having indifferent openings. Therefore, this stop will be advanced if the corresponding column of the card is punched with any one of the five reserved combinations AB, ABC, ABD, ABE, and ABF, and also if it is punched with any other combination including AB. If, for any reason, it is desired to erase a field punched in a card or in a set of cards, the card or cards may be run through a punch and punched AB in each column of the field. Whether or not either A or B had previously been punched in the same column, and regardless of whatever else may have been punched there, the card or cards when run through the tabulator will cause the stops 230 of the re-punched or cancelled field to be advanced and to hold down the bars 176. If it be desired to print more than thirty-six characters, some three-point combination, such as ABC, for example, may be used for erasing. The other four AB combinations will then be available for controlling the bars 176.

The construction of the code bars 232 with individual holes 256 has marked advantages over the usual construction of such bars with teeth projecting from one edge thereof. The space available for these bars is limited by the desirability of spacing the printing as closely as may be. The bars are of thin metal and they slide up and down in contact with one another. The usual projecting teeth are easily bent, and if bent even slightly out of the plane of the bar, the teeth of contiguous bars interfere with one another, so that one bar when lifted will carry another with it and cause erroneous operation; or one bar when lifted may get one of its teeth caught on a tooth of another bar and fail to return to normal. Each tooth of applicants' bars is anchored not only at its base, but also along one side, and the danger of bending is almost entirely obviated.

In the Powers tabulator "naught blocks" have sometimes been used, under some automatic control, to lift all of the zero stops of a particular field in order, on a particular cycle, to hold back the type and gear sectors of that field. In the present machine this could not be done by merely raising the A or zero permutation bar 232, because if some column of a card was punched with one or two holes which, together with A constitute one of the combinations of the code, the lowermost stop 225 would be locked and a stop above it advanced, and the type bar 176 would rise. No naught block is shown in the present case, but the stops 230 make it possible to provide such a device, which could be arranged to lift both permutation bars A and B, and thus block any movement of the type bars.

It may be remarked that tabulators are used as a part of a system which includes other machines, such as punches, sorters, etc., and that the reserved AB combinations are also useful for special purposes in some of those machines. They may also be punched for control purposes in columns of the card reserved for such purposes and not connected through the translator with permutation bars 232.

It is believed that the above described stop and code mechanism is in several respects novel and advantageous. In the specific machine illustrated the bars 176 are spaced .156 inch from center to center, and all of the mechanism for controlling them is compressed within the same transverse spacing, enabling a large number of them to be used. The types are spaced closely on the type bars, each of which is controlled by the direct action of the stops. By using each of these stops for two positions, the stops are made of sturdy dimensions and without crowding; and by using each stop for only two positions, their advance movements are short enough to be easily effected without being divided into such fine gradations as to require great precision and as to introduce likelihood of erroneous operation. The permutation bars have each only one extent of movement to active position, which, therefore, it was possible to make long enough to eliminate the necessity of great precision in the translator by which they are operated. The control of these permutation bars over the stops, is direct, simple, and positive. The described manner of this control by the pins 257 and openings 256 is believed to be novel, and to have marked advantages.

The totalizers 181 are arranged in front of the rack bars 176 in a plurality of tiers, an upper and a lower tier being shown in the present instance. They are supported by two cross bars 295 of dove-tail cross section (Figs. 1, 2, and 14) each of said cross bars being bolted, as shown in Figs. 5 and 6 to blocks 296, which, in turn, are bolted to the inner faces of the end frames 156 and 157. Either of these bars 295 can be readily removed by unbolting it from the blocks 296. The bars 295 are fitted into slight depressions in said blocks so that without difficulty they may be replaced with precision. The stationary framework of each totalizer consists essentially of right and left-hand side plates 297 and 298 (Figs. 14 and 21) rigidly secured by nuts to two shouldered frame rods 300. Each of the plates 297 and 298 is made with a beveled cutout which fits the rear beveled edge of the cross bar. At the forward edge of the cross bar 295 a block or bar 301 is inserted, said bar at its forward edge bearing against a shoulder 302 of each frame plate, and at its rear edge being beveled to fit the beveled edge of the bar 295. A stud bolt 303 is suitably secured to each of the side plates 297 and 298 and has a nut 304 threaded to its lower end, where it projects through the bar 301. The whole construction is such that on removing the two nuts 304, the bar 301 will drop out of place, and the totalizer can then be lifted off of its supporting bar; and it can be similarly replaced.

Each of the bars 295 is straight and smooth and the construction is such that, with the nuts 304 loose, any totalizer may be slid along said bar to any desired position so that its wheels will cooperate with any desired succession of racks 176. Preferably, there is a full set of these racks or, at least, the machine contains as many as the individual user is likely to need, and totalizers can be set wherever the user desires a column of figures to be located on the paper. As will hereinafter appear, these totalizers may be of any suitable width, that is to say, may be made for any suitable number of denominations, and they may be distributed across the machine as desired in each individual instance. In Fig. 2 a characteristic set of such totalizers of different widths is diagrammatically illustrated by dot-and-dash lines. The specific machine shown in the drawings is equipped with one hundred type and rack bars 176 and will, if necessary, accommodate seven ten-place accumulators in each tier.

The totalizer shown in the drawings is novel and has marked advantages, though, as far as the balance of the organization of the machine is concerned, other types of totalizers may be employed. Each of the totalizers shown is capable of addition and subtraction, and of yielding true negative balances, the fugitive one being inserted by transferring from the highest wheel to the lowest. The totalizer includes in each denomination two register wheels 305 constantly in mesh. Computation is effected on the down or return stroke of the racks. Transfer to any denomination is effected by causing the pair of wheels of that denomination to move bodily upward to an extent to turn the wheels one tooth. This can occur either while the rack is moving downward or after it has finished its down stroke.

Each denominational unit of the totalizer consists of a sub-assembly shown detached in Fig. 39. The lower wheel 305 is journalled on a headed stud 306 riveted to an individual lever 307 which, in turn, is pivoted at 308; and each upper wheel 305 is likewise journaled at 306 on an individual lever 310 pivoted at 311, pivots 308 and 311 being substantially directly in front of the respective wheels.

All of the levers 307 and 310 are pivoted in a slotted block 313 (Figs. 14, 21, and 22) the pivots 308 and 311 consisting of rods extending through said block, and said block is itself pivoted at 314, midway between said rods. The levers of each pair are individually connected toward their rear ends by a link 312. The pivotal axis of this link, and the centers of the pivot rods 308 and 311, are at the four corners of a parallelogram, the short sides of which are equal in length to the pitch diameter of a register wheel. The construction is such that, by rocking the block 313 about its pivot 314, all of the wheels may be moved from the relative positions of Fig. 14 where the lower or add wheels project beyond the upper or subtract wheels, to the relative positions shown in Fig. 23, where the upper wheels project beyond the lower. Throughout this shifting movement the centers of the two register wheels of each pair will be maintained at a fixed distance apart and in correct mesh, one wheel rolling on the other. In the present instance, the block 313 rocks through 54°. The position of Fig. 14 is normal and is, therefore, used for addition and that of Fig. 23 for subtraction. The individual links 312 make it possible for any pair of wheels to move upward for transfer independently of any other pair, the wheels moving respectively about the centers 308 and 311.

The rear ends of the levers 307 and 310 are supported and guided respectively by a lower and an upper auxiliary frame, the two frames together constituting a sub-assembly shown in Fig. 24. Each frame comprises a right-hand and a left-hand side plate 315, the upper and lower plates on each side being connected together by a link 316 pivoted to the plates at 317, these two links being parallel to and of the same effective length as the links 312. The block 313 has at each end an extra pair of slots in which the plates 315 are pivoted like the levers 307 and 310. The construction is such that the plates 315 partake exactly of the same movements as the levers 307 and 310 except the transfer movement.

The two side plates 315 of each frame are connected at their forward ends by the block 313 and pivot rod 308 or 311. At their rear ends they are connected by frame and comb plates 318 and 320, which are mortised into the side plates 315 and riveted. The plates 318 have their edges formed inward and cut with slots which guide the levers 307 and 310. Each lower lever 307 has a shoulder 321 which normally rests on the upper edge of the plate 318 and the upper lever 310 has a shoulder 322 which normally stands at a distance below the lower edge of the plate 318 about equal to a tooth space of the rack 176. When a pair of wheels receives an increment of motion by transfer, a spring causes the two levers 307 and 310, connected together as they are by the link 312, to move upward until the shoulder 322 is arrested by the upper bar 318. This is true whether the operation is one of addition or of subtraction.

Each of the upper frame plates 315 has two lugs 323 extending downward therefrom, and each of the lower plates 315 has a lug 324 extending upward therefrom between the two lugs 323. These lugs limit the relative shifting of the two frames when changing from addition to subtraction and vice versa. Each of the lower frame plates 315 has a depending ear 325, said ears connected by a bar 326 having one edge formed into hooks for springs 327, tending to hold the levers 307 and 310 in their normal lower positions. In some instances, these springs may be dispensed with as the parts will return to normal by gravity.

The transfer mechanism is made in two independent sets, one set cooperating with the lower wheels in adding operations and the other set cooperating with the upper wheels in subtracting operations. Each wheel has at the right of its gear teeth a transfer tooth 328. In the lower set, a transfer pawl 330 is pivoted at 331 to each lever 307 and said pawl has a tooth formed at its rear end for cooperation with the transfer tooth 328. This tooth is made with an abrupt edge to arrest the wheel in total taking operation, and an inclined edge by which in adding operations the tooth 328 depresses the pawl as the wheel passes from its nine to its zero position. The pawl 330 has a depending arm 332 connected by a link 333 with a latch 334 engaging a shoulder 335 on the lever 307 of next higher order. The latches 334 are pivoted on a cross rod 336 joining the two frame plates 315 and each of them is urged to locking position by a spring 337 hooked to the cross bar or plate 320. During adding operations the levers 310 and 307 are under spring-tension, urging them upward, and, when any wheel passes from nine to zero, the depression of the pawl 330 withdraws the latch 334 and allows the levers 307 and 310 (connected together by the link 312) to move upward one tooth space, thus adding one. The wheels and transfer devices are mounted on the left-hand faces of the levers 307 and 310 (Fig. 39). In Figs. 14 and 23 the levers are sectioned away to show these devices in full lines.

It will be noted that in the transfer movement the pivot 331 of the pawl 330 of the denomination to which the transfer has been made, moves upward with the lever 307. In order that this movement may not affect the pawl 334 of that denomination, the pivots 338 and 340 at the ends of the link 333 are arranged nearly in a straight line with the pivot 308 of the lever 307, so that when said lever swings upward the pivot 340 swings across the dead center of the link 333, and does not pull out the next pawl 334.

The transfer devices that are used in subtraction and which cooperate with the upper wheels are substantially the reverse of those just described. The upper transfer pawl 341 has a blunt end preceded by a lower inclined edge for cooperation with the transfer tooth 328, and it is also pivoted at 331 to the lever 310 and is connected by a link 333 with a latch 342, the series of such latches being pivoted on a cross rod 343 joining the two frame plates 315. Each of the pawls 342 cooperates with a shoulder 344 on its lever 310 and said pawls are controlled by springs 345 connected to the plate 320. This link 333 is also so disposed that, when the lever 310 moves upward, the link swings across the dead center with respect to the pivot 311.

Only one of the two sets of transfer devices is active at a time, and means are provided to throw the upper one out of action when the machine is set for addition and the lower one out of action when the machine is set for subtraction. To this end, each link 312 is provided at its ends with toes 346 to cooperate with cam surfaces 347 on the respective pawls 330 and 341. When the block 313 is swung to the add position shown in Fig. 14, each link 312 swings about its pivot and its upper toe 346 cams the pawl 341 upward out of engagement with the register wheel, thus leaving the upper register wheel free to turn backwards, and also pulling the latch 342 out of engagement, and leaving the up and down motion of the levers 307 and 310 under the sole control of the lower latches 334. When the block 313 is swung to its alternative position, the upper toe 346 moves away from the cam surface 347 and allows the upper pawl 341 to drop down into engagement, and, therefore, the upper latch 342 to move into engagement, and the lower toe 346 cams the lower pawl 330 to its depressed position and swings out over the concentric part of the upper edge of said pawl, as shown in Fig. 23, which shows the machine set for subtraction. The totalizer is then under the sole control of the upper set of transfer devices. It will be noted that in the position of Fig. 14, the upper toe 346 is just on the point of the shoulder 347, so that it will begin to release its hold immediately when the link 312 begins to move toward subtracting position. It will be noted on the contrary in Fig. 23 that, when setting the mechanism back to addition, the lower toe 346 must move some distance over the concentric part of the pawl 330 and that it will not release said pawl to move into engagement until the last part of the shifting movement.

There is but one set of detent pawls 348 and these engage the upper wheels. These pawls are pivoted at 350, each pawl to one of the levers 310 and each is drawn to active position by a spring 349 connecting an ear of the lever 310 with an ear of the pawl 348. As will appear hereinafter, these retaining pawls are all lifted out of engagement by the movement of the register wheels into mesh with the racks, and they are in engagement at the time when the block 313 is shifted from add to subtract position and vice versa, which shifting is done at a time when the wheels are out of engagement. As will hereinafter appear, at the time when this shift is effected, the springs which effect the transfer are not active, and the described movements of the transfer pawls do not cause a transfer. The result is that during this shifting movement, the upper wheels are held against turning and the lower wheels roll on the upper wheels during the shifting operation.

In Fig. 14 the illustrated register wheels stand at zero, with the transfer tooth 328 engaged with the nose of the pawl 330. If this wheel stood at 9, said transfer tooth would be just to the right of said nose. If then the parts were shifted to subtract, this tooth would roll clockwise past said nose to a position to the left thereof. If then the parts were shifted back to add, this tooth would again pass said nose in the opposite direction. This would bring the abrupt face of the tooth and nose into collision, unless the pawl was held away until the last part of the shifting movement, as above described.

In order to insert the fugitive 1, the following mechanism is provided: The upper and lower register wheels of highest order each control a bell-crank 351 similar to a latch 342 or 334, but not engaging any lever 310 or 307. An arm of said bell-crank has a stud 352 which lies under an arm 353 fast on a rock shaft 354 extending across the totalizer, being pivoted at its ends in the two frame plates 315 as best shown in Fig. 21. At its right-hand end, this rock shaft has another arm 355 lying under a stud 356 projecting from an arm 357 of the transfer latch 358, which controls the lever 307 or 310, as the case may be, of units order. The construction is such that every transfer from the highest wheel causes the pair of register wheels 305 of units order to move upward, adding or subtracting one.

As the detent 348 is mounted on the lever 310 and moves with said lever, it cooperates with the wheel 305 in the upper transferred position the same as in the normal lower position. Also the transfer pawl 330 or 341 moves with its lever 307 or 310, and can trip the next lever above it when its own lever is in its upper position, and also while it is moving up to its transferred position.

In order that the register wheels may be moved into and out of mesh with the racks, the construction is as follows: The pivot 314 for the block 313 consists of trunnions, one at each end of said block, the right-hand trunnion pivoted in the upper end of an arm 360 and the left-hand trunnion in a corresponding arm 361, the two arms being fast on a rock shaft 362 passing through and pivoted in stationary frame plates 297 and 298. In order that the parts may be readily assembled and disassembled the shaft 362 is made in two sections and a block 363, bored to receive the ends of these two sections, is slotted both transversely and also axially, making two branches, one of which can be independently and firmly clamped to its shaft section by tightening a screw 364. By loosening these two screws, the shaft sections 362 can be pulled outward, the levers 360 and 361 slipping off of the trunnions 314. On the rear end of the stationary frame plate 297, a guide arm 365 is pivoted at 366 and this arm is pivoted at 367 to the middle of the link 316 which connects the upper and lower frame plates 315; and a similar guide link is provided on the left-hand side of the totalizer. As shown in Fig. 14, a stud 368 on the lever 361 projects into a hole 370 in the left-hand stationary side plate 298 and limits the motion of the parts in both directions. The wheels are normally held out of engagement by any suitable spring such as the spring 371 shown in Fig. 14 and connecting two studs on the plate 298 and lever 361, respectively.

In order to move the detent pawls 348 into and out of engagement the following mechanism is provided: Said pawls consist of levers of the first order and their forward ends lie beneath a transverse bail bar 372 mounted on arms 373 fast on a rock shaft 374 pivoted at its ends in upwardly projecting ears of the upper pair of frame plates 315. The left-hand one of the arms 373 is extended toward the front of the machine and is connected by a link 375 with the forwardly extending arm of the lever 361. The construction is such that when the totalizer is moving into engagement from the position shown in Fig. 14, the bail bar 372 moves downward and swings the detents out of the wheels in the last part of the movement and after the teeth of wheels are already part way in engagement, and said detents return to holding position in the first part of the movement of the totalizer out of engagement.

In order to put suitable spring tension on the levers 307 and 310 at the times when it is needed for transfer purposes, and to restore said levers at the proper time, the following mechanism is provided. As best shown in the lower totalizers of Fig. 14, each lever 310 is prolonged forward of its pivot 311, and at 376 has pivoted thereto a bell-crank 378 which is connected with the forward end of the lever 310 by a spring 380 tending to rock said bell-crank clockwise, which motion is limited by an ear 381 formed off from the upper edge of the lever 310. The horizontal arm of the bell-crank 378 has a roller 382 journaled thereon and lying beneath a flat cam-operated cross-bar 383. There are two of these bars extending clear across the machine, one for the totalizers of the lower tier, and the other for the totalizers of the upper tier, and these cross bars are connected rigidly together into a rectangular frame by end pieces 384 (Figs. 2, 5, and 6). Said frame is guided for up and down movement by four parallel arms, viz., two upper arms 385 and two lower arms 386, each pivoted to a frame bar 384, and all pivoted to the end frames 156 and 157 on studs 387. Each of the lower arms 386, one at the right and the other at the left-hand end of the structure, carries a follower roller 388 and these follower rollers are drawn up by springs 390 against the under edges of cams 391 fast on the front head drive shaft 168. The two cams 391 are identical in outline, each comprising a high concentric part and a low concentric part connected therewith by inclines. As shown on the timing chart, these cams put the springs 380 under full tension from about 233° of a cycle to about 33° of the next cycle, that is to say, during the whole time when the restoring bar 201 is moving the rack bars downward and until the register wheels have been withdrawn from the racks early in the next cycle. During the period when the register wheels are fully out, bars 383 are lifted practically out of contact with the rollers 382, permitting the springs 380 (Fig. 39) to swing the bell-cranks 378 up until arrested by the ears 381. In this position, said springs have no tendency whatever to rock the levers 310 and 307, which, therefore, drop down to their normal lowermost position, where they are caught by the lower transfer latches 334, if the totalizer is set for addition, or by the upper transfer latches 342 if the totalizer is set for subtraction. The rollers 382 are provided so as to facilitate forward and rearward motion of the levers 310, the bars 383 being of a width to contact the rollers in all positions.

The means for moving the totalizer into mesh with the racks and for shifting from positive to negative setting of said totalizers, and vice versa, are best shown in Figs. 1, 2, 10, 14, and 27. Figs. 10 and 14, together, constitute a single section through the machine, joining at the vertical dot-and-dash line. The movements referred to are effected by the power drive of the machine, acting through an upper rock shaft 392 for the upper tier of totalizers and a lower rock shaft 393 for the lower tier of totalizers, these shafts being rocked at suitable times under the control of mechanism which will be described hereinafter.

In each totalizer, the right-hand side plate 315 of the upper auxiliary frame has pivoted thereto at 394 a compound push link 395, which extends towards the front of the machine beneath the bar 363 and near its forward end is notched to form a shoulder 396 and a finger 397. In each totalizer the right-hand frame plate 315 of the lower auxiliary frame has pivoted thereto at 398 a compound push link 400, which toward its forward end has a lug 401 projecting from its upper edge. The link 395 rests on the upper edge of this lug and the two links are drawn together by a tension spring 402. The lower link 400 of the upper totalizer is supported against downward motion by a link 403 pivoted thereto, said link having at its lower end a slot embracing a stud 404, projecting from a lever arm 405 loosely pivoted on a fixed frame rod 406 and drawn upward by a spring 407 against a limiting stud 408, projecting from an arm 410 fast on the rod 406. Fast on the rock shaft 392 (Fig. 38) is a double arm 411 between the two layers of which the links 395 and 400 are guided. Said layers are connected by a pin 412 situated between the two links. When the totalizers are set for addition, the parts occupy the position shown in Fig. 10, the stud 412 being in contact with the upper edge of the link 400, and the whole of the link 395 occupying a position above said stud. If, now, the shaft 392 be rocked clockwise the stud will strike the shoulder 413, consisting of the forward edge of the lug 401, and will push the link 400 and with it the auxiliary frame comprising the plate 315 toward the rear of the machine, forcing the register wheels into engagement with the racks. In this position of the parts, the lugs 324 on the lower frame plates 315 are in contact with the rear lugs 323 on the upper frame plates 315, so that the upper auxiliary frame is constrained to move in unison with the lower one.

The machine is set for subtraction by rocking the lever 405 downward, thus drawing the link 400 downward to the position shown in Fig. 23, the upper link 395 being drawn down with it by the spring 402. A spring 399, between the arm 405 and link 400 can yield momentarily if the link 400 is detained by friction of the pin 412. The shoulder 396 will now stand behind the stud 412. If, now, the shaft 392 be rocked clockwise, the link 395 will first be forced rearward until its shoulder 396 occupies the same position as the shoulder 413 does in Fig. 10. This motion results in the rocking of the block 313 to its subtracting position. When the parts have reached that position, the shaft 392 and pin 412 continue their rearward motion until the upper totalizer wheels have been moved into the racks. When the shaft 392 moves back to normal, the spring 371 (Fig. 14) will pull the totalizer out of engagement, but the parts will still be in the relative subtract positions shown in Fig. 23. If the next operation is addition, the links 395 and 400 will return to their upper positions. The pin 412 when operated will strike the shoulder 413 of the link 400 and first reset the parts to add and then move the totalizer into mesh.

In order to obviate the necessity for great precision in the movement of the stud 412, and also in order to prevent injury to the machine in case a tooth of a register wheel should by some mischance strike the end of a tooth of the rack, the links 395 and 400 are made compound, that is to say, each of them consists of a rear portion and a forward portion, lying face to face, and slidably connected by pin and slot connections 416. A stiff spring 417 connects studs on the two sections so as to give them a strong tendency to move as one, but so as to yield in case of necessity.

In the operation of setting the totalizer from addition to subtraction and vice versa as above described, it is deemed preferable to provide means to assure positively that the relative positions of the upper and lower parts of the totalizer are fully reversed before the totalizer as a whole moves rearward. To this end, the lever 360 (Fig. 14) has a horizontal arm 415 which when the totalizer is out of mesh is engaged by a latch 418 pivoted at 420 to the stationary side plate 297 of the register frame and which is drawn to latching position by a spring 419. Pivoted to a downward extension of the latching pawl at 421 is a push link 422 connected with the arm 411 by a pin and slot connection 423. The construction is such that the pin has a lost motion in the slot throughout that part of the swinging of the arm 411 which would swing the totalizer mechanism to the subtract position. The stud then strikes the rear end of the slot and releases the latch 418, which up to that moment has been positively holding the levers 360 against turning. The link 422 is preferably made adjustable as to length by means of pin and slot connection 424. If the latch 418 is not released quite soon enough, no harm is done, as the spring 417 can yield momentarily. The arm 411 may be made with a split clamp construction, which enables it in the processes of assembling to be slid along the shaft 392 to any desired position, that is to say, to the correct position in front of the totalizer 181 wherever the latter may have been located.

The above construction is substantially duplicated in the case of each totalizer 181 of the lower tier except that the arm 411, mounted on the lower shaft 393, is turned so as to hang downward instead of to project upward, with the result that the link 422 is longer in this instance than in the other, and the operating stroke of the shaft is counter-clockwise. The link 400 of the lower totalizer is held up by a vertical link 425 having pin and slot connection 426 with a lever arm 427 loose on a lower pivot rod 428 as in the other construction, but the stud 432 does not directly arrest the upward motion of the arm 427 in obedience to the spring 431, as will presently be explained.

In order to enable the machine operator to disable any totalizer when desired, the pin 412 (Fig. 38) is made as a plunger enclosed in a housing with the usual compression spring and button and with a pin 409 playing in a slot in said housing. To disable the totalizer, the operator withdraws the plunger pin 412 out of operative position and retains it there by turning it until the pin 409 rests on the end of the housing. The vibration of the arm 411 will then have no effect on the totalizer which will be held out of operation by its spring 371.

In order to enable any pair (upper and lower) of totalizers to be set for subtraction by a special perforation in the card, the following mechanism is provided: Between the arms 435 and 427 on the rod 428, there is loosely pivoted on said rod an arm 434 whose edge is normally in contact with the limiting stud 432, and which itself has a stud 435 lying over the upper edge of the arm 427, and limiting the swinging of said arm by the spring 431. This lever 434 has its upper edge constituting a sort of cam including a front incline 436, a rear incline 437, and a peak 438.

A pivot rod 440 extends across the machine between the two end frames 156 and 157 and at each totalizer unit this shaft has pivoted thereon a lever 441 having on its upstanding arm a roller 442 lying on the cam surface 436—438—437, said lever being urged clockwise by a spring 443. The arm 434 has a hook 444 to prevent the roller from running off the end of the arm. The lever 441 is connected by a long link 445 with a bell-crank 446 (Fig. 14) pivoted on a transverse pivot rod 447 and having projecting from its horizontal arm a stud 448 lying beneath the end of one of the differential bars 176. The construction is such that normally this differential bar holds the stud down and the link 445 holds the lever 441 in its forward position shown in Fig. 10. If, however, the bar 176 is allowed to move upward to the extent of two rack teeth 180, the spring 443 will rock the lever 441 until the roller 442 rests on the peak 438 pulling the lever 434 downward. This motion, transmitted through the link 425, will pull the push links 400 and 395 down to subtracting position, all as shown in Fig. 23. A link 450 (Fig. 10) connects the lever 434 with the subtract lever 405 of the upper totalizer and sets that totalizer to subtraction at the same time. If, however, the rack bar 176 moves upward to a greater extent than two teeth 180, the roller 442 will run down the incline 437 and limit against the hook 444, and the lever 434 will resume its add position, shown in Fig. 10, and the machine will not be set for subtraction.

It will be understood that there is one of these subtraction setting mechanisms for each pair of totalizers, one totalizer in the upper tier and one in the corresponding position in the lower tier, and, in case the totalizers are arranged in that way, both the upper totalizer and the lower totalizer will be set for addition and subtraction in harmony. Where totalizers in two fields of the tabulator are controlled by Y-wires from the same card-field, suitable control holes in the card may cause the same number to be added in one totalizer and subtracted in the other, if desired. In assembling the machine the arms 410 and 433, the arms 405 and 427, the levers 434 and the bell cranks 446 can all be slid along their respective pivot rods and readily secured in position in harmony with the setting of the totalizers themselves. But each totalizer field has its own bell-crank 446, and any pair of totalizers can, therefore, be set for subtraction independently of any other.

From the description of the totalizers given above, it will be perceived that it is not possible to set a totalizer wheel for every rack 176, there being a certain amount of mechanism to the right and left of the set of wheels. In the present instance, this mechanism is of such thickness that if two totalizers be set on a bar 295 as close together as possible there will be between them four unused racks 176. It is one of these otherwise unused racks that is utilized to control the bell-crank 446. In the code as used at present, this rack would be moved upward in a computing operation to the extent of two teeth 180 by raising the permutation bars B and F. This can be done by a control hole punched at any unused point on the card and controlling a Y-wire to these two positions. Such Y-wires are common in the art. There can be several of these controlling positions on the card, one for each pair of totalizers. As has been pointed out hereinbefore, the types in one of these bars 176 are readily exchangeable. The drive shaft of the machine can be turned by hand so as to let the type bars rise to a point where the types are accessible. The dovetail slide 184 (Fig. 19) can be slid up, any type can be slipped out of its hole and another one substituted for it. In the case of one of these designating type bars just described, the "2" type would be removed and a suitable type substituted to indicate that the item was subtracted. If there is no hole punched in the designation position, this particular bar will not move upward, as has been explained, and nothing will be printed in that position.

It will, of course, be understood that the lower register wheels 305 are the adding wheels rather than the substracting wheels, only because the arms 405 and 427 normally stand in their upper positions instead of in their lower positions. If the whole lower part of the totalizer were omitted with all of its special controlling mechanism, the upper wheels and their cooperating devices would constitute an adding totalizer, incapable of direct subtraction; and it is obvious that, if desired, adding totalizers can be made for the present machine in that way, as shown in Fig. 25.

The means for rocking the shafts 392 and 393, for adding and for total taking, are shown in Figs. 2 and 7 and Figs. 28 to 36, inclusive. This mechanism is located in the box-like left-hand end frame 157. On the end of the drive shaft 168 there are mounted and suitably spaced apart four cams, namely, cams 451 for taking totals from the lower tier of totalizers, 452 for causing addition on the lower totalizers, 453 for causing addition on the upper totalizers and 454 for taking totals from the upper totalizers. These cams respectively control four follower levers 455, 456, 457, and 458, all pivoted side by side on a stub shaft 460 projecting from the end frame 157. As best shown in Fig. 35, each of these levers has a follower roller 461 journaled between its parallel branches and each said roller pressed against its respective cam by a spring 462, said springs anchored to two posts 463. As best shown in Fig. 34, the lower rock shaft 393 has fast on its projecting end the hub 465 of a double lever 466 whose parallel arms are connected at their upper ends by a post 467 to which certain links are pivoted. Similarly, to the projecting end of the upper shaft 392 is fast the hub 468 of a double lever 470 whose arms at their upper ends are connected by a post 471 on which certain devices are pivoted. As best shown in Fig. 28, springs 472 and 474 urge the lever 466 clockwise and the lever 470 counter-clockwise against a post 473 to which said springs are anchored.

Comparing Fig. 28 with Fig. 10, it will be perceived that the position shown in these figures is that in which all of the totalizers are permitted to move out of engagement with the racks. This is the stop position following the taking of a grand total. In the stop position of the machine between two adding cycles, the totalizers would be in mesh.

Referring to the shaft 393 for controlling the lower totalizers and to Figs. 28 and 34, it will be noted that two couplers 475 and 476 are pivoted on the post or pin 467 of the lever arm 466, said couplers each consisting of a sort of link or hook. These couplers are parallel and extend toward the rear of the machine, the coupler 475 passing between the two layers or strata of the total-controlling follower lever 455 (Fig. 30) and the link 476 between the two strata of the addition-controlling follower lever 456 (Fig. 31). Both of these links would show in both of these figures, but, as they cooperate with different follower levers, one is omitted in each figure for clearness.

Addition on the lower totalizer is controlled by the mechanism shown in Fig. 31. The link 476 is forked to embrace the pin 464 of the lever 456 and is urged counter-clockwise by a spring 477 lying above pivot 467 and connected to the upstanding arm of an anchor member 478, which (Fig. 34) is also pivoted to pin 467 and has a rearwardly extending fork to embrace the pin 464. This is merely for guiding purposes, so as to maintain the anchored end of the spring 477 in proper relation to the link 476 during movement of the parts. Spring 477 causes the lower branch of the link 476 to be pressed upward against the pin 464. Said branch has a tooth 480 inclined on its forward edge and abrupt on its rear edge to act as a pawl against the pin 464. Starting in the position shown in Fig. 31 (following a grand total operation), as the shaft 168 rotates counter-clockwise, early in the cycle the follower 461 will run down on the cam 452 and the spring 462 will draw the lever 456 clockwise until the pin 464 is engaged behind the tooth 480, where it will remain until the next total-taking operation. During this first half-cycle the lower totalizers are out of engagement. At the proper time, near the middle of the cycle, the cam will force the lever 456 to rock counter-clockwise, and the pin 464, acting on the tooth 480, will rock the shaft 393 counter-clockwise and force the lower totalizers into engagement. The mechanism just described will move the totalizers into and out of mesh at the proper times as long as tabulating operations continue.

The mechanism for taking totals from the lower totalizers is shown in Fig. 30. The lever 455 is substantially identical in shape with the lever 456, and the cam 451 is nearly complementary to the cam 452, and moves the totalizers into and out of mesh at the proper times for taking totals in the manner well known in the art. The link 475 has a spring-anchor piece 481 like the piece 478 of the add mechanism, and embracing the pin 483, corresponding to the pin 464 above described, said piece 481 anchoring a spring 482, normally urging the link 475 counter-clockwise, its motion in that direction being limited by a pin 489 thereon contacting the under edge of the piece 481. This link 475 has a tooth 484 directed downward from its under edge and having its forward edge inclined and its rear edge abrupt for pawl-like cooperation with the pin 483; but this tooth is normally held out of the path of said pin so that in adding operations the lever 455 oscillates ineffectively. A total is taken by depressing the links 476 (Fig. 31) and 475 (Fig. 30), thus moving the tooth 480 out of the path of the pin 464 and the tooth 484 into the path of the pin 483. The means for carrying out this operation will be described presently.

The mechanism for causing addition (Fig. 32) and total taking (Fig. 33) in the upper totalizers must rock the shaft 392 clockwise in order to throw the totalizer into mesh and the follower rollers 461, therefore, engage their cams 453 and 454 on the rear sides of the latter. These two cams are, therefore, set at different angles on the shaft 168 from the corresponding cams 452 and 451, respectively, but they give the same timing. For addition on the upper totalizer, the lever 457 has its pin 485 at its upper end embraced by a spring-anchorage piece 486 like the piece 478, and also by a forked pull link 487, both pivoted on pin 471 of arm 470 in the positions shown in Fig. 34, and connected by a spring 488. The lower branch of the link 487, normally pressed upward against the pin 485, has a tooth 490, inclined on its rear edge and abrupt on its forward edge, and acting pawl-fashion upon the pin 485. Beginning with the position shown in Fig. 32, early in the first add cycle, the lever 457 will swing forward counter-clockwise and the tooth 490 will snap in behind pin 485. At the proper time near mid-cycle the lever 457 will swing clockwise, rocking the lever 470 and shaft 392 and moving the upper totalizers into mesh. The lever 457 and shaft 392 will continue to oscillate cycle after cycle, moving the totalizers into and out of mesh at each tabulating cycle.

In the total taking mechanism for the upper totalizer, shown in Fig. 33, the lever 458 has the pin 491 at its upper end embraced by an anchor piece 492 for a spring 493, the same as in the other instance, said spring normally holding up a pull link 494 pivoted at 471 and having a tooth 495 abrupt at its forward edge for engagement with the pin 491, this tooth, however, being normally held by the spring 493 out of the path of said pin so that the normal oscillations of the lever 458 are ineffective. The upward motion of the link 494 is limited by a stud 496, contacting the under edge of the piece 492. In a total-taking operation of the upper totalizers, the links 486 and 494 will be pressed downward, the former out of engagement with the pin 485 and the latter into engagement with the pin 491 and will cause said totalizers to be engaged during the first half and disengaged during the second half of the cycle.

To set the lower tier of totalizers to non-add the link 476 (Fig. 31) will be depressed whereupon the lever 456 will oscillate idly and the lower totalizers will remain out of mesh; and, similarly, if the connecting link 487 (Fig. 32) be depressed, the upper totalizers will not add.

Remembering that, in assembling the machine for the needs of a particular customer, totalizers may be disposed wherever desired on the upper and lower supports 295 and that the operator of the machine may instantly enable or disable any totalizer he pleases, it will be perceived that a great variety of modes of operation can be provided for by providing means for selectively depressing the four connecting pieces 475, 476, 487, and 494. All totalizers may be set to add or all to non-add; either tier may be set to add and the other to non-add, and either tier may be set for total-taking and the other tier either to non-add, to add or to total taking. Of course, both tiers could not take totals at the same cycle where two totalizers engage the same set of racks, unless the operator disabled one of them. The design and arrangement of the mechanism thus far described is such as to afford great flexibility in setting up individual machines for special uses, without any wide departure from the ordinary course of manufacture. In the machine shown in the drawing, and as will be described hereinafter, there is embodied a set of automatic controls for the connecting members 475, 476, 487, and 494, which give the mode of operation, which, it is believed, will be most frequently desired. These controls are so designed that the machine normally adds (or subtracts) on both tiers of totalizers; group totals are taken from the lower tier with the upper tier set at non-add; and grand totals are taken from the upper tier with the lower tier set at non-add.

The links 475, 476, 487, and 494 are depressed by rollers 497 mounted respectively on four bell-cranks 500, 501, 502, and 503, all pivoted on a post 504 projecting from the end frame 157. The means provided in the present machine for controlling these bell-cranks is as follows: Said bell-cranks are controlled from two rock shafts 505 and 506, the former controlling the lower totalizers and, therefore, called the total shaft, and the latter controlling the upper totalizers and, therefore, called the grand total shaft. The machine is set for taking one or the other kind of totals by "pulling" one or the other of these shafts, that is to say, by rocking it counter-clockwise. Said shafts extend clear across the machine being journalled in the two end frames 156 and 157, along with two other parallel shafts, which will be described hereinafter. The shaft 505 has an upstanding arm 507 (Fig. 30) which is connected by a link 508 with the upstanding arm of the bell-crank 500, so that a rocking of the shaft 505 will depress the connecting link 475. In order to permit the tooth 484 to snap over the pin 483, the connection to the bell-crank 500 is made through a spring 510 connecting the upper end of the bell-crank with an ear on the link 508, and the connection of the link with the bell-crank is by pin and slot 511. The spring 510 is much stronger than the spring 482. A similar construction obtains for all of the other bell-cranks, which, therefore, when they depress their respective connecting links do so by spring pressure.

As shown in Figs. 31 and 35, the total shaft 505 also has another upstanding arm 512 connected by a link 513 and spring 514 to the bell-crank 501 and a rocking of the total shaft 505 will, therefore, depress the connecting link 476 also and result in the taking of a total from the lower totalizers.

As shown in Figs. 33 and 35, the grand total shaft 506 has an upstanding arm 515 which is connected by a link 516 and spring 517 with the bell-crank 503 to depress the connecting link 494 to take totals from the upper totalizers.

In the present machine, although not necessarily, the two bell-cranks 501 and 502 which disable the add connecting links 476 and 487, are both operated by the same link 513 because in the specific machine chosen to exemplify the invention it was not desired to take a total from one set of totalizers and add on the other set of totalizers in the same cycle. As shown in Figs. 32 and 35, the grand total shaft 506 has an upstanding arm 518 connected by pin and slot with the same link 513 that operates the bell-crank 501. As shown in Fig. 35, the spring 514 is connected at its rear end to a cross pin 520 hooked into both bell cranks 501 and 502 and the pin 521 which enters the slot in the link 513 and extends through both bell-cranks so that these two bell-cranks vibrate in unison. It results that when taking a total from either tier of totalizers, the add coupler for that tier is disabled and the other tier is set at non-add. Both the arms 512 and 518 are connected with the link 513 by pin and slot so that the rocking motion of either one of the two shafts will not be communicated to the other.

As far as what has been hereinbefore described is concerned, the shafts 505 and 506 may be pulled by any suitable means. In the present machine this is done by a total control unit which causes the couplers 475, 476, 487, and 494 to be shifted according to a predetermined program as will be described hereinafter. It will be apparent that the connecting links 475, 476, 487, and 494 may be controlled in ways other than those above outlined in order to bring about other combinations of functions.

In order to prevent the differential bars 176 from being affected by the stops 225 during total taking operations, mechanism is provided which can be best understood from Fig. 6, which is a section taken a short distance inside of the left-hand end frame 157. The grand total shaft 506 has a depending arm 521 connected by a link 522 to a lever 523. The total shaft 505 has a similar arm 524 connected by a link 525 with a second lever, a duplicate of the lever 523. The levers 523 are connected to links 526 by pin and slot, one to each of the levers 523, and both of said links are pivoted to a bell-crank 527, which is connected by a link 528 to a bell-crank 530, the lower end of which is notched to constitute a detent for a pin 531, projecting from the horizontal arm of the lever 285 which lever as hereinbefore described is operated by the cam 288 to retract all of the stops 225, 228, and 230. The pin and slot connection between the levers 523 and the links 526 enables either of the shafts 505 or 506 to throw in this latch independently of the other. The construction is such that when, a little before the beginning of a total or grand total cycle, either of these shafts is pulled, the latch 530 is thrown in and the lever 285 is retained in its operated position so that the stops will be held retracted throughout the total or grand total cycle and are then released. This mechanism is substantially duplicated on the right-hand side of the machine, as shown in Fig. 5, where the corresponding parts are represented by the same reference numerals as in Fig. 6, except that in place of the levers 523 three-armed levers 532 are employed for a reason which will hereinafter appear. Thus, the stop retracting mechanism is locked at both ends of the machine.

During total taking cycles, differential bars other than those that engage the totalizers are controlled by other means, which will be described hereinafter.

The differential bars 176 are controlled at times by a series of pawls 533, one of said pawls being provided for each of said bars, as best shown in Figs. 1 and 11. Referring first, however, to Figs. 5 and 6, there is secured to the inner face of each of the end frames 156 and 157 a block 534, and to said blocks are bolted the ends of a heavy section bar 535. Also secured to the inner face of each of the two end frames is a block 536 to which are bolted the ends of two transverse frame bars 537 and 538. These three transverse frame bars 535, 537, and 538 support the mechanism about to be described, as shown in Fig. 11. This mechanism is known at the factory as the "slam bail" mechanism, and that term will be used herein for want of a better.

For convenience of manufacture and repair, pawls 533 are pivoted on short pivot rods 540 each inserted in a slotted bar 541 secured by screws 542 to a shelf of the frame bar 535.

These blocks 541 may be conveniently made in lengths of, say, ten denominations, and secured end to end on the bar 535. When a rack bar 176 is in its lowermost position, its pawl 533 is adapted to engage its uppermost tooth 180, as shown in Fig. 11, it being drawn into engagement by a spring 543 and limited by bearing on the upper surface of the block 541. This spring 543 connects the pawl with a slidable control bar 544, guided at its rear end in a slotted plate 545 attached to the bar 535, and at its forward end in a slotted plate 546 attached to the frame bar 537. The rear end of the control bar 544 is drawn by the spring 543 against an ear formed off from the upper end of the pawl, to which latter the spring is attached between said ear and the pivot of the pawl. The arrangement is such that the spring not only holds the pawl and its control bar in contact, but tends to pull the bar toward the rear of the machine, and thus to rock the pawl out of engagement with the rack. If, however, the control bar be held in its forward position, as shown in Fig. 11, then the spring will hold the pawl in engagement with the rack teeth on which it acts pawl-and-ratchet fashion so as positively to prevent upward motion and to permit downward motion of the rack bar. In the modified and preferred form of these devices shown in Fig. 37, the spring 543 is replaced by two springs 559 and 550, the former pressing the pawl 533 against the end of the bar 544 and mounted in accessible position above said bar, and the latter connecting the plate 546 with the prolonged forward end of said bar, and urging said bar rearward.

The control bars 544 may be used in various ways to control the slam bail pawls 533, and several such ways are exemplified in the illustrated machine. In order that any desired bar 176 may be disabled altogether, each bar 544 has a latch 547 pivoted thereto and held by a spring-urged detent 548 either in the upturned inactive position shown in Fig. 37, or down in the active position shown in Fig. 11. In the latter figure the bar 544 has been drawn forward by hand and so retained by hooking the latch 547 over the plate 546. In this position, the pawl 533 prevents any upward motion of the bar 176. When setting up the machine for a particular run of cards, any bars 176, that are not to be used in that run, may be disabled as just described.

Means may be provided to actuate these control bars 544 automatically at suitable times in the course of the operation of the machine and several such means are shown in the present instance. To this end each of said bars has pivoted thereto two connecting members 551 and 552 each settable to active and inactive positions. Each of these connecting members has a stud 556 projecting in such a position as to limit the rocking motion of the connection member by engaging the upper edge of the bar 544. Retaining levers 557 each notched at 560 are pressed by springs 558 against these studs and retain the members 551 and 552 in one or the other of their three positions. In the preferred form shown in Fig. 37, the members 551 and 552 have projections 549 to serve as finger pieces for setting said members.

For cooperation with the slam bail mechanism, the total shaft 505 and the grand total shaft 506 each has clamped thereon at intervals along its length, arms 553 slotted to support on each shaft a long bar or blade 554. Any one of the connecting members 551 may be rocked rearward (clockwise) so as to bring its rear abrupt end into the path of the blade 554 on the grand total shaft as shown in Fig. 11, or it may be rocked forward (counter-clockwise) so as to bring a shoulder 555 on its other end into the path of the blade 554 on the total shaft.

The construction is such that in any denomination the locking dog 547 may be released (Fig. 37) allowing the pawl 533 to be normally disengaged from the rack, and the member 551 may be set to be actuated by either the total or grand total shaft. The associate differential bar 176 will then be active at all other times, but will be disabled during every total or grand total cycle, as the case may be. This setting of the mechanism may be employed for any purpose that the operator finds useful. In practice it is sometimes used as follows:

A loose leaf ledger contains many pages, each devoted to an account, the accounts each bearing a designating number. Individual transactions are recorded each on a punched card which is also punched with the number of the account to which it relates. These cards are sorted by such numbers into numerical order, which brings all of the cards relating to any account into one group. The tabulator is set to print the balance of each group (a total) at each change of designation, and the machine is stopped after each total, so that the operator may remove from it the loose leaf just printed and substitute that for the next group of cards. This use of the machine has heretofore encountered the difficulty that there may have been no transactions in some accounts, and the operator must ascertain from the first card of the new group what leaf next to insert in the machine; and that card is inaccessible in the sensing chamber, where its presence initiated the total taking operation. It has been proposed to provide a special mechanism in the nature of a visual indicator to apprise the operator as to the number of the next account to be posted; and in the absence of some such device, special operations have been necessary to overcome this difficulty. In the present machine, the operator simply sets in the manner just above described, the slam bail controls for those type bars which print the designating number, with the result that, on the blank stroke of the total taking operation, the designating number of the next group is printed on a line by itself from the new card then in the sensing chamber. When the operator removes this ledger leaf from the machine, a glance at that line informs him what new leaf to insert next.

The control bars 544 and pawls 533 are also shown controllable by two other rock shafts, namely, a slam bail shaft 561 and a designation shaft 562. These shafts are equipped with blades 554 for cooperation with the connecting members 552. Slam bail shaft 561 is rocked counter-clockwise by the total control unit to be hereinafter described, so as to hold the pawls 533 in engagement with the racks during the second half of each total and grand total taking cycle in order to prevent the racks from jumping up when the totalizers are pulled out of mesh at about mid-cycle. Ordinarily, therefore, in columns of the machine associated with totalizers, the connecting members 552 will be set clockwise so as to be operated by this shaft, and the locking dogs 547 in those denominations will be set in releasing position. This is one of the flexible features of the machine. One or more totalizers may be set to be actuated by any selected succession of actuators 176, and it is the work of a few seconds to connect those actuators to the slam bail mechanism. If in some run of cards it is desired to use this section of the machine for some other purpose, such as alphabet printing, the totalizer or totalizers may be instantly disabled by withdrawing the plunger pins 412 (Fig. 38) and setting the connecting members 552 inactive.

The designation printing mechanism is best shown in Figs. 4, 5, and 11. This mechanism is so designed that the operator of the machine may select any desired type bars 176 for designation printing and can readily set the controls so that in listing operations designations will be printed only in connection with the first item of a group; and where the items are not printed, the designation will be printed from the first card without line spacing the paper and at the end of the group the total will be printed on the same line therewith. In any denomination wherever this operation is desired, the locking dog 547 is set in released position and the connecting member 552 is turned counter-clockwise to hook onto the blade 554 of the designation shaft 562. Unlike the other three shafts, 561, 505, and 506, which control the slam bail pawls, this shaft 562 normally stands in its counter-clockwise position and, when actuated, is rocked clockwise. Its blade 554 is, therefore, normally in such a position that, when one of the interponents 552 is hooked to it, the bar 544 is normally held forward with the pawl 533 locking the differential bar in its normal position, and, when the shaft is rocked, the bar 544 moves rearward, disengaging the pawl and allowing the bar to rise and the designation to be printed. The designation shaft is rocked clockwise by and whenever either the total shaft 505 or the grand total shaft 506 is rocked counter-clockwise. As shown in Fig. 4, these three shafts project through the right-hand end frame 156 into the boxlike enclosure thereof, and the shaft 506 has an arm 563, and the shaft 505 has an arm 564 each having a stud overlying an arm 565 fast on the designation shaft 562. The lengths of the arms 563 and 564 are so proportioned that either of them rocks the shaft 562 through the same number of degrees as it is itself rocked, but in the opposite direction. The shaft 562 is returned to its normal position by any suitable strong spring 559.

The rocking of the shaft 562 allows the springs 543 or 550 to release the pawls 533 from the designation racks and allows the racks to rise. However, during this total or grand total cycle, the latches 530 (Figs. 5 and 6) hold the stops 225 retracted so that the designation type bars rise to the full extent of their motion, which raises the lowermost type on the type bar above the printing line, so that no designation is printed during this cycle. Meanwhile, however, as shown in Fig. 5, when the shaft 562 is rocked clockwise, a pin 568 on an arm 570, fast on the right-hand end of said shaft, is caught by the hook of a bell-crank 571, and the shaft is thus held locked in rocked position. Said hook is influenced by a spring 572 and is connected by a link 573 with a bell-crank 574, whose horizontal arm lies above the path of movement of the restoring bar 201. On said restoring bar is a vertical pin 575 which, when said restoring bar reaches the top of its stroke, rocks the bell-crank 574 counter-clockwise and releases the hook 571. This occurs at mid-stroke of the total cycle, but the shaft 562 is at that time still held by the total or grand total shaft and does not return to normal position, and, as the restoring bar 201 descends, the hook will reengage the pin 568. Consequently, at the end of the cycle, the shaft 562 is still locked in its rocked position, leaving the designation type bars free to move upward during the first half of the next succeeding cycle during which cycle, the designation is printed from the first card of the new group. At about the middle of that cycle, the pin 575 releases the hook 571 and allows the designation shaft 562 to rock back to its normal position, throwing the pawl or pawls 533 back into engagement with their racks. During the down stroke of the restoring bar 201, these pawls click over the teeth of the racks and lock them in their lowermost positions until the next total taking cycle. The mechanism works as above described whether or not items are printed. As will be explained hereinafter, when the machine is set to non-list, the line space mechanism operates only on total-taking cycles.

In order to prevent flexure of the parts, cast brackets 576, having bearings for all four shafts 562, 561, 505, and 506, are strung along said shafts at intervals and secured by screws to the bars 537 and 538 (Figs. 2 and 11). Thus, each one of these six members has its stiffness supplemented by that of the other five.

The change of designation mechanism (Figs. 18 and 62), with a slight exception which will be noted, is of a form that has heretofore been in use in the Powers 90-column tabulator and which is described in the Lasker application S. N. 656,233, filed Feb. 11, 1933, now Patent No. 2,151,406, issued March 21, 1939. In principle it is similar to that described in the patent to Lasker 2,044,119, but has been modified from the disclosure in that patent in order to adapt it for 90-column cards. To that end there are provided for each front to rear row of set pins 131 two of the locking slides 142, one of said slides having locking teeth only for the rear six set pins corresponding to the upper zone of the card, and the other for the forward six set pins corresponding to the lower zone of the card. This is so that a change of designation in one of these zones would not release a pin previously set in the same vertical row in the other zone.

Also, each of the front-to-rear rows of set pins 131 has two change detecting slides 580, instead of one, as in the patent, these being distinguished like the locking slides 142 in that one of them has detecting noses or cams 950 for only the rear six set pins and the other for only the forward six set pins. In Fig. 62 there are shown one row of set pins and the cooperating mechanism; but this is made special in that several of the noses 950 are omitted. The corresponding positions on the card are reserved for control holes such as 953, 955 in cards 952, 954 (Fig. 61), or 956, Fig. 64. The omission of the noses makes these holes incapable of effecting a change of designation. Also, instead of the forty-five settable keys, as in the patent, there are ninety such keys 581 arranged in two sets as shown in the drawings. Each such key is slidable up and down to three positions and retained by a spring detent 582 engaging three notches in the end of the key stem. The key heads are arranged in four rows, the upper two rows corresponding to the upper zone of the card and the lower two rows to the lower zone of the card. Each of the upper keys has an interponent 583 pivoted thereto and adapted to cooperate with the end of a slide 580, and each of the lower keys also has an interponent 584 pivoted thereto for the same purpose. These interponents 583 and 584 alternate with each other across the machine. The interponents 583 cooperate with the slides 580 that have noses in their rear six positions, and the interponents 584 with those slides that have noses in their forward six positions. When any key is in its normal uppermost position, the interponent is inactive, but, if pressed down one notch, the lower end of the interponent will stand between its slide 580 and a bail bar 579 adapted when rocked to initiate a sub-total (group total) operation. When a key is depressed down to its third position, the interponent will connect its bar 580 with another bail bar 585, which, if rocked, will initiate a grand total-taking operation. In the Lasker Patent 2,151,406, the total bar 585 is above the bail bar 579, but in the present instance, it is directly beneath it and it is hung by two arms 586 from a rock shaft 587, pivoted in the sheet metal bracket 588, in which the key and interponent mechanism is mounted. The total bail 579 is suspended by two arms from a second rock shaft 590. In practice, when it is desired to take a sub-total on a change of designation in any one or more of the ninety columns of a card, the keys appropriate to those columns are set down one notch, whereupon a change of designation in any one of those columns will rock the bail 579 and shaft 590 to initiate a total-taking operation. Also, in whatever column or columns it is desired that a change of designation shall result in a grand total operation, the corresponding keys 581 are set down two notches.

If desired, some of the noses 950 may be omitted in one or more columns as in the case of the extreme right hand columns shown in Fig. 62. Here the two slides 580 are shown with only one such nose each, the remaining five set pins 131 in each column being incapable of actuating the change of designation mechanism. The corresponding positions on the card 968 (Fig. 64) may be used for special holes 956 to bring about subtraction or other special operations.

The total taking unit (Figs. 40 to 45, inclusive) resembles that described in the patent of W. W. Lasker, No. 2,151,406, but it has been considerably modified in detail.

As shown in Fig. 4, this unit comprises a casting 591 mounted on the right-hand end frame 101 of the base of the machine and having integral therewith a depending tube in which is journalled a vertical shaft 592 (Figs. 4 and 43) having at its lower end a worm wheel 593 constantly rotated by the worm shaft 103. At its upper end the shaft 592 has a worm 594 (Fig. 43) driving a worm wheel 595 for the sub-total cam sleeve and a second worm wheel 596 for the grand total cam sleeve. The main body of the casting 591 is somewhat in the nature of a box open at its right-hand end, which, however, is closed ordinarily by a removable cover 597. The bottom or left-hand wall of the box comprises a web 598 having integral therewith a number of posts or bosses for supporting certain shafts and pivots as will presently appear.

The worm wheel 595 is journalled on a fixed headed and shouldered sleeve or tube 600 extending through a boss in the web 598 and projecting both rightward and leftward therefrom.

On the leftwardly projecting portion of this tube is journalled the sub-total sleeve 601, on which are mounted the several cams which control the taking of a sub-total. Extending entirely through and journalled in the stationary sleeve 600 is a shaft 602 having clamped on its left-hand a sort of block 603 having a notch cut therein (Fig. 51) which embraces a pin 604 projecting from the outermost cam 605 on the sleeve 601. The construction is such that the shaft 602 can be slid lengthwise in the tube but it and the cam sleeve 601 are constrained to turn in unison.

Their relative angular positions can be adjusted to a nicety by loosening the clamp screw 606 (Fig. 51) and turning the shaft to its exact desired relation to the sleeve, the adjustment being secured by tightening the clamp.

The grand total worm wheel 596 is mounted in the same way as the sub-total wheel on a fixed sleeve or tube 607 which has journalled therein a shaft 609 which carries a block 608 adjustably secured by a clamp screw 610 and engaged by a pin 611 projecting from the end cam 612 on the grand total cam sleeve 613, which latter is journalled on the outside of the tube 607.

In order to clutch the total shaft 602 on occasion to its constantly rotating worm wheel 595, said shaft is slid lengthwise in the tube 600. On its right-hand end said shaft carries a peripherally grooved wheel 614 from the inner face of which projects a clutch pin 615 adapted (Fig. 40) to enter either one of two notches 616 cut in the hub of the worm wheel 595. A sub-total operation requires a blank cycle and a total-taking cycle. The wheel 595 is, therefore, geared to make one rotation for every two rotations of the main shaft of the machine. There are, therefore, two of these notches 616 spaced 180° apart, the pin 615 entering the one in front of which it happens to be at the beginning of the blank cycle. The engagement and disengagement of this clutch is controlled by a rock shaft 617. In order to facilitate assembling, this shaft 617 and a similar shaft 644 for the grand total clutch are journalled end to end in a block 599 set into notches in the casting 591 and secured in place by screws 619 (Fig. 40). A lug 618 at the middle of this block supports the adjacent ends of the shafts. Mounted on the rock shaft 617 are two arms 620, each at its upper end carrying a pin 621 engaging the peripheral groove in the wheel 614. The clutch is engaged by rocking the shaft 617 counter-clockwise (Fig. 42), and disengaged by rocking said shaft clockwise. On the outer end of the shaft 617 there is mounted a long horizontal arm 622, which near its free end carries a stud 623 projecting into a slot 624 in a locking member 625, pivoted at 626 to a sheet metal frame plate 627, secured to the left-hand side of the casting 591. The slot 624 has the outline shown in Figs. 42 and 44, that is to say, beginning at the bottom, the slot extends vertically upward, then curves to the right forming a shoulder 628 on which the pin 623 normally rests, and the slot thence extends vertically upward for a short distance. Also mounted on the shaft 617 outside of the casting is a vertical arm 630 to which is connected a spring 631 tending to rock the shaft counter-clockwise and thus to throw in the clutch. Normally the tension of this spring is borne by the pin 623 resting on the inclined shoulder 628 and tending to rock the plate 625 clockwise. This tendency is normally resisted by a hook 632 engaging an ear formed off from said plate 625. As best shown in Fig. 40 a post 633 projects toward the front of the machine from the frame plate 627, and it has pivoted at its end the common hub of this hook 632 and of another arm 634, which extends leftward and has an ear 635 formed off horizontally therefrom.

As best shown in Fig. 42, the sub-total rock shaft 590 of the change of designation mechanism projects to the right from its frame 588 and on its end is mounted a horizontal arm 636, the end of which lies beneath the ear 635 of the lever arm 634. The shaft 590 is dotted in Fig. 40, which also shows its arm 536. The construction is such that when the shaft 590 is rocked by a change of designation, the lever 634, is rocked clockwise (Fig. 42) releasing the plate 625 from the hook 632 and allowing the pressure of the pin 623 to rock said plate 625 and let the end of the arm 622 move downward, under the pressure of the spring 631, thus throwing the clutch into engagement.

The reason for including the locking plate 625 between the hook 632 and the arm 622 is that the forces which rock the shaft 590 on a change of designation are light and it is necessary that a hook to be released by that mechanism must have only a light frictional resistance on it. This is brought about by the inclined shoulder 628 which takes the direct pressure of the pin 623 and conveys to the plate 625 but a slight tendency to rotate clockwise, so that the pressure against the hook 632 is light enough to be readily released. Said hook 632 is influenced by a light spring 638. When, as will be presently described, the arm 622 is forced upward to release the clutch, the pin riding in the inclined part of the slot 624 will rock the plate 625 counter-clockwise until reengaged by the hook 632.

The grand total shaft is clutched to its worm wheel 596 in a manner resembling that just described, but necessarily differing in detail. The shaft 609 is slidable end-wise and is provided with a peripherally grooved wheel 640 carrying a clutch pin 641 like the other shaft. The end of the hub of the wheel 596, however, has three notches 642 spaced 120° apart, the wheel 596 being geared to make one rotation to three rotations of the main shaft of the machine, so as to provide for a blank stroke, a sub-total stroke, and a grand-total stroke. The peripheral groove in the wheel 640 is engaged by pins in the arms 643 projecting upward from the rock shaft 644 journalled end to end with the shaft 617 as above described. At its outer end (Fig. 41) this shaft carries a horizontal arm 645, a pin 646 on which projects into a slot in the end of an arm 647 mounted on the right-hand end of a long rock shaft 648. Said shaft 648 is suitably journalled at its ends in the casting 591 and extends clear across said casting and projects out beyond it at the front (Fig. 42) and has mounted thereon a horizontal arm 650. The connections are shown in Fig. 40, but more clearly in Fig. 45. The arm 650 is driven upward by a strong spring 651 tending to pull the grand total clutch into engagement. The pressure of this spring is normally resisted by a pin 652 projecting from the arm 650 and normally engaging an inclined shoulder 653 on the left-hand edge of a rocking plate 654 pivoted at 626 and performing substantially the same function for the grand-total mechanism as the plate 625 for the sub-total mechanism. The inclination of the shoulder 653 is such that the pressure of the pin comes largely on the pivot 626, but transmits a light rotating tendency to the plate 654. This plate has a formed-off ear which is normally engaged and held by a hook 655, the hub of which (Fig. 42) is pivoted on a post 657 projecting from the frame plate 627 above the post 633. On the outer end of this hub is mounted an arm 658 similar to the arm 634 and having an ear 660 formed off therefrom. A light spring 661 tends to cause counter-clockwise rotation of the plate 654 and of the lever 655—658.

As best shown in Figs. 40 and 43, the grand-total rock shaft 587 of the change of designation mechanism projects to the right of the frame 588 and has mounted thereon an arm 662, the free end of which lies beneath the ear 660. These parts are shown in dotted lines in Fig. 40. The construction is such that, when the shaft 587 is rocked by a change of grand-total designation, the arm 662 rocks the lever 658, 655 clockwise, releasing the plate 654 and allowing the pin 652 to move upward, rocking the shaft 648 clockwise and the shaft 644 counter-clockwise and engaging the clutch. At the proper time, the clutch is disengaged by forcibly rocking the shaft 648, 644 in the opposite direction, permitting the locking device to reengage. The arm 586 (Fig. 18) on which the grand-total bail 585 is mounted lies behind the sub-total bail bar 584 so that a grand total change of designation would not only rock the bail device 585, 587, but would also rock the sub-total bail 584, 586, even though it should happen that there was no coincident change of sub-total designation. Of course, the sub-total designation does change in the vast majority of instances at the same time as the grand-total designation, and it results that on a grand-total change both of the clutch engaging devices are tripped for operation, and it is necessary that the grand-total clutch be thrown in and not the sub-total clutch. To secure this result, the rock shaft 648 near its forward end has mounted thereon an upright arm 663 (Fig. 42) having pivoted thereto a link 664, having pin and slot connection 665 with the arm 639 which extends upward from the shaft 617. In the pin and slot connection 665 the left-hand end of the slot is at such a distance from the pin as to leave the shaft 617 free to rock counter-clockwise to connect the sub-total clutch, provided the shaft 648 does not at the same time rock clockwise. In other words, either necessary counter-clockwise rotation of the arm 639 or necessary clockwise rotation of the arm 663 would take up the lost motion in the slot, but both of these movements cannot occur at the same time. The spring 651 is made so much stronger than the spring 631 that when both devices are tripped off simultaneously the grand-total spring 651 prevails and forces the sub-total shaft 617 to remain in normal position.

The outlines and the immediate connections of the total control cams are shown in Figs. 46-51. Two pivot rods 670 (Fig. 42) and 671 (Fig. 41) project from the casting 591 and serve respectively as pivots for the follower levers of the total and grand total cams.

The card feed stop cams 605 and 612 (Fig. 51) are at the outer (lefthand) ends of the series. The former has its follower roller 672 mounted on a lever 673 carrying a stud 674 underlying the end of an in position to actuate the follower lever 675 whose roller rests on the cam 612 of the grand-total series. Each of these cams 605 and 612 consists of a concentric high portion throughout all of its periphery except immediately at the starting point where there is a depression. The levers 673 and 675 are, therefore, normally in their low positions, but will be rocked immediately on the beginning of a sub-total or grand-total operation and will remain rocked until the end of that operation, that is to say, through two cycles in the case of the sub-total and three cycles in the case of the grand-total. The lever 675 is of the first order and it operates a push link 676 which (Fig. 40) extends down into the base of the machine where it operates a bellcrank 677 pivoted on a fixed stud and connected by a link 678 with an arm 680 fast on a transverse rock shaft 681, said shaft extending across to the left-hand side of the machine where (Fig. 3) it has mounted thereon a latch 682 adapted to engage a notch 683 in the link 123, which operates the picker 118. At the beginning of a cycle this picker stands in its retracted position shown in Fig. 3, and at the beginning of the blank stroke the latch 682 is rocked into locking position and the picker is held in its retracted position until the next succeeding tabulating cycle. At this time, of course, the first card of the new group, in which the change of designation was detected, is in the card chamber.

The bell-crank 677 (Fig. 40) operates a pull link 684 connected by pin and slot 686 with an arm 685 fast on and projecting forward from the rock shaft 134, which (Fig. 3) controls the card stop 132. At the beginning of every cycle, this card stop is held in its down or stop position by the card-stop cam 141 of the base section, and the pin is, therefore, normally in the bottom of the slot. When the mechanism now being described is operated at the beginning of a total or grand total operation, the link 684 moves downward and takes up the lost motion in the slot so that the card stop will be retained in its down position throughout the two or three cycles of operation. This first card of the new group will, therefore, be in operative position at the beginning of the next tabulating cycle.

Figure 51:
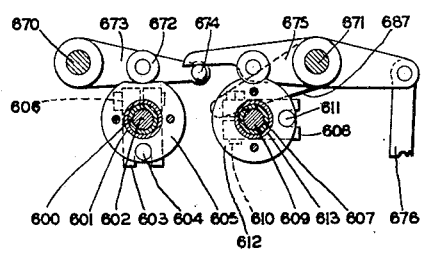

Mounted on the hub of the lever 675 is another arm 687 shown in dotted lines in Fig. 40, and Fig. 51, and shown also in section in Fig. 41. This arm carries a pin 688 adapted to rock an arm 690 fast on the change of designation shaft 590. The construction is such that this shaft 590 is positively held in its normal position so as positively to return this shaft and with it the upper shaft 587 to non-tripped position and to hold them there during the entire total-taking operation. It will be understood that in this machine the set-pins 131 do not move up and down during the two or three strokes of a total or grand total-taking operation, as they do in the regular Powers machine. This is because in the present machine the retract mechanism controlling the locking slides 143 is not affected by the total-taking mechanism. During these total-taking cycles the same card is in the chamber, and, once the pins are set, they remain set until the next succeeding card is fed in.

In order to extend the lever 687 leftward to its desired position and, at the same time, to provide angular adjustment of it relative to the lever 675, the hub 691 (Fig. 41) of said lever 675 is elongated and the hub 692 of the arm 687 is counterbored to receive the hub 691. Relatve adjustment is maintained by a set screw 693.

The second cams 694 of the sub-total group and 695 of the grand total group (Fig. 50) are called the credit balance cams because these cams operate the mechanism which tests the totalizer and sets the mechanism for subtraction in case the total on any totalizer is negative. The follower lever 696 of cam 695 is adapted when rocked to rock also the follower 697 of the cam 694 and the latter operates a pull link 698.

The outlines of the two cams are such that when either kind of total is taken this link is pulled at the beginning and is held pulled until the end of the operation. Said link 698 is pivoted to the inner one of two parallel arms 700, whose common hub is pivoted on a stud 701 (Figs. 2, 5, and 54) in order to carry the motion in closer to the right-hand end frame. The right-hand arm 700 is connected by a link 702 with a bell-crank 703 fast on a lower credit balance rock shaft 704, the other arm of said bell-crank being connected by a link 705 with an arm 706 fast on an upper credit balance rock shaft 707, said shafts situated respectively just above the rods 428 and 406 hereinbefore described. The construction is such that, when the link 698 is pulled, these two rock shafts are rocked clockwise in unison.

The mechanism whereby the rocking of the credit balance shafts 704 and 707 at the beginning of each total taking operation, automatically sets to subtract condition any totalizer which at the time registers a negative total, is shown in Figs. 1, 8, 10, 14, 21, and 23. In each totalizer the right-hand or units lever 310, which carries the units subtract pinion 305, has projecting rightward therefrom, a stud 710 and the lower or add lever 307 in units place has a similar stud 711. Pivoted at 712 to the right-hand stationary frame plate 297 of the totalizer is a lever 713 having at its upper end a rearwardly projecting finger 714 having a vertical edge, and having at its lower end a vertical working face 709. This lever 713 is capable of occupying two positions in which it is retained by a spring drawn latch 721 having two notches engaging an arm of the lever 713, said latch 721 being pivoted at 722 to the frame plate 297.

In Fig. 1 the positions of the two levers 713 signify that the upper totalizer registers a negative total and the lower totalizer a positive total. The operation of setting this lever is illustrated diagrammatically in Fig. 8. In this figure, the positive positions of the parts are indicated in full lines and the negative positions in dotted lines.

Beginning with the lever 713 in the full line position signifying a positive total and with the parts set for addition, the two pins 710 and 711 occupy the positions $A_1$. When the totalizer is moved into mesh with the racks these pins move to $A_2$ and when the totalizers are withdrawn from the racks, they move back to the position $A_1$. If now the machine is to be set for subtraction, the upper lever 310 will move toward the right, the lower lever 307 toward the left, bringing the two pins to the positions marked $S_1$. When, now, the totalizer is moved into engagement with the racks, these pins move to the positions $S_2$. If in the succeeding subtraction the subtracted number exceeds the positive total, the fugitive 1 will be transferred to units order and levers 310 and 307 will swing upward, the pins moving up to the positions $S_3$. It will be observed that in this position the lower pin 711 is now just back of the lower working face of the lever 713. When the totalizer is drawn out of engagement with the racks the pin 711 will move to the position $S_4$ and the lever 713 will be rocked to its dotted line position to signify the presence of a negative total. After the totalizer has been withdrawn, the levers 310 and 307 will drop down to their lower positions and the pins will return to the positions $S_1$. During these movements the upper pin 710 was at the rear of and out of reach of the finger 714. Nothing further will happen to the lever 713, until a number is added which exceeds the negative total. For this adding operation the parts 310 and 307 would be returned to their full line positions and, when the totalizer is moved into engagement the pins will move from A1 to A2. When the fugitive 1 is added, they will swing up to A3 and, when the totalizer is withdrawn, they will move back to A4. In this operation it will be noted that the lower pin is entirely away from the working face 709 of the lever 713, but the upper pin will swing the lever back to its positive position by abutting the vertical edge of the finger 714. When the levers 310 and 307 drop back to normal the pins will resume the positions A1. It will be observed that when the lever 713 is in its positive position, its lower end is within the range of movement of the lower pin 711, but only when the totalizer is set for subtraction. On the other hand, when the lever 713 is in its negative position, then in adding operations, it is within the circuit of movement of the upper pin but out of the circuit of the lower pin.

As shown in Figs. 14 and 21, the lever 713 of each upper totalizer is connected by a link 723 with a guide lever 724 pivoted on the stud 420 projecting from the stationary frame plate 297. This lever 724 in turn has pivoted thereto a link 725 which extends toward the front of the machine being pivoted at 726 to a link 727 pivoted to a stud 728 on the arm 405 hereinbefore described. The construction is such that, when the lever 713 stands in its negative position, shown in Fig. 14, the forward end of link 725 stands beneath a stud 730 on an arm 731 fast on the credit balance shaft 707; but, when the lever 713 is swung to its positive position, the link 725 moves rearward and clear of the stud 730. The train of mechanism just described is duplicated for each lower totalizer, where similar letters of reference have been applied, the lower arm 731 being fast on the lower credit balance shaft 704. The link 727 for the lower totalizer is, however, pivoted to the lever 427.

Returning to the credit balance cams 694 and 695, it will be recalled that immediately upon initiation of either a total or grand total operation, that is to say at the beginning of the blank cycle, one of these cams pulls the link 698, resulting in a clockwise rocking of the shafts 704 and 707. If on any totalizer, the total is positive, this rocking will be an idle one, as in the case of the lower totalizer shown in Figs. 1 and 10. If, however, as in the case of the upper totalizer shown, the total is negative, then the stud 730 will depress the link 725 and its connecting link 727, rocking the arm 405 or 427 as the case may be and setting the mechanism to subtract condition, wherever the totalizer indicates a negative total. This occurs at the beginning of the blank cycle and the condition is maintained throughout the total taking operation. It will be noted that the swinging of the lower arm 427 in Fig. 10 does not rock the lever 434, and, therefore, does not pull down the link 450 in case there is a negative total on the lower totalizer. Also, this link has a slot in its upper end so that the depression of the upper arm 405 to set the upper totalizer to subtraction does not affect the lower one.

When a grand total is taken, both the upper and the lower totalizers are conditioned on the blank cycle each to its appropriate sign, and this condition is maintained throughout the operation. Thus, with the parts as shown in Fig. 10, on a grand total operation a positive total would first be taken from the lower totalizer followed by a negative total from the upper totalizer.

Some of the connections above described are shown in front elevation in Fig. 27, where the shafts 704 and 707 are shown partly in broken lines to avoid hiding other parts. It will be seen that the construction is such that a set of the arms 731, 405, 433, 434, 441, etc., can be placed anywhere along the shafts 707 and 704 and the rods 406, 428, and 440, for cooperation with a totalizer or pair of totalizers wherever the latter may have been fixed along the bars 295.

Figure 49:
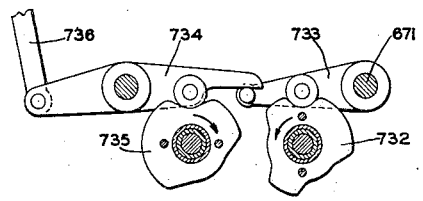
Figure 50:
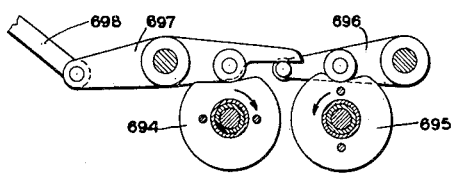
Figure 53:
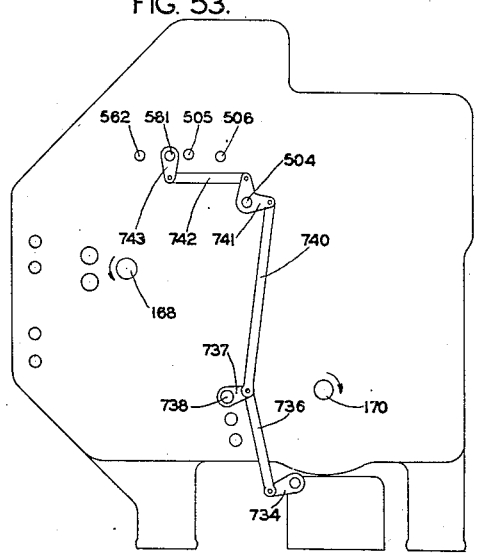
Figure 54:
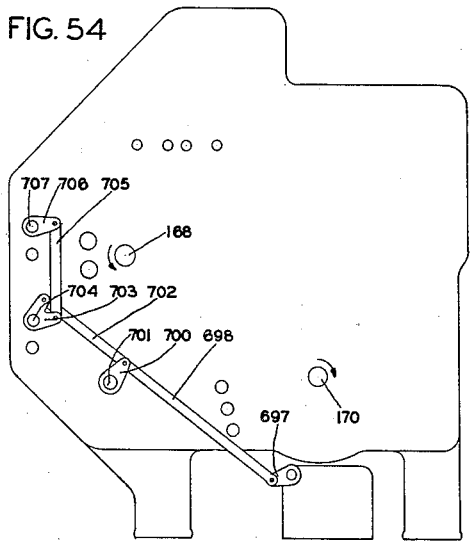
Figure 55:
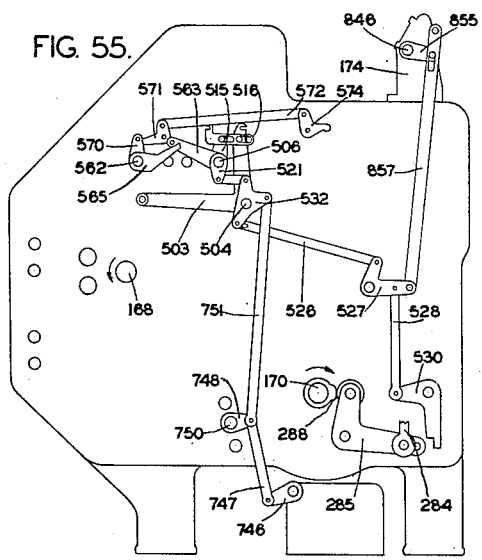

The slam bail cams 732 and 735 shown in Fig. 49, operate as follows: The cam 732 on the grand total sleeve has a follower lever 733, a stud on which underlies the follower lever 734 of the cam 735 on the sub-total shaft, and the latter lever actuates a pull link 736. It will be perceived that this link will be pulled by either of the cams. Its connections are shown in Fig. 53. It operates one of two parallel arms 737, whose common hub is pivoted on a stud 738 (Fig. 5), the inner arm 737 being connected by a link 740 with a bell-crank 741 pivoted on the stud 504 and connected by a link 742 with an arm 743 fast on the slam bail shaft 561 hereinbefore described. It will be recalled (Fig. 11), that, when this shaft is pulled, the slam bail pawls 533 controlling the differential bars 176 that cooperate with the totalizers are thrown into engagement with the racks permitting downward movement of the racks, but preventing any upward movement of them. The outline of the cam 735 is such as to throw in the slam bails during practically the whole of the blank cycle and during the last half of the total-taking cycle. The first operation prevents any of these racks from rising during the blank stroke. When the pawls are thrown in at the middle of the total-taking stroke, the racks have already risen and the pawls prevent them from jumping upward when the totalizers are withdrawn from mesh, the pawls clicking over the teeth of the racks as the latter are pulled down to normal position. The cam 732 on the grand-total shaft has such an outline as to throw in the slam bails during practically the whole of the blank stroke or, at least, until the controlling bar 201 is returned to normal and also to throw them in during the last half of the total stroke, and again during the last half of the grand-total stroke. It will be understood that where any differential bars are not desired to be raised during the blank stroke, such for example as those used for adding and for alphabet printing, they may have their control bars 544 connected to the slam bail shaft 561 by setting their connectors 552. The grand-total cam 744 (Fig. 48) has its follower lever 745 connected to rock lever 746 pivoted on the stud 670 so as to pull a link 747. There is, of course, no cam on the sub-total sleeve to operate this lever and link. This link (Fig. 55) operates one of two parallel arms 748 (Figs. 2 and 55) pivoted on a stud 750, the one of said arms nearest the end frame 156 being connected by a link 751 with the three-armed lever 532 hereinbefore described. This lever is connected by the link 522 with the grand-total shaft 506 and rocks it in the latter part of the total cycle. In Fig. 55, the other connections from this shaft to the designation shaft 565 and to the latch 530 are indicated.

The total cam 752 (Fig. 47) on the grand-total sleeve has its follower lever 753 arranged to rock also the follower lever 754 of the total cam 755 on the total sleeve. The lever 754 pulls a link 756 which (Fig. 52) pulls one of two parallel arms 757, whose hub is pivoted on a stud 758, and the right-hand arm of which pair pulls a link 760, which operates one of the three-armed levers 532 hereinbefore described. The lever 532 is connected by the link 522 to an arm 524 fast on the total shaft 505, so that the said shaft is pulled by either one of the cams 752, 755.

Figure 52:
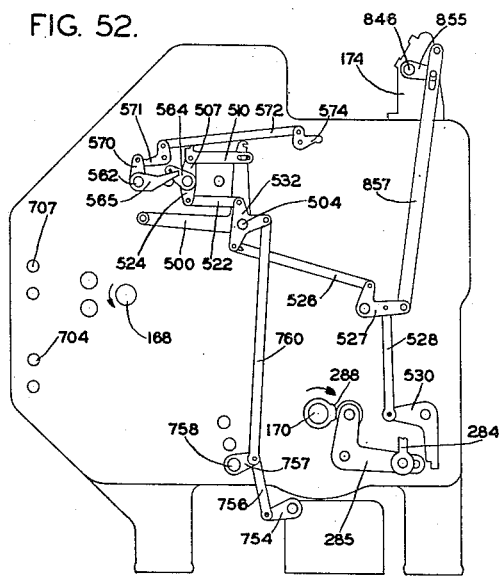

It will be noted that each of the total-taking cams 752 and 755 and also the grand-total cam 744 pulls its follower a little before the end of the cycle preceding the total-taking cycle. The principal reason for this has to do with the latch 530. It will be noted on the timing chart that the stop retract cam 288 withdraws the stops in the latter part of each cycle, but, at the very end of the cycle, these stops are moving back to active position. In other words, the bell-crank 285 has already begun to rock counter-clockwise as shown in Figs. 52 and 55. Therefore, the total or grand-total shaft is pulled in time to cause the latch 530 to catch the bell-crank 285 and hold it before it goes off its cam.

Figure 46:
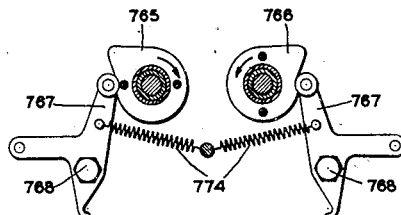
Figure 47:
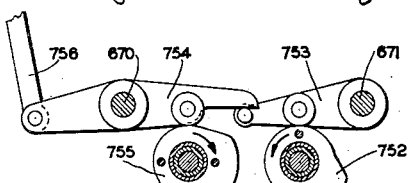
Figure 48:
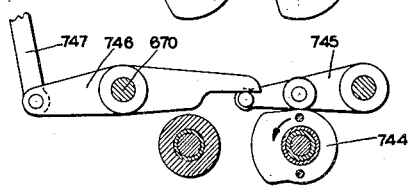

The rotation of the total and grand-total sleeves is brought to an end by the cams 765 on the total sleeve and 766 on the grand-total sleeve (Fig. 46). Each of these cams has its follower lever 767 pivoted at 768 to the left-hand face of the frame casting of the total-control unit. The mode of operation is best shown at the right of Fig. 40, which shows the one for the grand-total sleeve. Said lever 767 has a horizontal arm to which is pivoted a lever 770 drawn clockwise by a spring 771 and having a hooklike shoulder 772 adapted to engage under an ear 773 formed off from the arm 645, which controls the shaft 644, and the grand-total clutch. Each of the cams 765 and 766 has a concentric low part followed by a high point with sloping sides. The lever 767 remains stationary until sometime in the grand-total cycle, when it is swung clockwise by the cam until the roller rests on the peak of the high part. At this time, the hook 772 is caught under the ear 773, which, at that time, is in depressed position below the normal position shown in Fig. 40. When the roller starts down the incline of the cam, the strong spring 774 by which it is controlled pulls up on the hook 770—772, restoring the arm 645, and the clutch to normal position, where they are latched by the locking mechanism hereinbefore described; and the pressure of the follower roller on the cam completes the rotation of the cam sleeve to normal position. As the hook lever 770 approaches the upper limit of its motion, its horizontal arm strikes the underside of a toe 775 of a bracket screwed to the side of the casting 591, thus forcing the hook out of engagement with the ear 773 where it remains until the next unclutching operation. The bracket 775 is adjustable up and down to regulate the precise instant at which the shoulder 772 is released from the ear 773. The operation of the disconnecting sub-total clutch is identical with that described except that the parts are left-handed as compared with those of the grand total. The parts described are shown in plan view in Fig. 43 and in edge view in Figs. 41 and 42.

In the Powers machine as heretofore constructed, a total control mechanism is used generally resembling the one above described, and in many of its details identical with it. In that mechanism, however, the sub-total cam sleeve runs for three machine cycles and the grand-total cam sleeve for four machine cycles. These sleeves thus turn so slowly relative to the speed of the main shaft that it is necessary to make the cams very steep in order to secure the requisite amount of motion within the required number of degrees of rotation of the main shaft. The extra cycle was made necessary or preferable in the old total control mechanism by reason of the fact that that mechanism disabled the lock slides 142 (Fig. 18) during the two or three cycles of the total-taking operation, allowing the set pins 131 to move down and up at each of those cycles, and it was necessary to wait until late in the total-taking cycle before these devices could be released from the control cams. This would result in a timing so fine that it was considered more practical to let the cams run on through an extra rotation. In the present machine these locking slides 142 are not disabled during total-taking operations, and the fine timing encountered in the old control mechanism, therefore, does not occur in this machine, and it is easily practicable to rotate the sub-total cam sleeve during only the two cycles (blank and total-taking) and the grand-total sleeve through only the three cycles (blank, total and grand-total). The result is that the inclines on the cams do not have to be as steep as in the former construction, and the operation is thereby improved.

In order to print at the right of each total a character suitable to designate the total, the following means are provided (Figs. 1, 14, and 21). As has been explained heretofore, at the right of each group of bars 176 that are used for actuating totalizers, there are a few such bars that cannot be used for adding purposes, and that one of those bars immediately at the right of the units position is used to set the machine for subtraction, and also to print a sign to indicate that the item was subtracted. This same bar is utilized in the present machine to print an indication of the fact and the character of each total. To this end said bar has projecting to the right thereof two studs or lugs 776 and 777 to act as stops for the bar. These lugs also serve a useful purpose as spacers between adjacent bars and they are, therefore, preferably made on all of these bars 176 so that any one of said bars can be utilized for these designation purposes.

Stops 778 and 780 are mounted respectively on the upper and lower right-hand auxiliary plates 115 of each upper totalizer, and like stops on the right-hand auxiliary plates 315 of each lower totalizer. The upper and lower plates 315 are relatively shifted in setting the machine for addition and subtraction. In Figs. 1 and 14 the upper totalizer is shown in add position and its lower stop 780 projects almost into the path of the upper lug 777. When the totalizer is moved into engagement this stop will move into the path of said lug and when the total is taken will arrest said lug and the bar 176 in a definite position. The type thus brought to printing position will be in line to print a character designating a positive grand-total. If, however, the grand-total is negative, the stop 780 will be withdrawn toward the front of the machine and the stop 778 projected into position to arrest the lug 777. The type thus brought to printing position will be one to indicate a negative grand-total. Similar operation occurs in the case of the lower totalizer, whose lower stop will arrest the lug 776 in position to cause a character to be printed to designate a positive sub-total and whose upper stop will arrest said lug 776 in position to cause the printing of a sign to indicate a negative subtotal. These stops are pivoted to their respective plates and each is urged by a suitable spring 783 to rotate counterclockwise until arrested by a stop 784 (Fig. 14). In case one of the lugs 776 or 777 gets above its appropriate stop and is in that position when the restoring bar 201 is drawn downward, the stop can yield by a clockwise rotation and let the lug pass. As has been explained hereinbefore, it is a simple matter to remove any of the types from one of these type bars and to substitute for it one suitable for any desired designation. The stops 778 and 780 come into action only in total or grand total cycles. In adding operations the designation type bar 176 is held down by its zero stop 228 (Fig. 16). In subtracting operations it is arrested as above described after rising to the extent of two of its teeth 180, which is before the lugs 776 and 777 reach their cooperating stops. In total-taking cycles, all stops 225, 228, and 230 are held retracted, and the designation bar rises until arrested by whichever one of the stops 778, 780 is in active position at the time.

The paper carriage is best shown in Figs. 15 and 56—60. The main body of the carriage consists of a bar 785 to the back of which the rails 172 are secured by screws. These rails run on the oppositely grooved stationary rails 173 by roller bearings here shown as balls but which are preferably cylinders. The rollers are controlled in the usual way by any suitable spacing device. That shown comprises the usual bars 786 having perforations surrounding the rollers and each connected to the pivotal bearing of a pinion 787, which on one side runs on a stationary rack 788 fast to the stationary rail 173 and at the other side on a rack bar 790 fast to the rail 172. The carriage is thus settable to any desired position right and left, and any suitable means may be provided for retaining it in set position.

The platen 175 has its shaft 791 journalled in the end frames 792 of an auxiliary carriage comprising a long cross-bar 793 (Fig. 15) having the end frames 792 secured thereto by screws 794 (Fig. 58). The platen is normally at a little distance from the type ends as shown in Fig. 15 and at each printing operation the auxiliary carriage 793 is moved bodily forward relative to the main carriage 785. By having the platen normally in its withdrawn position, it becomes unnecessary to provide restoring mechanism for the types as they will not be interfered with in their up and down motion by the platen or the ink ribbon, even if they occupy their rearmost positions at the time.

The means for vibrating the auxiliary carriage to and from printing position are as follows: Secured by screws 795 to the lower edge of the main carriage bar 785 are two brackets 796 (Figs. 15 and 58), one at each end of the carriage; and in said brackets there is journalled a long rock shaft 797 having fast on each end thereof an arm 798, which is pivoted to the end bracket 792 of the auxiliary carriage on a stud 800, the center of said stud being directly above the axis of the shaft 797 when the carriage is in mid-stroke so that the pivot moves practically horizontally toward the front. A second arm 802 is pivoted to each end of the main carriage 785 at 801, said arm being provided at its upper end with a slot which slidably embraces a block 805, said block being pivoted on a stud 803 projecting from the end frame 792. The arm 802 is operatively connected to the arm 798 by a link 804. The block and slot connection of the arm 802 allows the same pivotal movement as if the arm were pivoted directly to the stud 803, but obviates any danger of binding due to inaccuracy of construction. When the shaft 797 is vibrated, the auxiliary carriage moves a short distance horizontally forward and back. Said auxiliary carriage is held in its normal rear position by springs 806, one anchored on each end frame 792 and connected to the arm 798.

The carriage is vibrated as above described at the instant of printing by the following means. Throughout a sufficient part of its length between the two brackets 796 (Fig. 15), the shaft 797 is slotted lengthwise and in said slot is seated a blade 807. At each side of the machine there is secured to the upper part of the end frame 156 or 157 a bracket 808 (Fig. 6), said bracket being secured in part by the same bolts that secure the bracket 206 (Fig. 56). Journalled in the two brackets 808 is a long rock shaft 810 having fast thereon two arms 811, one at each side of the machine, each of said arms carrying a roller 815. At least one of said rollers bears on the blade 807 at any lateral position of the carriage, so that the shaft 810 may rock the shaft 797. Near each of its ends the restoring bar 201 carries an adjustable post 814 (Fig. 60) adapted to strike and elevate a screw post 812 screwed through the arm 811 and secured by a clamp screw 813. As said restoring bar approaches the top of its stroke at a little before mid-cycle, the post 814 striking the screw 812 rocks the shaft 810 clockwise and the shaft 797 counter-clockwise and moves the auxiliary carriage frontward.

It will be noted that, at the time when this mechanism is thus operated by the restoring bar, the pitman which operates said restoring bar is near its dead-center and the bar is, therefore, not moving at a high speed. On the other hand, as the pitman is near its dead-center, it is prepared to resist a heavy pressure of the types against the platen. As will appear hereinafter, the types are thrown back against the platen at this same instant.

The line spacing mechanism for the platen is best shown in Figs. 56, 57, and 59. Outside the right-hand end frame 792, the platen shaft 791 has a line-space ratchet wheel 816 fast thereon and adapted to be engaged by a feed pawl 817 which is pivoted at 818 to a plate 820 which carries a stud 819 to limit the rocking of the pawl. The plate 820 is itself pivoted on the platen shaft 791. In order to guide this plate and to limit its motion, it has a concentric slot 821 through which passes a headed stud 822 secured to the end frame 792. The pawl 817 has an operating link 823 pivoted thereto at 824 forward of its own pivot 818, and the upper end of said link is pivoted to a three-armed lever 825 pivoted at 826 to the end frame 792. A second arm of this lever is connected to a restoring spring 827. A third arm of the lever 825 is connected by a vertical link 828 with an arm 830 fast on a rock shaft 831 which (Fig. 58) is journalled in the brackets 796 parallel with the shaft 797. This shaft 831 is on the main part of the carriage and the lever 825 is on the auxiliary carriage. The link 828 is, therefore, disposed substantially vertically so as to permit of the vibration of the auxiliary carriage without affecting the operation of the link. The shaft 831 is grooved the same as the shaft 797 and a blade 832 is seated in said groove (Fig. 15). A rock shaft 835, journalled in the stationary brackets 174, has fast thereon arms 833, each having a roller 834 bearing on the blade 832, said arms so disposed that at least one of them will rest on said blade in any lateral position of the carriage.

In order to operate the shaft 835 and, therefore, the line-spacing mechanism, said shaft has near one end an arm 836 pivoted to a long link 837 (Fig. 5) which extends nearly to the bottom of the head, where it is pivoted to a lever 838, pivoted on the stud 286 and having at its forward end a follower roller 840 bearing on a cam 841 fast on the rear cam shaft 170. This cam is shown as an eccentric and at the normal or stop position of the machine shown in Fig. 57, its high point has moved a little past the roller 840. When the machine is started, the spring 827 will rock the shaft 835 clockwise, and the shaft 831 counter-clockwise swinging plate 820 and pawl 817 upward until the low part of the cam 841 is at the follower, when the cam will reverse these motions. When the link 823 starts downward it first swings the pawl 817 into engagement with the ratchet 816, and then forces the pawl, the plate 820 and the platen clockwise until the follower is on the high point of the cam. At this moment a tail of the pawl 817 strikes a fixed stud 829 and jams the tooth of the pawl toward the wheel, thus preventing overthrow of the wheel and platen. When the link 823 then starts to move upward, the first part of its motion swings the pawl clockwise out of engagement. This is the position shown in Fig. 57 and it is the stop point of the machine, in which the pawl is at the bottom of its stroke and out of the wheel, so that the platen is free to be turned by other means for removal and insertion of the paper, etc. In order to insure the described swinging of the pawl 817 about its pivot 818, a friction washer may be associated with the headed stud 822 to resist slightly the rocking of the plate 820.

In order to regulate the extent of line space feed, the following means are provided. In the specific machine illustrated, the cam 841 imparts to the feed pawl 817 a maximum vibration corresponding to three teeth of the ratchet 816. Fast on the shaft 835 near its right-hand end (Fig. 57) is an arm 842 having a pin 843, the upward rocking motion of which is adapted to be limited by one of four steps 844 in the edge of a plate 845 pivoted on a rock shaft 846, which shaft is journalled in the stationary brackets 174 (Fig. 5). Adjustment of the stop plate 845 is afforded by a spring-pressed plunger 847 adapted to be seated in any one of four holes 848 in a plate 850 fast on the shaft 846. The first step 844 is adapted to arrest the pin 843 at such a point as to permit the pawl 817 to advance to the dotted line position of Fig. 57, that is to say, to the extent appropriate to three teeth of the ratchet 816; the second step 844 will permit the pawl to be advanced by the spring 827 two teeth, the third step 844 will permit it to advance one tooth, and the fourth step 844 will prevent it from advancing at all. In this last adjustment no line spacing can occur.

In order that special line spacing may be effected, as, for example, on taking totals, if desired, the following means are provided: This is done by a counter-clockwise rocking of the shaft 846 and plates 850 and 845 to bring into the path of the pin 843 a higher one of the steps 844. Loose on the shaft 846 is a third plate 851, whose counter-clockwise rotation is limited by a pin 852 projecting from the bracket 174 (Fig. 56). This plate 851 can be adjusted to four different positions relative to the plate 850 by the use of a spring plunger having a button 853, said plunger adapted to be seated in any one of four holes 854 in the plate 850. Clockwise rotation of the parts is limited by a fixed pin 859 (Fig. 56) struck by the plate 850.

At a suitable point in its length, the shaft 846 has fixed thereon an arm 855 (Figs. 5, 57, and 59), said arm having a pin 856 passing through a slot near the upper end of a link 857, which at its lower end is pivoted on the bell-crank 527 (Fig. 5) hereinbefore described. At its upper end the link 857 has a pin 858 connected by a spring 860 with the pin 856 so as normally to hold the latter pin in the top of its slot. It will be recalled that the bell-crank 527 is rocked counter-clockwise whenever either the total shaft 505 or the grand total shaft 506 is pulled. This motion causes an upward motion of the link 857 tending through the spring 860 to rock the shaft 846 counter-clockwise, which it will do until said shaft is arrested by the plate 851 contacting the pin 852.

Obviously the link 857 or its equivalent part may be operated by other means than from the total shaft of a tabulating machine.

Various combinations of line spacing can be obtained by suitably setting the two buttons 847 and 853. A characteristic setting is shown in Fig. 59, where the button 847 has its plunger set in the second hole 848 to permit single spacing of the paper during tabulating cycles, and where the button 853 has its plunger set in the third hole 854, thus normally removing the upper end of the plate 851 two spaces from the stop 852. With the parts set in this position, all items will be single spaced because the pin 843 will be arrested by the third shoulder 844 at such a distance as to enable the pawl 817 to advance to the extent of but one ratchet tooth. However, during a total or grand total taking cycle, the link 857 is pushed up and the spring 860 will rock the shaft 846 and the parts mounted thereon counter-clockwise until arrested by the stop 852, which, in this instance, will be to the extent of two spaces. This will bring the first step 844 into the path of the pin 843 so that the latter will rise three spaces until arrested by the first step 844 and the paper will be triple spaced in the total taking cycle.

Another characteristic setting is to put the plunger of the button 847 in the first (frontmost one) of the holes 848, thus bringing the fourth step 844 over the pin 843 to prevent any line spacing. At the same time, the upper button 853 may be set in the second, third, or fourth hole 854 to remove the upper end of the plate 851 one, two or three spaces from the stop 852. This is the setting suitable for tabulating work (printing totals only). There will be no line spacing when items are accumulated but on a total taking operation the link 857 will rise and rock the shaft 846, and, with it, the plate 845 counter-clockwise one, two or three spaces as the case may be, allowing the paper to be either single, double, or triple spaced, depending on the setting of the button 853. When the plunger 853 is in the first hole 854, as shown in Fig. 57, the rising of the link 857 at total-taking will merely stretch the spring 860 and will make no difference in the extent of line space as determined by the setting of the plunger 847.

The carriage may be equipped with suitable paper handling and ink ribbon mechanisms and with other devices as desired. As here shown (Fig. 58) the caps 861 for the bearings of the platen shaft 791 have each secured thereto a depending bar 862, and these two bars support a cross bar 863 to which is secured a platen plate 864, the upper edge of which (Fig. 15) rests against the platen a little below the printing line. The usual or any suitable feed rolls 865 (Fig. 15) are releasably spring-pressed against the under part of the platen to feed a web of paper 866, the spool 867 of which is mounted on a shaft 868, which (Fig. 56) is removably mounted in a pair of brackets 870 extending upward from the end pieces 792 of the auxiliary platen frame. At the delivery side of the platen, the paper is fed back under a cutter bar 871 extending across the machine above the platen and having an edge against which a section of the paper may be torn off.

As here shown, a ribbon spool 869 is mounted just inside each one of the end pieces 792 on a stud 873 and the ribbon 874 is led from one of the spools through a turning bar 875 and is thence led across the front of the platen at the printing line. The ribbon spools may be driven in any suitable way. As here shown, each one has a ratchet wheel 876 engaged by a feed pawl 877 pivoted to a rock arm 878 so as to be capable of reciprocating over the teeth of the ratchet. This pawl has a tail with a notch in it engaged by a pin 880 on an arm 881 loose on shaft 826 on the outer end of which the three armed lever of the line space mechanism is rigidly secured. Fast on this shaft at each end of the carriage is an arm 882 having a stud that lies in front of the arm 881. When the lever 825 is rocked counter-clockwise (Fig. 57), this arm 882 swings forward from the position shown in Fig. 15 and the pawl 877 is caused by a spring 879 to follow it far enough to engage the next tooth of the ratchet 876. At the end of the return movement of the lever 825 and arm 882, the stud on said arm moves the pawl far enough to feed the ribbon. The ribbon will thus be fed the same distance, however far the platen may be turned at each operation, and whenever the platen is not turned the ribbon will also not be fed. Any suitable ribbon reverse mechanism may be provided, so arranged as to engage one of the pawls 877 with its ratchet and to disengage the other.

The means for driving the types against the platen to print may, as far as the parts of the invention already described are concerned, be of any suitable character. The means employed in the specific machine illustrated are shown in Figs. 4 to 7 and Figs. 11 and 60. For each type bar 176, there is provided a firing pin 883 consisting of a horizontal bar guided at its rear end in a comb plate 884 secured to a cross bar 885, which (Figs. 5 and 6) is secured by screws to blocks 886 bolted to the inner faces of the end frames 156—157. The firing pin 883 has a headed stud 887 running in a slot 888 in an arm or lever 890 pivoted at 891 to a frame bar 892. A stiff spring 893 connects the firing pin 883 with the arm 890 so as to press the stud 887 firmly into the rear end of its slot 888. Printing is effected as shown in Fig. 60 by rocking the lever 890 forcibly rearward causing the firing pin to strike the type and press it against the platen at the same instant that the platen itself is moved forward to printing position, the spring 893 allowing an excess motion to the lever 890 and pressing the type against the ink ribbon and paper. The spring 893 has its line of pull a little below the pin 887 tending to rock the rear end of the firing pin upward so as to cause it to rub against the lower edge of the bar 885 or the upper wall of the slot in the plate 884. Said slot is elongated downward so that in case by any chance the firing pin has not been withdrawn when the type bar is pulled downward, the types dragging over the rear end of the pin will merely swing the pin downward in its slot until it is out of the path of the types without injury to any part of the mechanism.

The frame bar 892 has the L-shaped cross section shown and the series of levers 890 are pivoted to it in such a way as to make it easy to assemble them and easy to remove them in case of necessity. To this end a number of pivot blocks 895 are screwed to the lower edge of the bar 892, each of these blocks being only of a length to accommodate a convenient number of the levers. In the present machine, each block carries ten of said levers, each block having its forwardly projecting part slotted to guide the levers, and the pivot 891 consisting of a pivot rod of suitable length inserted as shown. The bar 892 is secured in position as shown in Figs. 5 and 6 by being bolted to blocks 896 which in turn are bolted to the inner face of the end frames 156—157.

The power to operate the arms 890 is furnished from the motor through a bail bar 897 mounted on arms 898 pivoted to the end frames 156 and 157 on studs 900 as perhaps most plainly shown in Fig. 6. The arms 898 normally rest on a crossbar 901 secured to the blocks 896. When this bail-bar 897 is rocked clockwise (Figs. 11 and 60) it rocks in each denominational position a control link 902 having a head 903 capable of occupying an inactive position shown in Fig. 11 and an active position shown in Fig. 60. When this link is in its latter position, the head 903 stands between the bar 897 and a shoulder 904 on the arm 890 so that the motion of the operating bar will be transmitted to said arm as shown. When, however, said link is moved upward and forward to its inactive position shown in Fig. 11, an operation of the bar 897 will merely move the head 903 idly past the shoulder 904, without operating the arm 890. This control link 902 is pivoted at its lower end to a lever 905 with which it is also connected by a spring 906. The arm 890 has a strip or bar 907 pressed out therefrom, as shown in Fig. 12 to act as a guide for the link 902.

The lever 905 is pivoted to the frame bar 892 at 908 through the intermediary of pivot blocks 910 similar to the blocks 895 and for the same reason. The spring 906 is disposed at a considerable distance in front of the pivot between the lever 905 and the link 902 so that this spring has the double effect of urging the link to swing counter-clockwise about its pivot and also of tending to cause the lever 905 to swing clockwise about its pivot, which latter motion is limited by a suitable shoulder on said lever contacting the underside of the bar 892. This spring holds the link in its normal inactive position shown in Fig. 11. In order to draw the link down to its active position whenever the associated type bar 176 moves upward above its normal position, the following mechanism is provided. At each denomination a lever 911 is pivoted at 912 to one of a series of short pivot blocks 913 secured as shown to the cross bar 535, and the rear end of said lever normally rests as shown in Fig. 11 against a shoulder 914 consisting of the lower end of the upper part of the bar 176 which contains the types and which is riveted to the sheet metal lower part of said bar. At its forward end, the lever 911 is pivoted to an upright link 915 connected at its upper end by a pin and slot 916 with the lever 905. The link 915 is drawn downward by a spring 917 tending to press the rear end of the lever 911 against the shoulder 914. The construction is such that when the type bar rises as shown in Fig. 60, this spring moves the described linkage and pulls the control link 912 to its active position. The slot at 916 is provided so as to enable the lever 905 to be rocked by the automatic zero printing means presently to be described, independently of the lever 911.

The automatic zero printing mechanism is located at the upper ends of the levers 905 which project above the firing pins 883 as shown. Each of these levers at its upper end has roughly a T-shape and an ear 918 is formed off leftward therefrom as shown in Figs. 11 and 13. Pivoted to the right-hand side of each of these levers is a coupling member 920 having an ear 921 by which it can be swung into the active horizontal position shown in Fig. 11 or into an upright inactive position shown in the third denomination from the bottom in Fig. 13. Each of these coupling members has an ear 922 formed off rightward therefrom and which, when the coupling member is in its active position, stands just beyond the ear 918 of the next lower denomination. The construction is such that when these couplers are in their active position, the counter-clockwise swinging of any one of the levers 905 will be communicated to the one at the right of it, and so on through a series of them. This communication will be interrupted wherever one of these couplers is drawn up to its inactive position. This setting of the machine can, of course, be readily made by the operator. The coupler 920 is yieldably held in either of these two positions by a detent 923 pressed by a spring 924 against one or the other of two square edges of the coupler. It is only by these couplers that the firing pin 883 is activated when the zero type is in printing position. When it is desired to print numbers, outside of the numeral columns, such as street numbers, for example, the letter O is printed in place of zero.

The means for actuating the operating bar 897 is as follows: At each side of the machine (Fig. 5) the bail arm 898 of this bar is connected by a link 925, with an arm 926 fast on a print shaft 927, which shaft is journalled at its ends in the end frames 156 and 157. Outside of the web of the latter frame said shaft has an arm 928 (Fig. 4) connected, by a link 930, with a follower lever 931 pivoted at 932 and carrying a follower roller 933 running on a print cam 934 fast on the front drive shaft 168. This cam is timed to give a sharp depression to the roller 933 at the same instant that the platen 175 is advanced to printing position as hereinbefore described, thus driving the type against the paper.

As a further control means are provided readily settable by the operator, for preventing printing, even though the type bar does rise, so that numbers can be added without being printed. To this end a rock shaft 935 is journalled at its ends in the upper parts of the end frames 156 and 157, and it has secured to its rear flattened surface a series of pivot blocks 936, each slotted to guide a series of block-out fingers 937 pivoted on rods 938. These blocks 936 are provided for the same purpose as other pivot blocks in the machine so that ten of these fingers may be assembled separately and put into the machine by two screws. Preferably there is one of these block-out fingers 937 for each denomination of the machine. Any one of these fingers may be set up to inactive position shown in Fig. 60, or down to active position shown in Fig. 11, its motion in that direction being limited by a toe 940 as shown. When the finger 937 lies in its active position, its rear end rests against the ear 918 of the associate lever 905, and prevents said lever from being rocked to its printing position even though the associated type bar rises and frees the lever 911.

In order to retain these fingers in either of their adjusted positions, each of them is provided with an arm 939 cooperating with a bail rod 942 mounted at its ends in arms loose on the shaft 935. This bail rod can be rocked by hand to an upper position where it is out of the way of the arms 939, permitting each of said arms to be adjusted to its active or inactive position. When the bail bar is returned to its locking position, it contacts with the forward edges of those arms 939 that are in active position and with the rear edges of these arms that are in inactive position as shown.

Figure 7:
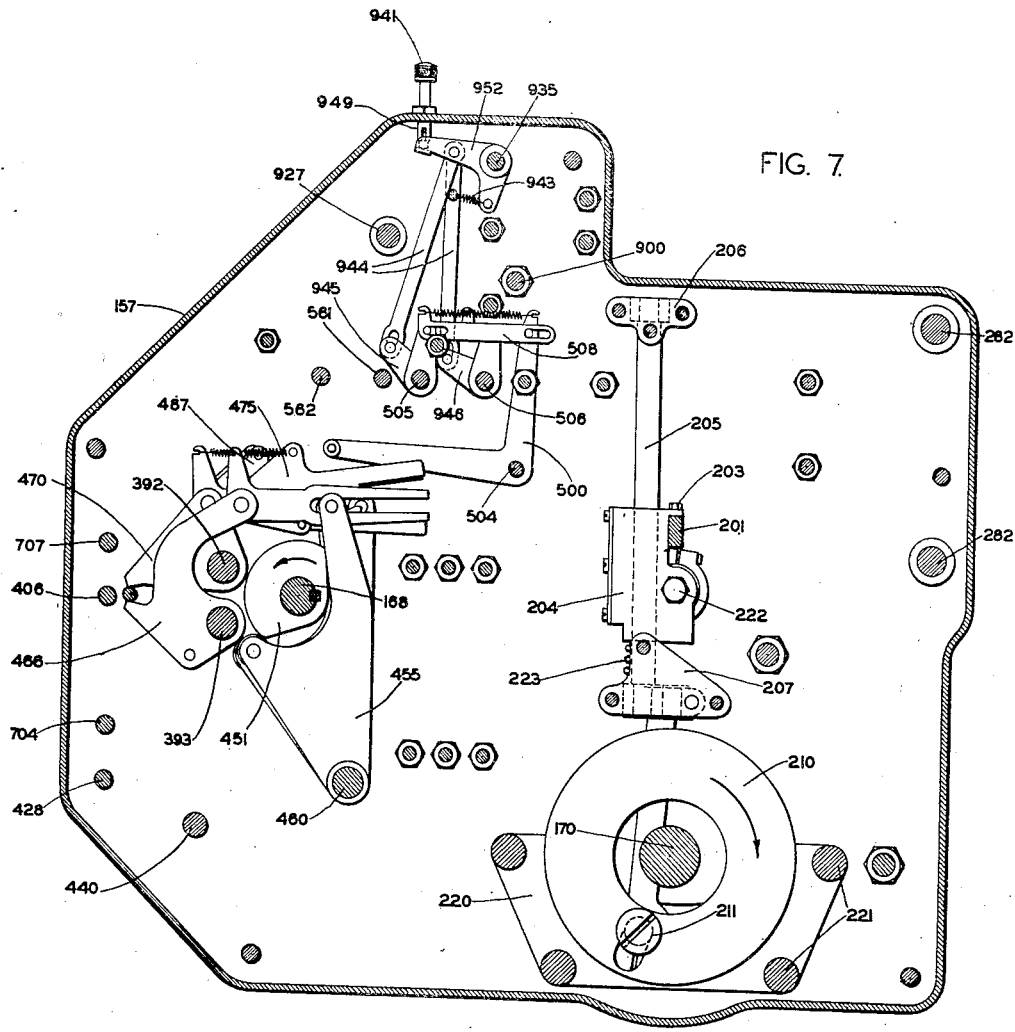
Fig. 7 is a right-hand elevation taken in section just at the left of the vertical wall of the left-hand end frame of the head.
Figure 8:
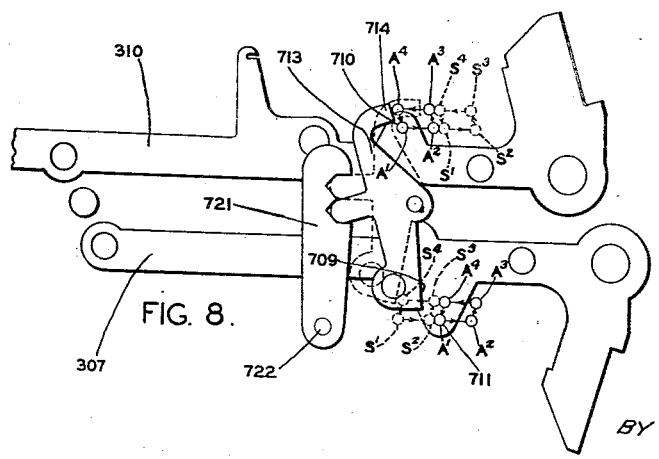
Fig. 8 is a diagrammatic view of parts of a totalizer and illustrating certain movements.

In order to disable simultaneously all of these block-out fingers 937 that are in active position, a finger piece or key 941 is provided (Fig. 7). The stem of this key passes down through the top flange of the left-hand frame 157 and is pivoted at its lower end to one arm of a bell-crank 952 fast on the rock shaft 935, the other arm of said bell-crank having connected thereto a spring 943 which holds the rock shaft in normal position. At any cycle of the machine the operator may depress this key and cause printing to take place by all type bars that have moved up above their normal position or which are set for printing by the automatic zero printing device.

Means are also provided to rock the shaft 935 to cause printing in total taking operations. To this end the bell-crank 952 has pivoted thereto two links 944, one of them at its lower end connected by a pin and slot with an arm 945 fast on the total shaft 505 and the other similarly with an arm 946 fast on the grand total shaft 506. This construction is used for what is called tabulating work in which only totals are printed. In many cases it is desired to run off a batch of cards without printing the items, but to print the sub-totals and grand totals. For such a piece of work, these denominational bars 176 that operate the totalizers will have the block-out fingers 937 set to active position so that items will not be printed, but at every total and grand total cycle the shaft 935 will be rocked counter-clockwise lifting all of these block-out fingers to inoperative position and permitting printing to take place. It will be perceived that the construction permits the operator to use this mode of operation on one batch of cards, and, when running off another batch of cards, to print items. To render this still more convenient the key 941 is provided with an ordinary bayonet joint 949 so that it can be depressed and locked down or released and allowed to remain up, as desired.

When the mechanism is set for tabulating as above described, those members 937 which are associated with designation columns, will be set up to their inactive positions to permit the designation to be printed from the first card of each group. It will be recalled that designation type carriers do not rise on any cycle except total cycles and the first one following total-taking. In total cycles they rise one space above the lowest type and nothing is printed as hereinbefore explained.

The modes of operation of the several parts of the mechanism have been described hereinbefore. It will be apparent that devices have been provided which are adapted to be combined and operated in many ways in order to secure the different results which are demanded of these machines in different installations, and also that many different modes of operation and resulting functions may be obtained by different settings of the manipulative devices of a single installation. It is not deemed desirable to attempt here an analysis of all of these variations in the original set-up of particular machines nor in the programs or modes of operation obtainable with the specific machine above described.

The means for automatically stopping the machine usually employed in Powers tabulators, is described in Patent No. 2,044,119, and a portion of one form of such means is shown in Fig. 63, which is similar to Fig. 36 of said patent. The link 154 (Fig. 3) which, as hereinbefore explained, controls the clutch of the machine, is pivoted at its upper end to a lever 959, pivoted at 957 and adapted to be rocked clockwise by an adjusting screw 958 carried by a lever 960, also pivoted at 957, and having a lug 969. The link 149 is pivoted to an arm 961 of a rock-shaft 962. The machine contains several means for rocking this shaft clockwise, either manually by the key 153 or automatically, in order to stop the machine. Such rocking moves the link 149 under the lug 969, so that, when, just prior to the end of a cycle the push link 148 is moved upward, said link will rock the levers 960 and 959 and depress the link 154, disengaging the clutch. Said link 154 is latched down until released by an operation of key 153. An arm 963 of shaft 962 carries a plunger 964 whose lower end is in the sensing chamber just above the end of the card being sensed at the time, and the lower pin box contains a spring-pressed pin 965 in register therewith. When there is no card in the chamber, or when a stop-card 966 having a notch 967 in its end is in the chamber, the pin 965 will push up the plunger 964 and stop the machine.

The general mode of operation of the machine will, it is believed, be apparent to persons acquainted with this class of mechanism, and the modes of operation of the various new features have each already been explained; but one or two points may be mentioned.

In order to set the machine for printing totals and grand totals only, the following adjustments are made. The stepped stop 845 of the line space mechanism (Figs. 56 and 59) is set with its lowest step 844 over the pin 843 so as normally to prevent line spacing. The adjustable piece 851 is set back one, two or three spaces for single, double, or triple line spacing on total cycles, at which time the link 857 rocks the parts 851, 845 counter-clockwise. The detent pieces 937 (Figs. 11 and 60) are set to active position to prevent printing, except in designation columns. On total and grand total cycles, the shaft 935 will be rocked, moving all of these detents to inactive position and permitting printing.

If designation printing is desired, in the designation columns the latches 547 for the slam ball control bars 544, will be set inactive and the couplers 552 will be hooked to the flange 554 of the designation shaft 562. This renders the slam bails normally operative to prevent the type bars from rising, but releases them on total cycles (when they rise beyond the last type position), and also on the first data cycle, when the designation is printed as hereinbefore described. Also, the detent pieces 937 in these columns are set inactive in order to permit printing on said first cycle.

The line space mechanism herein described is not claimed herein but is claimed in a divisional application filed January 21, 1941, Serial No. 375,304.

The means for reciprocating the restoring bar for the differential members and the cooperating mechanism to secure suitable timing are not claimed herein, but are claimed in a divisional application filed April 9, 1943, Serial No. 482,386.

While we have described what we consider to be a highly desirable embodiment of the invention, it is obvious that many changes in form may be made without departing from the invention, and, we, therefore, do not limit ourselves to the exact form herein shown and described, nor to anything less than the whole of the invention set forth, and as hereinafter claimed.

What we claim as new, and desire to secure by Letters Patent, is:

1. The combination of a differential member to be arrested in a plurality of positions, a series of stops each settable from a normal position to two arresting positions and arresting said member in two positions, a set of permutation bars less in number than the said positions of said differential member, means for setting said bars selectively according to a combination code each from a normal position to a single set position, means whereby each stop is controlled by certain of said bars set in two combinations which have a common root, the root combination releasing the stop for a full step and a bar not included in the root acting when set to limit the stop to a half step, the series of stops including two which are released by the same combination, the upper one of the two responding to two combinations each consisting of its root and an additional bar, one of said additional bars permitting a full step to the stop when set and at least a half step when not set and the other such bar when set limiting the stop to a half step, and each of said additional bars when set locking the lower one of said two stops.

2. The combination of a series of differentially settable members, a series of sets of stops, one set for each of said members, a series of sets of permutation bars for controlling said stops, and means for actuating said permutation bars according to a combination code, said sets of stops and said sets of permutation bars being arranged in pairs, one set of permutation bars being situated behind the other set of the pair and the sets of stops of a pair being arranged across opposite faces of the two sets of permutation bars of the pair.

3. The combination of a series of differentially settable members, a series of sets of stops, one set for each of said members, a series of sets of permutation bars for controlling said stops, and means for actuating said permutation bars according to a combination code, said sets of stops and said sets of permutation bars being arranged in pairs, one set of permutation bars being situated behind the other set of the pair, and the sets of stops of a pair being arranged across opposite faces of the two sets of permutation bars of the pair, and a restoring bar between and common to the two sets of stops of a pair.

4. The combination of one or more totalizers, differential actuating racks for said totalizers each such rack carrying a set of numeral and alphabet types, stops for arresting said actuators in positions to print from said types selectively one set of such stops for each such rack, a framework including means for mounting a continuous series of said racks of a number sufficient to actuate several of said totalizers, said framework including also means for mounting a continuous series of said sets of stops, and said framework including also a support on which said totalizer or totalizers are mounted and of a length sufficient to accommodate several such totalizers, and means for securing each totalizer on said support, said support and said securing means being so constructed as to enable the assembler of the machine to mount on said support any desired number of such totalizers within the capacity of the machine and to locate each such totalizer in position along said support to cooperate with any desired succession of said racks, leaving racks and the types carried thereby available for printing text.

5. The combination of one or more totalizers; differential members each consisting of a combined type-carrier and rack; a framework including means for mounting a continuous series of said members of a number sufficient to actuate several of said totalizers and said framework including also a support on which said totalizer or totalizers are mounted; totalizer securing means, said support and securing means being so constructed as to enable the assembler of the machine to mount on said support any desired number of totalizers within its capacity and to locate each such totalizer in position along said support to be actuated by any desired succession of said racks; a rock-shaft parallel to said support; devices on said rock shaft, one such device for each totalizer, whereby the totalizer is set into and out of gear with its associated racks, said devices being settable along said shaft each in harmony with the position along said support to which said totalizer may have been located; and means for rocking said shaft, the construction being such that differential members not used for totalizers are available for printing text.

6. In an adding and subtracting machine, the combination of an actuating rack, a pair of register wheels, two parallel levers on which respectively said wheels are mounted, means for so guiding the relative movement of said levers as to maintain said wheels constantly in mesh, means for imparting relative longitudinal movements to said levers to project one of said wheels nearer than the other to said rack in one position and the other wheel in another position, means for moving said levers together to engage and disengage the projected wheel with and from said rack, and means for swinging said levers about their pivots to move the engaged wheel in a direction substantially parallel to the direction of movement of said rack in order to impart an increment of rotation to said wheels.

7. The combination with actuators, of a series of pairs of intermeshed register wheels, supports for said register wheels permitting a transfer movement to each pair of register wheels independently of other pairs, means for effecting a relative shift of the wheels of each pair in order to set one wheel in position for engagement with its actuator for addition and the other wheel for subtraction, transfer devices controlling the independent movement of pairs of wheels and including a transfer tooth on each register wheel, a separate transfer pawl cooperating with each tooth, and means acting concomitantly with said relative shift to set the pawls of the adding wheels into action and those of the subtracting wheels out of action in one setting of the mechanism, and to set the pawls of the subtracting wheels into, and those of the adding wheels out of, action in the other setting.

8. The combination with totalizer actuators, of a totalizer comprising a supporting frame, two auxiliary frames mounted on said supporting frame, two sets of register wheels one set in each of said auxiliary frames, means for imparting relative movements to said wheels and to said auxiliary frames to bring one and the other set of wheels into position for engagement with said actuators, and means for guiding said wheels and frames for like relative movements such as to maintain the corresponding wheels of the two sets constantly in mesh.

9. The combination with totalizer actuators, of a totalizer comprising a supporting frame, two auxiliary frames mounted on said supporting frame, two sets of register wheels one set in each of said auxiliary frames, means for imparting relative movements to said wheels and to said auxiliary frames to bring one and the other set of wheels into position for engagement with said actuators, means for guiding said wheels and said frames for like relative movements such as to maintain the corresponding wheels of the two sets constantly in mesh, and means for moving the two auxiliary frames and sets of wheels together to engage and disengage said wheels with and from said actuators.

10. The combination with actuating racks, of register wheels each mounted on an individual spring-urged carrier capable of moving the register wheel against the direction of motion of the rack a distance to turn said wheel one tooth, a latch to hold said carrier against the action of its spring, a transfer trip lever pivoted to said carrier and tripped by the next lower register wheel, and a link operated by said trip lever and releasing said latch, said link swinging across its own dead center when said carrier and trip lever are moved by said spring to transfer.

11. The combination of register wheels, means for actuating said wheels; transfer devices each including a member for turning a wheel, a spring for driving said member, an anchor for said spring mounted on said member and movable by said spring against a stop on said member; and a power operated bar acting at determined times on all of said anchors to move them away from said stops and thus effectively to energize said springs, each said spring when its anchor is in contact with its said stop having no tendency to actuate said member.

12. The combination with totalizer actuators, of a series of totalizers each totalizer including register wheels and transfer devices, each transfer device including a member for turning a wheel, a spring for driving said member and an anchor for said spring mounted on said member and movable by said spring against a stop on said member; and a power-operated member common to said totalizers and acting at determined times on all of said anchors to move them away from said stop and thus effectively to energize said springs, each said spring when its anchor is in contact with its said stop having no tendency to actuate said member.

13. The combination with totalizer actuators of a totalizer comprising two sets of intermeshed register wheels relatively shiftable to condition one set and the other for engagement with the actuators, two bars acting when partially operated, one so to condition one set of wheels and the other the other set, and each bar acting when fully operated to move the totalizer wheels as a whole to engage the conditioned set, a power member for operating said bars, and means for setting said bars selectively into cooperation with said power member.

14. The combination with totalizer actuators, of a totalizer comprising two sets of intermeshed register wheels, a totalizer frame, two auxiliary frames one for each of said sets of wheels, said frames being mounted for a relative shifting movement and for a movement together, an operating member, and means for coupling one and the other of said auxiliary frames to said operating member, said member when operated acting first to effect such relative shift of said auxiliary frames and said sets of wheels to condition one of said sets of wheels for engagement with said actuators and then to move the frames together to bring the conditioned wheels into engagement with said actuators.

15. The combination of totalizer actuators, two totalizers each movable into and out of engagement with the same said actuators, two rock-shafts for so moving said totalizers, one shaft for each totalizer, power operating mechanism including two pairs of levers one pair for each rock-shaft, one lever of each pair vibrated according to the timing for registering items and the other lever of each pair according to the timing for taking totals, four independently shiftable couplers one for each of said levers and each shiftable into and out of position to couple its lever to rock its associate rock shaft, means cooperative with each of the registering couplers to shift it to inactive position for non-add, and means cooperative with the two couplers associated with one rock-shaft to shift the registering coupler to non-add and the total-taking coupler to active position for taking a total.

16. The combination of totalizer actuators, two totalizers each movable into and out of engagement with the same said actuators, two rock-shafts for so moving said totalizers one shaft for each totalizer, power operating mechanism including two pairs of levers one pair for each rock-shaft, one lever of each pair vibrated according to the timing for registering items and the other lever of each pair according to the timing for taking totals, four independently shiftable couplers one for each of said levers, and each shiftable into and out of position to couple its lever to rock its associate rock-shaft, means cooperative with each of the registering couplers to shift it to inactive position for non-add, means cooperative with the two couplers associated with one rock-shaft to shift the registering coupler to non-add and the total-taking coupler to active position for taking a total, and means acting to shift said couplers according to a predetermined program.

17. The combination of totalizer-actuators, a totalizer shiftable into and out of gear with said actuators, means for controlling said actuators and totalizer to register numbers and to take the totals thereof, a type carrier for printing a designation, a stop on said totalizer which when said totalizer is in gear is in position to arrest said type carrier at a point to print a character to designate a total, and means acting on non-totaling cycles to prevent said type-carrier from moving far enough to be arrested by said stop.

18. The combination of totalizer-actuators, a totalizer having two sets of register wheels in mesh and shiftable to condition one and the other set for engagement with said actuators, means for shifting said totalizer to engage the conditioned set of wheels with and to disengage them from said actuators, a designating type-carrier, two stops on said totalizer and shiftable concomitantly therewith to move one of said stops into position to arrest said type-carrier when the totalizer is shifted into mesh and also to condition one and the other of said stops to be so moved when the sets of register wheels are conditioned as aforesaid.

19. The combination of totalizer-actuators, two totalizers engageable with and disengageable from the same said actuators at least one of said totalizers having two sets of register wheels shiftable to condition one and the other set for engagement with said actuators, means for controlling said totalizers to register numbers and also to take totals from said totalizers one at a time, a designation type-carrier, a plurality of stops on said totalizers one stop for each set of register wheels, said stops shiftable concomitantly with said register wheels both to move a stop into position to arrest said type-carrier when its totalizer is moved into mesh and also to condition one and the other of the two stops on a totalizer for such movement when the sets of totalizer wheels are conditioned as aforesaid, whereby different characters may be printed to designate totals from the respective totalizers and also the kind of total.

20. The combination of a series of reciprocatory differential members, pawls engageable with said members and each when so engaged preventing movement of its member in one direction only, a control member universal to said pawls, means settable to connect any pawl individually to be controlled by said control member, and means for operating said control member to engage and disengage the pawls so connected.

21. In a computing and printing machine having means capable of adding and printing numbers, said means including reciprocatory denominational differential members, the combination with said members of pawls engageable with and disengageable from said members and each when so engaged permitting its member to move in return direction but not in forward direction, a control member universal to said pawls, means settable to connect any pawl individually to be controlled by said control member, total taking means including means for operating said control member to engage any pawls connected thereto and thereby to prevent operation of the corresponding differential members, a second universal control member, means settable to connect any desired pawls individually to be controlled by said second member, and means for operating said second member to engage the pawls connected thereto at the mid-part of a total taking operation to prevent slamming of said differential members.

22. In a computing and printing machine, the combination of register wheels, reciprocatory register wheel actuators and type carriers, means for engaging said register wheels with said actuators on the return stroke of the latter in computing operations and on the forward strokes in total taking, pawls engageable with and disengageable from said actuators and when so engaged permitting motion of said actuators only in return direction, a control member common to said pawls, means settable to connect said pawls each individually to be or not to be controlled by said control member, and means for operating said control member in the mid-part of a total taking operation to engage such of said pawls as have been connected to be controlled by said member.

23. The combination of a series of reciprocatory differential members, pawls engageable with and disengageable from said members and each when so engaged permitting movement of its member in one direction and not in the other, individual control bars one for each of said pawls, a plurality of control members each universal to said control bars, said control members operated automatically at different times, and devices settable to connect any of said control bars to be operated by any of said control members to control the engagement and disengagement of the associated pawl.

24. The combination of a series of reciprocatory differential members, pawls engageable with and disengageable from said members and each when so engaged permitting movement of its member in one direction and not in the other, individual control bars one for each of said pawls, a plurality of control members each universal to said control bars, and devices settable to connect any of said control bars to be operated by any of said control members to control the engagement and disengagement of the associated pawl, one of said control members being operated at the beginning of a cycle to engage the connected pawls to prevent operation of the associated differential members, and another of said control members being operated at the mid-part of a cycle to engage its connected pawls to prevent slamming of the associated differential members.

25. The combination of a series of reciprocatory differential members, pawls engageable with and disengageable from said members and each when so engaged permitting movement of its member in one direction and not in the other; individual control bars one for each of said pawls; spring means tending normally to hold each pawl disengaged from its differential member but, when said control bar is operated, tending to hold said pawl engaged; a plurality of control members each universal to said control bars; devices settable to connect any individual control bar to be controlled by any one of said control members, one of said control members being normally inactive on the connected control bars and acting when operated to cause the connected pawls to engage their differential members, and another of said control members acting normally to hold the connected pawls in engagement and acting when operated to disengage the connected pawls; and means for operating said control members.

26. The combination of a series of reciprocatory differential members, pawls engageable with and disengageable from said members and each when so engaged permitting motion of its associated member in one direction only; and, associated with each of said pawls individually, means settable to cause said pawl (a) to be normally disengaged from its differential member and to be moved into engagement at a predetermined point in the operation of the machine, (b) to be normally engaged and to be moved out of engagement at a predetermined point in the operation of the machine, (c) to remain out of engagement indefinitely, and (d) to remain in engagement indefinitely whereby the associated differential member is put out of operation; and actuating devices operated automatically and cooperating with said settable means to produce the movements aforesaid.

27. The combination of a series of reciprocatory denominational differential members, a series of pawls each acting when engaged with its associated differential member to permit motion of the latter in one direction only, a plurality of control members each universal to the series of pawls, said members being automatically operated at different times in the program of operation of the machine, and individual settable means for connecting any pawls to be controlled by any of said universal members as to its engagement with and disengagement from its differential member.

28. The combination of a series of reciprocatory denominational differential members, a series of pawls each acting when engaged with its associated differential member to permit motion of the latter in one direction only, a plurality of control members each universal to the series of pawls, said members being automatically operated at different times in the program of operation of the machine, individual settable means for connecting any pawl to be controlled by any of said universal members as to its engagement with and disengagement from its differential member, and individual settable means for retaining any of said pawls engaged indefinitely so as to render its differential member inactive.

29. In a machine of the class described, the combination of a plurality of registers, reciprocatory actuators for said registers, pawls engageable with and disengageable from said actuators and acting when so engaged to permit motion of said actuators in return direction only, means for operating said actuators and registers to take totals of two kinds, two control members one for each of said kinds of totals and each universal to said pawls, means settable to connect the pawls associated with the actuators of any desired register or registers to be controlled by one or the other of said control members, means for operating one of said control members at the taking of one kind of total and thereby engaging the pawls controlled thereby to prevent operation of the actuators of certain of said registers, and means for operating the other control member at the taking of the other kind of total to prevent actuation of the actuators so controlled and associated with other registers.

30. In a machine of the class described, the combination of a plurality of registers, reciprocatory actuators for said registers, pawls engageable with and disengageable from said actuators and acting when so engaged to permit motion of said actuators in return direction only, means for operating said actuators and registers to take totals of two kinds, two control members one for each of said kinds of totals and each universal to said pawls, means settable to connect the pawls associated with the actuators of any desired register or registers to be controlled by one or the other of said control members, means for operating one of said control members at the taking of one kind of total and thereby engaging the pawls controlled thereby to prevent operation of the actuators of certain of said registers, and means for operating the other control member at the taking of the other kind of total to prevent actuation of the actuators so controlled and associated with other registers, a third universal control member, means settable to connect the pawls associated with the actuators of any desired register to be controlled by said third member, and means to operate said third member at the mid-part of each total taking operation to engage the connected pawls to prevent slamming of said actuators.

31. In a machine of the class described, the combination of a plurality of registers, reciprocatory actuators for said registers, means for taking two kinds of totals from said registers, pawls engageable with and disengageable from said actuators and acting when so engaged to permit motion of said actuators only in return direction, means acting automatically at one kind of total-taking operation to move into engagement the pawls associated with the actuators of one register and thereby to prevent operation thereof to take a total from that register, means acting automatically at the other kind of total taking operation similarly to engage the pawls associated with another register to prevent the taking of a total therefrom, and means acting automatically at the mid part of each total taking operation to engage the said pawls associated with the actuators for the register whose total is being taken in order to prevent slamming of said actuators.

32. The combination of a totalizer, a series of differential members some only of which actuate said totalizer, a series of slam bail pawls one for each of said members, means for taking totals from said totalizer including a control member actuated at about mid-cycle of a total-taking cycle, and individual connections for connecting said pawls to said control member, said connections being individually settable by the operator of the machine to connecting and to disconnecting positions.

33. In a card-controlled tabulating machine, the combination of a series of differential members each having an advance and a return movement, a series of pawls one for each such member and each acting when engaged therewith to prevent advance movement while permitting return movement of its differential member, a control bar for each said pawl, a plurality of members each shifted at certain times in the operation of the machine, and means settable at will to connect any selected control bar to any one of said shifting members, so as to render the connected pawls active and inactive at the times required by the several functions of the machine.

34. In a card-controlled tabulating machine, the combination of a series of differential members each having an advance and a return movement, a series of pawls one for each such member and each acting when engaged therewith to prevent advance movement while permitting return movement of its differential member, a control bar for each said pawl, a plurality of members each shifted at certain times in the operation of the machine, means settable at will to connect any selected control bar to any one of said shifting members, so as to render the connected pawls active and inactive at the times required by the several functions of the machine, and means settable at will to lock any selected control bars in position to maintain their pawls engaged and thus to disable the associate differential members.

35. In a card-controlled tabulating machine the combination of a series of differential members each having an advance and a return movement, a series of pawls one for each such member and each acting when engaged therewith to prevent advance movement while permitting return movement of its differential member, and means individual to the several said pawls whereby at will any one or more of said pawls may be connected with any one of a plurality of parts of the machine in such wise as to control the engagement and disengagement of the pawls so connected according to programs predetermined by the modes of operation of said parts.

36. The combination of a series of type-carrying differential members each having an advance and a return stroke, a series of pawls one for each such member and each acting when engaged to prevent advance movement while permitting return movement of its differential member, adding mechanism, means settable to condition the mechanism for total-taking, a designation member settable concomitantly with said conditioning means, connecting members one for each of said pawls and each settable at will to connect its pawl with said designation member, the construction and arrangement being such that said connected pawls normally engage their differential members and prevent operation thereof and that said designation member when set disengages said pawls and permits said differential members to operate, means acting to prevent printing by the designating differential members in total-taking cycles, means to retain said designation member in set position after the total cycle whereby the designation is printed in the next following cycle, and means acting during such next following cycle to restore said designation member and thus to prevent further designation printing until after the next total-taking operation.

37. The combination of a series of type-carrying differential members each having an advance and a return stroke, a series of pawls one for each such member and acting when engaged to prevent advance movement while permitting return movement of its differential member, adding mechanism, means settable to condition the mechanism for taking a total, a designation member, connecting means one for each pawl and each at will connectable with and disconnectable from said designation member, and means controlled by said conditioning means for setting said designation member so that the pawls connected therewith will permit advance movement of the designation-printing differential members in the first item cycle following a total-taking cycle and so as to prevent such advance in other item cycles.

38. In code interpreting mechanism in which the numerals 1, 2, 3, 4, 5, 6, 7, 8, and 9 are represented by a five-point code, the odd numerals being represented respectively by the first, second, third, fourth, and fifth points and each even numeral by a combination of the point assigned to the next preceding odd numeral with the fifth point, the combination of a type carrier carrying the series of numeral types interspersed with other types, a series of stops each when projected a full step arresting said type carrier in a numeral position and when projected a lesser step arresting said carrier in an intermediate position, at least five code bars one responding to each point of the code and each settable from a normal position to a single set position and said bars by their configurations controlling the full step and the lesser step projections of said stops, each stop for an odd numeral being controlled by one code bar having a full step opening and by another bar having a half step opening, and each stop for an even numeral being controlled by two code bars, including the fifth, having full step openings and by a third bar having a half step opening.

39. The combination of a continuous series of totalizer actuators, one or more totalizers so supported that a totalizer may be variably disposed so as to be actuated by any desired succession of said actuators, means including a part or parts variably disposable in harmony with the totalizer and controlled by an actuator outside of said succession of actuators for controlling subtraction on said totalizer, and record controlled means for controlling the differential settings of said actuators including the last mentioned one.

40. The combination with totalizer actuators, of a totalizer comprising two sets of intermeshed relatively shiftable wheels one for engagement with said actuators for addition and the other for subtraction, an operating link connected with said totalizer and acting when operated first to shift the subtraction wheels relative to the addition wheels to set the totalizer for subtraction and then to move both sets of wheels together toward and the subtraction wheels into mesh with the actuators, a lock acting in the said first operation of said link to prevent the joint movement of said wheels, and means for releasing said lock at the proper point in the operation of said link.

41. The combination of one or more totalizers, differential actuating racks for said totalizers each such rack carrying a set of numeral and alphabet types, stops for arresting said actuators in positions to print from said types selectively one set of such stops for each such rack, a framework including means for mounting a continuous series of said racks of a number sufficient to actuate several of said totalizers, said framework including also means for mounting a continuous series of said sets of stops, and said framework including also a support on which said totalizer or totalizers are mounted and of a length sufficient to accommodate several such totalizers, and means for securing each totalizer on said support, said support and said securing means being so constructed as to enable the assembler of the machine to mount on said support any desired number of such totalizers within the capacity of the machine and to locate each such totalizer in position along said support to cooperate with any desired succession of said racks and means for disabling said totalizer so that a continuous line of text may be printed including both the space occupied by said totalizer and the space not so occupied.

42. The combination of one or more totalizers, a continuous series of totalizer actuators of an extent materially greater than the width of a computing field and types settable with said actuators, a support for said totalizer or totalizers such that a totalizer can be mounted thereon in position to be actuated by any desired group of said actuators, record controlled means for controlling the differential settings of said actuators and types, and a control for said totalizer or one of said totalizers, said control being brought into action by a regular record controlled setting of a selected one of said actuators and its associated types other than those used to actuate said totalizer.

43. The combination of one or more totalizers, a continuous series of totalizer actuators of an extent materially greater than the width of a computing field and types settable with said actuators, a support for said totalizer or totalizers such that a totalizer can be mounted thereon in position to be actuated by any desired group of said actuators, record controlled means for controlling the differential settings of said actuators and types, and a control for said totalizer or one of said totalizers, said control being brought into action by a regular record controlled setting of a selected one of said actuators and its associated types other than those used to actuate said totalizer, and said control being positionable in harmony with the selected position of said totalizer on its support so that the action of the totalizer may be determined by the mere card controlled setting of a type to print a designating character adjacent to the computing field.

44. The combination of a series of reciprocatory differential members, pawls engageable with and disengageable from said members and each when so engaged permitting movement of its member in one direction and not in the other, individual control bars one for each of said pawls, a plurality of control members each universal to said control bars, said control members operated automatically at different times, and devices settable selectively to connect said control bars to be actuated some by one and some by other of said control members.

WILLIAM W. LASKER, JR.,
*Executor of the Estate of William W. Lasker, Deceased.*
JOHN MUELLER.